(12) United States Patent
Kamimura

(10) Patent No.: US 6,526,455 B1
(45) Date of Patent: Feb. 25, 2003

(54) OBJECT MANAGEMENT METHOD, APPARATUS AND DATA STRUCTURE

(76) Inventor: Kunio Kamimura, 29-15 Higashi-cho, 4-chome, Koganei-shi, Tokyo 184 (JP)

( * ) Notice: Subject to any disclaimer, the term of this patent is extended or adjusted under 35 U.S.C. 154(b) by 0 days.

(21) Appl. No.: 09/117,669

(22) PCT Filed: Feb. 4, 1997

(86) PCT No.: PCT/JP97/00264
§ 371 (c)(1),
(2), (4) Date: Aug. 4, 1998

(87) PCT Pub. No.: WO97/29422
PCT Pub. Date: Aug. 14, 1997

(30) Foreign Application Priority Data

Feb. 5, 1996 (JP) ................................. 8/00227

(51) Int. Cl.⁷ ................................................ G06F 9/44
(52) U.S. Cl. ........................................................ 709/316
(58) Field of Search .............................. 709/310–320, 709/223; 714/26, 38; 717/1

(56) References Cited

U.S. PATENT DOCUMENTS 5,751,962 A * 5/1998 Fanshier et al. ............ 709/223
5,850,511 A * 12/1998 Stoecker et al. ............. 714/38
6,012,152 A * 1/2000 Douik et al. ................. 714/26

OTHER PUBLICATIONS

Zondag, E.G., "Hierarchical Management of Distributed Objects," University of Twente, Dept. of Computer Science, pp. 1–21, Nov. 1990.*
Chin et al., "Distributed Object–Based Programming Systems," ACM Computing Surveys, vol. 23, No. 1, Mar. 1991, pp. 91–124.*

* cited by examiner

Primary Examiner—St. John Courtenay, III

(57) ABSTRACT

This invention introduces class identification information for identifying the class of an object and makes it easy to retain, reproduce and transfer the object. An object tree as a tree-like structure for storing objects is also devised. A pointer can be retained and transferred by giving the object identification information to the object and converting the pointer to the combination of the object identification information. This invention is convenient for handling logic models representing various logical relationships. When elements of information distributed to a plurality of computers connected to a communication network such as an internet are linked together and a large scale logic model is reproduced, only the portion necessary for processing can be reproduced. When the invention is applied to three-dimensional space display, a continuous broad space can be reproduced as a space in which only necessary portions are conyinued. When the invention is applied to an object-oriented programming, all the objects are reproduced if vacancy exists in a main memory, and a request can be made to the objects of another computer if no vacancy exists.

6 Claims, 31 Drawing Sheets

Fig.30
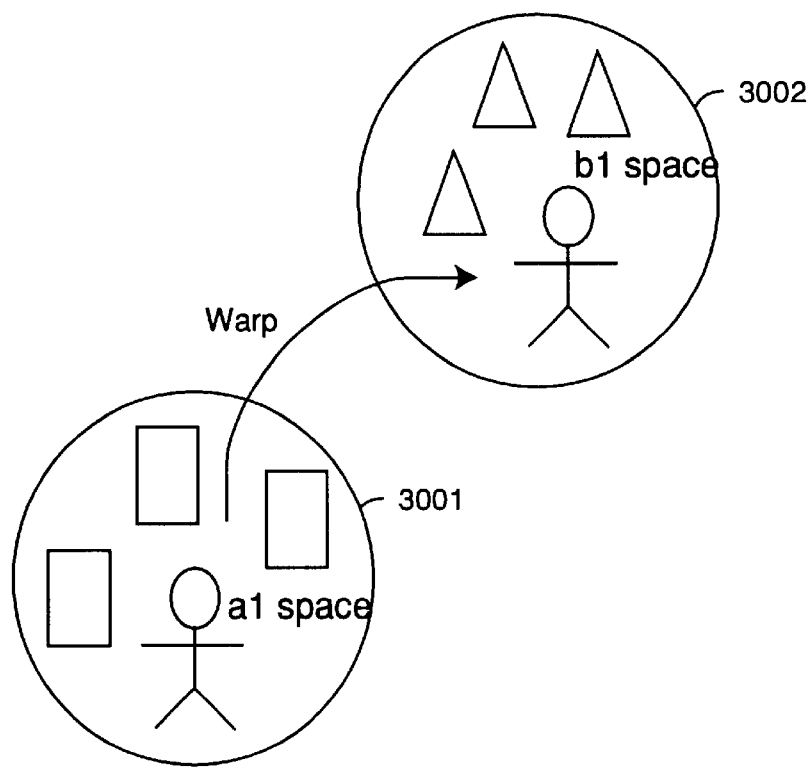
(1) Present three dimensional space
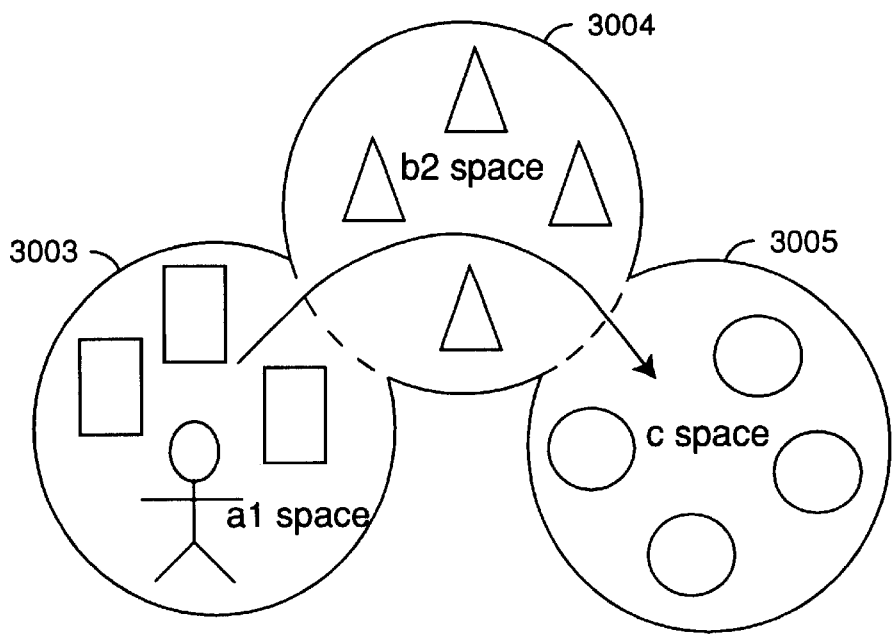
(2) Connection of three dimensional space by the present invention

OBJECT MANAGEMENT METHOD, APPARATUS AND DATA STRUCTURE

TECHNICAL FIELD

This invention relates to a method, apparatus and data structure for object management, in the field of the object-based technology.

BACKGROUND OF THE INVENTION

Section 1—Problems Related to Storage, Reproduction and Transmission of Objects

Section 1.2 Overview of Object-based Technology

Real world existence can be expressed using objects created on a computer, with "object-based" technology (C++ Programming Language, Second Edition, Bjarne Stroustrup, 1991, Preface to the first edition). These objects represent concepts, organizations and things in the real world.

Moreover, overall complex processing can be implemented, by invoking processes corresponding to messages (such as start signal, response, etc.) using object functions. This is called "object-oriented programming" (pp14, The C++ Programming Language, Second Edition, by Bjarne Stroustrup, 1991).

Various programming languages, such as Small Talk and Common Lisp Object System, have been developed to realize object-based programming technology. The most popular language is C++. With C++, it is possible to define "Class" as a model of objects and generate objects using a "new" operator that secures memory.

The following sections describe problems relating to storage, reproduction and transmission of objects by reviewing the current object-based technology, such as object-oriented programming, Common Object Request Broker Architecture (CORBA), C++ language and object-oriented databases.

Section 1.3 Limits of Object-oriented Programming

In object-oriented programming, a procedure for generating objects is coded as logic of the programming. A sequence of processes starts when a message, expressing external input, is passed to an object. Objects to be generated by each program are already determined beforehand. Further objects are generated by program logic as a procedure, which is invoked by the external input or internal procedures.

Until now, there was no concept of "First, prepare data that describe objects and relations among them. Then by reading the data, a computer reproduces a group of objects and invokes procedures defined by messages among these objects."

Section 1.4 Limitations of CORBA

Common Object Request Broker Architecture (CORBA) defines procedures for transmitting messages among objects, which are distributed among computers connected by a communications network. It is a concrete procedure, by which computers cooperate with each other and carry out procedures through a communications network. Here, a conventional object-oriented programming program generates objects in each computer.

Until now, there was no concept of the following. Prepare data of objects for each computer. A complex procedure can be implemented over the whole communications network, utilizing these data and messages are passed among objects in computers of this network so that each computer generates objects from the data.

Section 1.5 Limitations of C++ Language

C++ language has the widest scope of application as a means to implement object-based technology. The program of C++ language can be operated on a wide range of hardware since it can be converted to a program of C language. Java language employs same manner of handling Class and object.

However, the specification of C++ language does not refer to the mechanism of retaining objects. Using C++ language actually, one realizes how difficult it is to retain objects made by it. It is also difficult to retain a pointer that indicates object, since a pointer is an address of memory, to which the object was allocated. Even if the address of memory is retained, there is no guarantee that it will match-up with an address of object reproduced when the computer is invoked at the next time.

Many program languages can be used for object-based technology. However, there is no language that treats retention of objects and pointers. One has to device a dedicated mechanism saving key information of each specific application. There is no general method that retains objects and pointers.

Section 1.6 Limit of Object-oriented Database

An article, "Object-oriented database", Nikkei Intelligent Systems, Separated volume, Nikkei BP Company, 1994, states "Object-oriented databases (OODB) appeared to permanently retain the application-objects that were developed by object-oriented technology. With object-oriented databases, it is possible to retain not only the object but also the mutual relationship among them."

However, an object-oriented database is a complex mechanism that controls data in the server computer and distributes it to client computers who use it. For this reason, an object-oriented database is expensive. For the current object-oriented database technology, it is not so easy to treat cases where data are distributed among computers connected by communications networks.

Also, the search procedure of an object-oriented database takes a lot of time, since it has to search all objects in order to find the specific objects satisfying assigned conditions. It is possible to prepare a group of objects satisfying some assigned conditions, in order to reduce search time. However, this requires an additional preparation procedure and memory to keep the results.

Section 2 Required Technique

It is useful to have a simple technology that retains and reproduces an object (set), and transmits it to another computer and reproduces it there. It is also useful to have a technology that reproduces only objects necessary for the current procedure, which reproduces retained objects or reproduces them to another computer. Retrieving all objects into main memory, a computer encounters a problem that no other process can be invoked, if too many objects are interrelated. A small computer may not be able to reproduce all of these objects. It is convenient to have a simple technique that reproduces only objects necessary for the current procedure into main memory.

Section 7 shows Examples of Applications with These Technologies.

SUMMARY OF THE INVENTION

The present invention is a "simple method that retains and reproduces (sets of objects" and a "simple method that transmits and reproduces (sets of) objects." This is also a "technique that produces necessary parts of an object set, according to developments of a computer process, by combining data dispersed across computers in a communications network." Details are shown below.

Section 3 Object Retention and Reproduction, and Object Transmission and Reproduction Section 3.1 Basics of Object Retention and Reproduction Retaining an object can be done by writing out data included in this object, which exists in main memory, into a storage medium. Storage medium is a medium such as magnetic disk, magnetic tape, FD (floppy disk), writable CD-ROM, and SRAM. They retain data either temporarily or permanently. Some parts of main memory with a constant power supply can be used as a storage medium. Storage medium is sometimes called a secondary memory medium or external memory medium in contrast to main memory.

Through communications circuits, data (contents) of an object can be transmitted to other computers, where it is kept in the main memory or the external storage medium.

An object includes data as values of an integer, real number, character string or pointer. Object data, except for a pointer, can be simply written to a storage medium. An object sometimes includes another object. For example, in C++ and Java, (object of class can have an object of another class as a variable. Inner object data contained in an outer object is recursively written out, while writing the outer object data.

When reproducing an object using data stored in storage medium, or data through communications circuit or the user interface of a computer, first objects are generates from class, which is the model of the objects. When C++ class is defined as "class X{ };", the object of class X is generated by code "X* CnewObj=new X;". This memory address, which is the top address of memory reserved for the object in main memory, is assigned to CNewObj.

In Java, the object of class X is generated by code "X JnewObj=new X;". It is not possible to use pointers explicitly in Java. However, the Java virtual machine treats JNewObj as a pointer in the internal procedure. (Please refer to "Java, Quick Reference, D. Flanagan, translated by Nagamatsu, O'Reiley Japan, Ohmu-sha 1996, p37".) As evidence of this inner mechanism, code "X JNewObj2=JNewObj;" results in that JNewObj and JNewObj2 indicate the same object.

After generating an object in memory, the procedure reads-in data recorded in storage medium and sets them as variables of the object. A memory address of this object is different from an address of the original object when data were output. However, meanings of the object are precisely reproduced.

It is possible to execute the above procedure if there is a definition to the class that is a model of the object, before reading-in object data from storage medium. For instance, an object can be made by code "new X", because the definition of class X is already given.

If the program is coded to indicate the correspondence between a specific situation and class definition to be used for object generation, it can reproduce an object with an appropriate class definition. If there is only one class definition, then this class should always be used to reproduce objects. If there are multiple classes, it is possible to fix the order of class definitions to be used for object reproduction, by writing program code to follow this order and reproduce objects. It is also possible to assign class definition to each group of objects.

For a simple case, objects can be reproduced as mentioned above.

Section 3.2 Object Transmission and Reproduction, and Operator Input-output

In the procedure of object retention and reproduction, a computer outputs data of object data to be retained in storage medium of this or another computer. The computer reads-in this data and reproduces objects.

The object can be reproduced on another computer that reads-in these output data. That is, the file of output data is sent to another computer, and a process of this computer reproduces objects in its main memory. Instead of outputting object data in main memory to a file on its storage medium, the computer can send it to another computer through a communications circuit. An object can be reproduced on another computer using this data.

Outputting object data to storage medium is equivalent to transmitting it to the outside through a communications circuit. To show object data on a display unit of a computer is equivalent to transmitting object data to a human being. Data can be delivered to another computer using a portable medium such as FD. This is also equivalent to the procedure of outputting object data to a storage medium. Thus, it is possible to transmit object data and reproduce an object by a technique of retaining and reproducing objects.

The computer can generate objects using data from operators through the input unit or by reading in a data file created by editor software.

Section 3.3 Class Generation Data

Section 3.3.1 Class Identifier

When there are multiple classes of objects and the assignment of these classes cannot be specified in program logic, the method of section 3.1 is not applicable. Now, a "procedure to output a class identifier of an object" is introduced, in addition to the "procedure to output object data." In other words, a computer outputs a "class identifier" when outputting data included in the object. For example, class X is defined by the following code"

class X{public: cls-print( ){'output character string "CLS_X'";} };. The function c1-print( ) that outputs name of this class, is also defined. Outputting data included in object of class X, the procedure invokes cls-print( ) that outputs character string "CLS_X." This character string is the class identifier.

When reproducing an object, the procedure generates an object by class definition corresponding to a class identifier read-in from a storage medium, and sets object data read in to this object. In the above example, memory is reserved by code "new X" for a character string "CLS_X". The object (contents) data read in are set in this memory.

In this case, code "new X" should be invoked for character string "CLS_X". It is necessary to define correspondence between definition of class X and character string "CLS_X" in the program code. Suppose character string variable "char* cls_str," is set to an object identifier read in. The following code reserves memory for a new object using the definition of class X as a model. This memory address is set to "new_obj."

if(strcmp(cls_str,"CLS_X"==0){new_obj=new X;}; Variable "new_obj" should be "void *" or a pointer to a base class of class X.

A number can be used as a class identifier. In this case, it is possible to write a switch code consisting of multiple codes like the if-statement mentioned above. Suppose identifier of class X is number "1000" and variable "int n" is set to the read-in number. The procedure can generate an appropriate object with the following switch statement.

switch(n){case 1000: new_obj=new X; break; . . . }

This description calls the combination of class identifier (e.g. "CLS_X") and class generation code (e.g. "new X") "class generation data."

Section 3.3.2 Handling of Class Generation Data

When a program has class generation data, it can easily generate objects from class identifiers read in. Even if a program has no class generation data, it can generate objects form class generation data of a dynamically linked program (e.g. a DLL file). It is possible to supply up-to-date class generation data by replacing this dynamically linked program.

A program can read-in a function recorded in the objective file and set this address to a function pointer. With this function pointer, it can invoke a function just read in. There is an example in "Advanced C++, Programming Styles and Idioms, J. O. Coplien, 1992, p328". Reading-in a new function that has a new class generation data, the procedure can generate an object using the new class generation data. The task of generating an object from the class identifier is assigned to the function just read in.

It is possible to define general class definition with a general data structure and a general member function that invokes a function set to a function pointer. A program can generate objects using this general class definition and customize this object by setting the function pointer to a function just read in (without stopping this program). In this case, new "class generation data" is defined as a "combination of the class generation data of the general class and objective file of the function".

In Java, the process can be linked with the class dynamically. Please refer to "Java, Quick Reference, D. Flanagan, O'Reiley Japan, Ohmu-sha, 1996, p14".

Section 3.3.3 Reading in Class Identifier

Object data including a class identifier is temporarily output to storage medium. These data are read-in at another time and then objects are reproduced. There is a case where class identifier and content data of an object is received from outside through a communications circuit. In this case, the original data could be either in main memory of a sending computer or in a secondary storage unit. Furthermore, there are cases where the procedure reads-in a file that is created by editor software and stored in a storage medium, or where the procedure receives data from an operator through an input interface.

In each case, the procedure generates an object from the class identifier, and also sets the content data. In order to simplify the above-mentioned procedure of object reproduction, it is convenient if the order of data recording is as follows. First, class identifier of an object is recorded and then other object data are recorded successively. However, even if the order is reversed, the procedure can handle them by temporarily saving the object data. That is, object is first reproduced from the class identifier read-in, and contents of this object are set by the saved object data. It is also possible to write the class identifier to one file and the object data to another file. The procedure reads-in both files and synchronizes them to generate objects and to set object data.

Section 3.4 Problems of Pointer Retention, Reproduction and Transmission

There are three cases where pointers are used. The first case is, as shown in FIG. 1(1), the one to one mapping between pointer (P1 pointer 101) and the pointed object (X1 object 102). In this case, object data of X1 object 102 can be output, instead of outputting memory address of X1 object indicated by P1 pointer 101. For reproducing this pointer, first, the procedure generates the object and assigns its memory address to P1 pointer. Then the procedure reads-in object data of X1 object 102 from the storage medium and sets them to the object generated. P1 pointer 101 pointing to X1 object 102 is reproduced.

The second is the case where multiple pointers point one object. In FIG. 1(2), all three of P2 pointer 103, Q2 pointer 104 and R2 pointer 105 indicate X2 object 106. In this case, the problem is which pointer should be assigned to cope with outputting object data of X2 object 106 and reproducing it. If P2 pointer 103 is assigned, it is necessary to copy this value, which is memory address of X2 object 106, to Q2 pointer 104 and R2 pointer 105. In other words, it is necessary to analyze the structure of an application program and to implement a customized procedure to retain and reproduce pointers.

In addition to the possibility that P2 pointer 103, Q2 pointer 104, and R2 pointer 105 point to X2 object 106, there is another possibility that some of them point to other objects according to situations of the application. The procedure to retain and reproduce a pointer becomes more difficult in this case. It is necessary to change the job assignment of outputting and reproducing X2 object 106, according to the situation. A procedure to copy the pointer value to other pointers should be also changed according to the situation. Furthermore, it is necessary to cope with the case where none of these pointers indicate X2 object 106.

The third case is where one pointer might indicate one of multiple objects. FIG. 1(3) shows there are possibilities that P3 pointer 107 indicates X3 object 108, Y3 object 109, or Z3 object 110. Though the C++ type check is strict, there is no problem when P3 pointer 107 points to the base class of X3 object 108, Y3 object 109 and Z3 object 110, even if they are different classes. P3 pointer 107 can point to one of these three objects. If the type of P3 pointer 107 is "void*", it is possible to assign an object address of any class to P3 pointer 107.

Though it is easy to output object data pointed to by P3 pointer 107, it is impossible to identify a class definition when reproducing an object after reading-in the data. That is, it is impossible to reproduce P3 pointer because there is no data indicating which class definition should be used among classes of X3 object 108, Y3 object 109 and Z3 object 110.

Problems become more complicated in the case where the second and the third are mixed.

There is another case where pointer of A object points to B object, pointer of B object points to C object and pointer of C object points to A object. This case where objects point one after another in a circle, causes a problem as to in what order the object should be reproduced.

Object data sometimes include pointers. Object retention, reproduction and transmission is incomplete, if pointer retention, reproduction or transmission is impossible. Sometimes it is necessary to retain, reproduce and transmit a pointer that belongs to no object.

Section 3.5 Object Tree and Pointer that can be Retained, Reproduced and Transmitted Since the value of pointer is just an address of memory, there is no meaning to retain, reproduce and transmit the pointer itself. The present invention introduces a method to convert a pointer to data identifying the pointed object and a method to convert the data back to the pointer. By sending this data to another computer, the pointer will be sent. Thus, it is possible to implement pointers that can be retained, reproduced and transmitted.

The exact meaning of sending pointer is reproducing a pointed object and pointer that points this object in the receiving computer. In short, it means sending a pointer of equivalent meaning. It is useless to send just the value of the pointer, which is merely a memory address of the sending computer.

Section 3.5.1 Object Tree

An object management method should be first devised, in order to implement pointers that can be retained, reproduced and transmitted. A memory address is only the access method to an object immediately after its generation. A memory address is given by the code "new" to generate an object or by the code "malloc" to reserve memory.

The present invention manages memory addresses of objects as a set. Though an actual element of set is a memory address, we call this set an "object set" for simplicity. Sometimes the memory address of an object is simply called "object."

The object set should be accessible to each object. That is, the object set can be implemented as a simple list, a bidirectional list, an array, a hashed array, a binary tree, bag, stack, queue, dictionary (set of association), and so on. A hashed array is a collection of lists of objects with same hashed number, where these lists are arrayed in order of their hashed number. These sets provide access methods to find and access the target object by tracing list elements, accessing a list of assigned hashed numbers, tracing tree branches, and so on.

An "Object identifier", which will be defined later (in section 3.5.2), could be used as a key to find out the target object. Sequentially checking objects in an object set, the procedure can find out the object that matches the assigned object identifier. It is a well known method to limit the search range by calculating a hashed number from the assigned object identifier. A hashed array uses this method. Any set can implement an object set, if any element of this set can be accessed.

The present invention introduces an object that manages an object set. This object is called a "management object" and has data specifying the managed set. For instance, the management object holds a pointer ("object set pointer" 503 of FIG. 5) that keeps an address of list head 506, which indicates the top of an object set. By repeating a procedure which assigns a management object to a set of management objects, it is possible to put objects (mainly management objects) in a tree structure. The present invention calls this as an "object tree."

Examples shown in this description assume that the management object carries not only data to manage an object set but also data as an object itself. In other words, "most of the objects to be retained and transmitted by the present invention are management objects that have data for managing an object set and data as a normal object." Management objects as well as normal objects are simply called objects.

However, the present invention can be applied without any modification to the case where a "management object holds only the data to manage an object set," and "object data representing the subject matter are dealt with only by normal objects, not by management objects." A pointer can be set from an exclusive management object to a normal object.

FIG. 2 shows an example of an object tree. The a0 list head 203 corresponds to a0 object 201. In order to express this relation, an address of a0 list head 203 is set to pointer (object set pointer 503) held by a0 object 201. In the following, "list head corresponds to an object" means that the address of the list head is set to the pointer (object set pointer 503) held by the object. The list, that starts from a0 list head 203, accommodates a1 object 204 and a2 object 205. This list is the object set 202 corresponding to the a0 object. The "a1 object" 204 corresponds to the a1 list head 207. A list starting from this list head accommodates a3 object 208, a4 object 209 and a5 object 210. This list is the object set 206 corresponding to a1 object 204. The "a2 object" 205 corresponds to the a2 list head 212. A list with this list head accommodates a6 object 213. This list is the object set 211 corresponding to the a2 object 205.

A minimum structure of an object tree is one-leveled. An example of an object tree with the minimum structure consists of only a0 object 201 and the corresponding object set 202. Though FIG. 2 shows a two-leveled structure, it is possible to add other levels if necessary. The tree can be a structure with a different number of levels for each branch. An example is the tree structure without object set 211 corresponding to a0 object.

Section 3.5.2 Object Identifier

Each object in the object tree has data to distinguish itself from the other objects. This data is called an "object identifier." The object identifier could be either a character string (i.e. name of object) or a number. It is possible to introduce a new variable as an object identifier. This variable can be set to a character string, or number. It is also possible to use a variable that already exists as an object identifier.

Providing a unique name to each object set that accommodates objects, means that a combination of object identifiers can identify a specific object. In FIG. 2, object identifier is the name assigned to each object. Combination (a0, a1, a5) identifies a5 object 205.

In the example of FIG. 2, the object's name is unique among all objects. It is Possible to use the same name for different objects that belong to different object sets without any trouble, if we use a combination of object identifiers to identify an object. For instance, even if the name of a6 object 213 is changed to "a5", (a0, a2, a5) identifies a6 object 213 and (a0, a1, a5) identifies a5 object 210. There is no confusion between a5 object 210 and a6 object 213, because of the difference in combinations of the object identifiers.

When using the same object identifier (name in FIG. 2) in one object set, plural objects can be identified by a combination of object identifiers. The same identifier in one object set may be acceptable, depending on the Purpose of application or the design principles, such as to treat all objects of the same object identifier in exactly the same manner.

It is possible to omit the character string "a0" to specify an object in an object tree, since any combination for the object in FIG. 2 starts with a0. For example, a5 object 210 can be identified by (a1, a5). Moreover, it is possible to omit a0 object 201 itself from the object tree. However, the structure starting with a0 list head 203, which corresponded to a0 object 201, should be left. FIG. 3 shows an object tree without the root object (object equivalent to a0 object 201 of FIG. 2).

Section 3.5.3 Pointer Retention, Reproduction and Transmission

The previous section explained that a combination of object identifiers can identify an object. If there is a procedure that converts a pointer to a continuation of object identifiers, it is possible to substantially retain pointer data by outputting a series of object identifiers to a storage medium. It is possible to retain and transmit a series of object identifiers that identifies the object pointed to.

Moreover, it is possible to reproduce a pointer by reading the retained pointer data, if there is a utilizing procedure to identify an object by a combination of object identifiers. It is possible to reproduce a pointer whenever necessary, if we have data to identify the pointed object. By transferring a combination of object identifiers, it is possible to virtually transmit and reproduce pointers.

The procedure reads-in data from a file in storage medium or data from other computers, and reproduce an object tree while reproducing objects. The procedure reproduces the object tree, coupling each management object and each object set to be managed by the management object.

Pointer data expressed as a continuation of object identifiers is called "translated pointer data" 402 and is handled together with the pointer. A pointer to be retained, reproduced and transmitted should be associated with "translated pointer data" 402. FIG. 4 shows an example. Translated pointer data 402 is combined with the pointer 401, which is the subject of retention, reproduction and transmission. This is the pointer structure 406. This structure can be defined as a class. Translated pointer data 402 consists of a series of object identifiers, from the first object identifier 403 to the n-th object identifier 405 in FIG. 4.

When a pointer to an object accommodated in the object tree is retained, a procedure is invoked to output translated pointer data that is a series of object identifiers to identify the pointed object. The procedure reads this data and holds it as translated pointer data 402. In the pointer structure 406 of FIG. 4, translated pointer data 402 holds the list structure that keeps the order of object identifiers.

It is convenient to set no value for pointer 401 immediately after reading translated pointer data. That is, the value of pointer 401 should kept as zero. Generally it is always possible to obtain a pointer value from translated pointer data, after the pointed object is reproduced in the object tree. However, it is a complicated job to check for every pointer whether or not the pointed object is already reproduced. After a whole object tree is reproduced, it is also possible to obtain all pointer values. Please note that the whole (in actual fact, most) of the object trees are reproduced if all of the pointer structure is converted to pointers. This is inconvenient from the point of view of reproducing only necessary parts of the object tree.

It is possible to achieve the goal of reproducing only necessary parts of an object tree, if the translated pointer data is converted to a pointer at the time of using the pointer. A detailed procedure is as follows. When finding out that the value of pointer 401 in the pointer structure is set to zero, the procedure traces objects in the object tree by using a series of identifiers and identifies the pointed object. The address of this object is the value of the pointer to be obtained. After setting this address to the pointer, the procedure can access the pointed object efficiently.

It is possible to omit pointer 401 from the pointer structure 406 and to introduce a procedure to search for the object in the object tree whenever the pointer is necessary. This reduces the memory size down to the limit.

If an object tree is reproduced in another computer and a series of object identifiers are sent to this computer, a copy of a pointer can be made by this computer. That is, it is possible to transfer a pointer without logical contradictions.

Even if there is no procedure to retain pointer data, it is possible to set a pointer by reading a series of object identifiers written by editor software to a file in storage medium. It is also possible to obtain a pointer from a series of object identifiers input by am operator through an input interface.

Section 3.4 showed problems in the former technology in the method of retaining and reproducing pointers. These problems exist in the case where plural pointers specify a single object (FIG. 1(2)), the case where a single pointer has the possibility of pointing to plural objects (FIG. 1(3)), and the case in which this two situations are mixed. Even for such cases, it is possible to retain, reproduce and transmit pointers without any problem, by introducing an object tree and converting the pointer to translated pointer data.

Section 3.6 Object Retention, Reproduction and Transmission

It is possible to retain, reproduce and transmit a pointer that points to an object accommodated in an object tree, by introducing an object tree and object identifiers. In other words, if there is a pointer to be retained, reproduced or transmitted, the pointed object should be accommodated in the object tree. In addition to the introduction of the class identifier in Section 3.3, these techniques make it possible to retain, reproduce and transmit objects including a pointer.

In order to retain object data, the procedure outputs a class identifier, object identifier and other content data, such as a character string, integer value, real number value, and so on. For the pointer to an object accommodated in an object tree, the procedure outputs the translated pointer data, that is a combination of object identifiers, and designates the pointed object. The procedure first outputs object data to a file and sends it by a communications circuit or by storage medium such as FD. It is also possible to send content of main memory directly through a communications circuit.

In order to reproduce objects from the data, the procedure reads-in the data from the file (or from other computers or from storage medium such as FD). Through this procedure, the object tree is also reproduced.

The procedure reads-in translated pointer data that is a series of object identifiers, and keeps it in conjunction with the pointer. For instance, it is recorded as translated pointer data of a pointer structure. Translated pointer data is also converted into a pointer, when the application program needs this pointer.

Section 3.7 Efficient Search

The search procedure of an object-oriented database takes a massive amount of time, since it has to search all objects to find specific objects satisfying assigned conditions. It is possible to prepare a group of objects satisfying some conditions, in order to reduce search time. However, this requires an additional preparation procedure and memory to keep the results.

On the other hand, the present invention accommodates objects in an object tree. It is possible to gather objects with a high possibility of being in the range of one search, and put them in to a single set. This simplifies the search.

If objects in object set 206 corresponding to a1 object in FIG. 2 were to be searched, first a1 object 204 is identified by the combination (a0, a1) and a1 list head 207 is found. Next objects linked to a1 list head 207 are sequentially fetched and investigated. Here, the object tree structure that accommodates objects is also utilized to limit the range of the search. This is a good point of the present invention compared with an object-oriented database. Efficient search is realized without either additional procedures or memory. These overheads would normally be expected for an object-oriented database that is designed for general use.

The key to accomplishing simple and efficient (that is high speed) searching is to collect objects, that have high possibilities of being in one investigation range, into a single set. In many cases, by analyzing an application, it is easy to find out the object set with a high possibility of being in one investigating range.

For instance, an application, which deals with models of communications networks, often searches all communications links of an assigned communications network. Sometimes it searches all nodes of a communications network. FIG. 3 shows an example of arranging these groups as sets.

The list head 301 of FIG. 3, the root of the object tree, accommodates Network object 302 named "X communications network" and Network object 303 named "Y communications network." The list head 304, that is corresponding Network object 302, accommodates a Network management object named "Link management" 305 and a Network management object named "Node management" 306. The head 311, that is corresponding to Network management object 305, accommodates Link object 312 named "Tokyo⇋New York," Link object 313 named "New York⇋London" and Link object 314 named "London ⇋Tokyo." The list head 307, that is corresponding to Networ management object 306, accommodates Node object 308 named "Tokyo," Node object 309 named "New York" and node object 310 named "London".

Since the root object (i.e. a0 object 201 in FIG. 2) of the object tree of FIG. 3 is omitted (See Section 3.5.2), the series of object identifiers to identify the object in the object tree start with "X communications network" of Network object 302 or "Y communications network" of Network object 303.

When investigating all link objects of X communications network, first, network management object 305 of name "Link management" is identified by the combination ("X communications network" and "Link management"), and then the corresponding list head 311 is designated. After that, link objects following this list head are investigated in order.

When investigating all link and node objects of X communications network, first, Network object of name "X communications network" is identified by the combination ("X communications network"). Then network management objects and objects contained in them are all investigated. This makes the search easy if the target objects to be investigated are gathered in a certain branch of object tree.

When searching link objects of all communications networks, the procedure can trace the object tree by Depth First Search. When network management object of "Link management" is reached, the corresponding object set is investigated, and the search moves to the next branch. When network management object of "Node management" is reached, the search for this branch is skipped and the search moves to the next branch again.

Section 4 Technology to Reproduce only Necessary Data

Sometimes a huge quantity of memory is required to reproduce all related objects in main memory, to read-in object data recorded in storage medium or object data held by another computer. It is convenient just to reproduce the minimum objects necessary for the immediate procedure and then increase objects reproduced according to the development of the procedure.

The following sections shows ways of reproducing only the necessary part of an object tree and increasing it according to the requests, instead of reproducing the whole object tree at once.

Section 4. 1 Partial Read-in of Object Tree

Suppose all data of the object tree in FIG. 2 are recorded in file F, and suppose the first procedure stage of an application program needs only a1 object 204 and a2 object 205, which are managed by a0 object 201, and a0 object 201. In this case, this application program reproduces only a0 object 201, a0 list head 203, a1 object 204 and a3 object 205 and ignores other data while reading file F.

Assume translated pointer data is (a0, a1, a5). The procedure traces a0 object and a1 object on the object tree, to find the pointed object. While trying to identify a5 object, the procedure realizes that there is no branch of object tree beyond a1 object so the procedure reads-in file F again and reproduces the branch beyond a1 object. After this, the procedure identifies a5 object and gets the address of a5 object, which is the conversion result of the translated pointer data (a0, a1, a5). Here, data beyond a2 object are ignored again.

It is possible to assign how far the object tree should be reproduced when reading-in file F, such as a level number to be reproduced ahead.

Section 4.2 File Division

It is possible to divide a file, to which the procedure outputs data of object tree, into files consisting data to be read-in at one time. This makes the read-in procedure simple. An example using FIG. 2 is as follows. The "data of a1 object 204 and a2 object 205 are stored in file F0." The "data of a3 object 208, a4 object 209 and a5 object 210 to File F1" and "data of a6 object 213 are stored to File F2."

The first step of reproducing the object tree is to make only a0 object, which is a management object 501. The file assignment data 504 of this management object is set to file F0 assigned from the outside. While obtaining the pointer from the translated pointer data (a0, a1), the procedure reads F0 and reproduces a1 object 204 and a2 object.

To describe details of a1 object 204 at this moment, FIG. 5 shows the structure of the management object. Management object 501 comprises "object set management data" 502, which is data as a management object, and "individual object data" 505, which is data as a normal object. "Object set management data" 502 comprises "object set pointer" 503, "file assignment data" 504, "read-in settled flag" 507, modified data flag" 508 and "child object existence flag" 509. The "object set pointer" 503 is set to the address of the corresponding list head 506 when this list head is generated, though the initial value of this pointer is zero. The object set pointer 503 of a1 object in FIG. 2 is set to the address of a1 list head 207 when this list head is generated.

Immediately after the file F0 is read in, "a1 list head 207" does not exist and the value of "object set pointer" 503 of a1 object 204 is zero. Here, "file assignment data" 504 is set to indicate file F1, which has object data beyond a1 list head. This file assignment data belongs to a1 object, and is a part of data recorded in file F0. The "read-in settled flag" 507 is off (initial value), since no data in file F1 is read-in yet.

The "modified data flag" 508 is also off, because any data which is read-in from the file indicated by file assignment data 504 has not been modified. This flag is used to determine whether or not the management object should be registered in the object list to be output (Section 0.5.5.1).

"On (Yes)" or "off (No)" of "Child object existence flag" 509 indicates the presence of child objects. It is used to control the read-in procedure, when there is no file assignment data (Section 5.6.4.).

Assume translated pointer data is (a0, a1, a5). The procedure traces a0 object and a1 object of the object tree to designate the pointed object and realizes that the value of object set pointer of a1 object is zero. Judging that there is nothing more on the object tree, the procedure first generates a1 list head 207 and sets this address to the object set pointer 503. Next, the procedure opens and reads file F1, which is assigned to file assignment data 504 of a1 object 204, and sets the "read-in settled flag" 507 to on. Read-in settled flag 507 will be used by "procedure to generate and accommodate new object" of section 5.4. Since data of a3 object, a4 object and a5 object are recorded in file F1, these objects are reproduced and accommodated in the list starting from a1 list head 207. The "child object existence flag" 509 of a1 object is also set to on.

Similarly, a2 object has file assignment data of F2. When obtaining a pointer from translated pointer data (a0, a2, a6), the procedure reads in F2 file and reproduces the object tree beyond a2 object.

Assume that only a0 object exists, and a procedure to obtain a pointer from translated pointer data (a0, a1, a5) is invoked. During this procedure, file F0 and file F1 are read in and "object set 202 corresponding to a0 object" and "object set 206 corresponding to a1 object" are reproduced.

A procedure outputting the content of the object tree is invoked with a management object assigned. There are three concrete procedures shown.

The first procedure is as follows. When a0 object 201 is assigned, file F0 designated by its file assignment data 504 is opened and data of objects managed by a0 object is output. Suppose that another file assignment data 504 (file F1) is found, while the content of a1 object is output to file F0. Data of the objects (following a1 list head) managed by a1 object is output to F1, which is another file opened. Also, data of objects managed by a2 object is written into file F2. If the file to be written is into is on another computer, data is sent to this computer and an output procedure to the file of the computer is invoked.

Suppose that different file assignment data 504 (file F1) is found, while the content of a1 object is output to file F0 in the above procedure. The a1 object is registered to the object list 1501 to be output. The procedure outputting the content of the object tree is invoked again with registered management objects.

The third procedure is as follows. This procedure first searches the object tree and registers management objects, that should be assigned to the output procedure, in the object list to be output 1501. Registered management objects are assigned in order and the output procedures for the content of object tree are invoked. Here, if the procedure encounters different file assignment data 504 (file F1), it skips the output of the corresponding object set. The details will be shown in Section 5.5.

Section 4.3 Timing for Converting Translated Pointer Data into a Pointer

In the case of reproducing only necessary parts of an object tree, it is advisable to invoke the procedure to convert translated pointer data into a pointer when the pointer becomes necessary for the application program. If all translated pointer data are developed at one time in the first stage of the procedure of application program, it will reproduce the whole (or most) of the object tree at one time.

Section 4.4 Part release of Object Tree

When the main memory is insufficient, a less frequently used part of the object tree should be output into a file and released (deleted) from main memory. As a result of this release, all branches ahead of the designated object set of the object tree will be released.

Releasing a1 list head 207 and the following, data of a3 object 208, a4 object 209 and a5 object 210 are written down to file F1 that is specified by file assignment data 504 of the content of a1 object 204. If "modified data flag" 508 is off, there is no need to output because the content of file F1 has not been changed. Also, all objects following a1 list head 207 are released, and object set pointer 503 is set to zero.

Furthermore, the pointer structure 406 pointing to a released object (a3 object 208, a4 object 209 or a5 object 210) is initialized. That is, pointer 401 is set to zero. If translated pointer data 302 is empty, it should be set before releasing a1 list head and subsequent items.

The usage frequency of objects and object sets could be good information for deciding which part of object tree should be released. If the file is divided, the usage frequency of each file should be observed. Another method is to release parts of the object tree, disregarding the usage frequency.

If the file is not divided, there is one file retaining the data. The procedures mentioned above still can be applied, if parts of the object tree to be released are determined beforehand.

Section 4.5 File Dispersion on the Network

If computers are connected by a communications network, files containing object data can be dispersed over multiple computers. For example, file F0 is in computer A, file F1 is in computer B having a domain name www.atele.com, for example, and file F2 is in computer C. In order to use them in computer D, it is necessary to inform computer D that file F0 exists in computer A.

One example of this assignment is "http://www.atele.com/abc/F1". This shows that there is a file designated by the path "/abc/F1" in the computer designated by the domain name www.atele.com and the content of this file is transmitted by http communications protocol (running on the default port number for http). Indication of a file is generally composed of data that designates a computer (domain name, etc), and data that designates a file in the computer (file path, etc). The procedure (http, etc) that transmits information can be added in this assignment.

Assume that object assignment is the same as Section 4.2. The file assignment data 504 of a1 object 204 is "http://www.atele.com/ abc/F1" at the time of reading file F0. At the time of converting translated pointer data to a pointer, contents of the assigned file are read and used for reproducing an object tree.

When writing out the contents of the object tree to a file, or when reading in the file, access authorization will be important. A UNIX computer can assign various kinds of permission data to files and control writing and reading. For example, suppose that object tree in FIG. 2 is reproduced on computer D and a5 object 210 is changed. Or, suppose that a7 object is added to a5 object 210. To save these changes, the procedure checks the file assignment data 504 of a1 object 204 and there it finds that "http://www.atele.com/abc/F1" is set. The procedure asks the computer "http://www.atele.com", about writing permission to "/abc/F1". If this writing is prohibited, the procedure has to abandon the output.

If the procedure cannot abandon the output, it writes to another file using the following procedure. File assignment data 504 of a1 object 204 is changed to another file pass in computer D, such as "/at1/abc/F1-new". The procedure outputs the data to this file. If the application program generates file F1-new, (usually) there is no problem to write in this file.

Since the content (file assignment data) of a1 object changes at this time, it is necessary to pay attention to the fact that the data to be output to file F0 also changed.

It is also possible to output the data to the file of another computer using handling permissions. The http procedure is a procedure that fetches and sends (and receives) data and has no procedure assigned as to how to write into a file. It is therefore necessary to invoke an exclusive writing procedure in the computer that holds the target file. It is also possible to reconstruct the http communication program and add function output to files.

BRIEF DESCRIPTION OF THE DRAWINGS

FIG. 30: Explanation of three-dimensional space conjunction.

DETAILED DESCRIPTION OF THE INVENTION

Section 5 Embodiment of Object Management Method

Section 5.1 Structure of Computer

Figure 6:
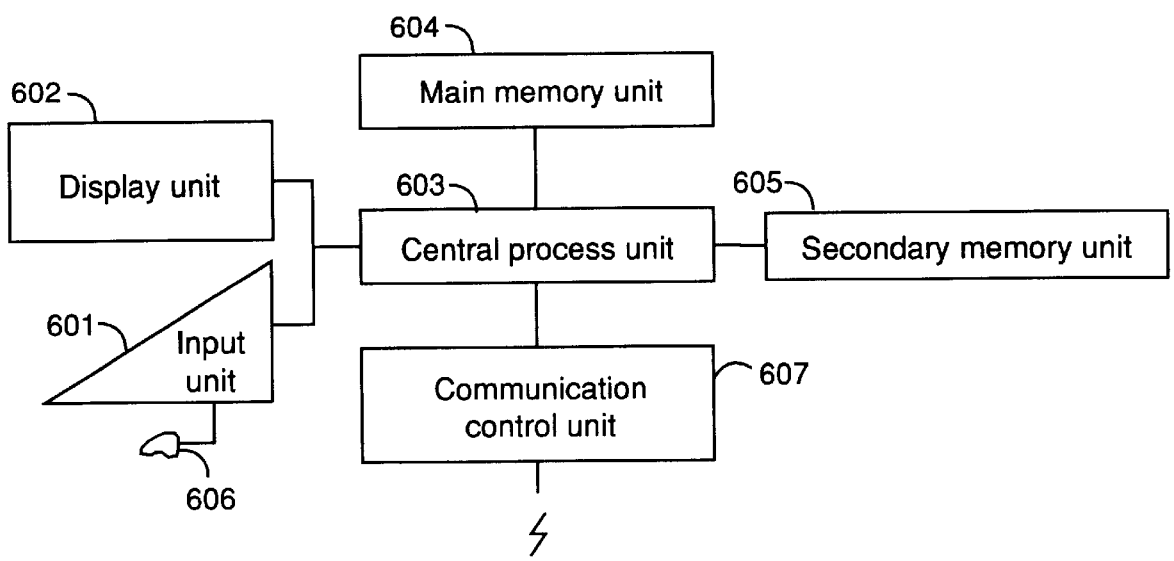
FIG. 6: General structure of computer on which a program that has accomplished the object management method runs.

A typical embodiment of an object management method is a computer program. FIG. 6 shows a general computer structure. An instruction input through an input unit 601 is analyzed in the central processing unit 603 and the instructed procedure will be executed. As a result, an object is generated in a (main) memory unit 604, and a pointer to the object is set.

The object data and translated pointer data, that is sequence of object identifiers, in main memory unit 604, are written out to a secondary memory unit 605. In some cases, these data are displayed on the display unit 602 without recording to the secondary memory unit 605, or these data are transmitted to another computer by a communications control unit 607. There are other cases where they are temporarily recorded in a secondary memory unit and displayed on the display unit 602 or transmitted to another computer through the communications control unit 607.

On the contrary, the central processing unit 603 reads in translated pointer data and object data in the secondary memory unit 605, and reproduces objects and pointers corresponding to them in main memory 604. Also, there are some cases where objects and pointers are reproduced in the main memory unit using data input through the input unit 601 or data from other computers through the communications control unit 607.

The communications control unit 607 is not necessary in the case where other computers are not directly involved in retaining and reproducing objects, such as cases without a reading-in file directly from other computers. It is possible to exchange data with other computers using FD (Floppy Disk) or some other kind of medium.

Section 5.2 Overall Structure of the Program

Figure 7:
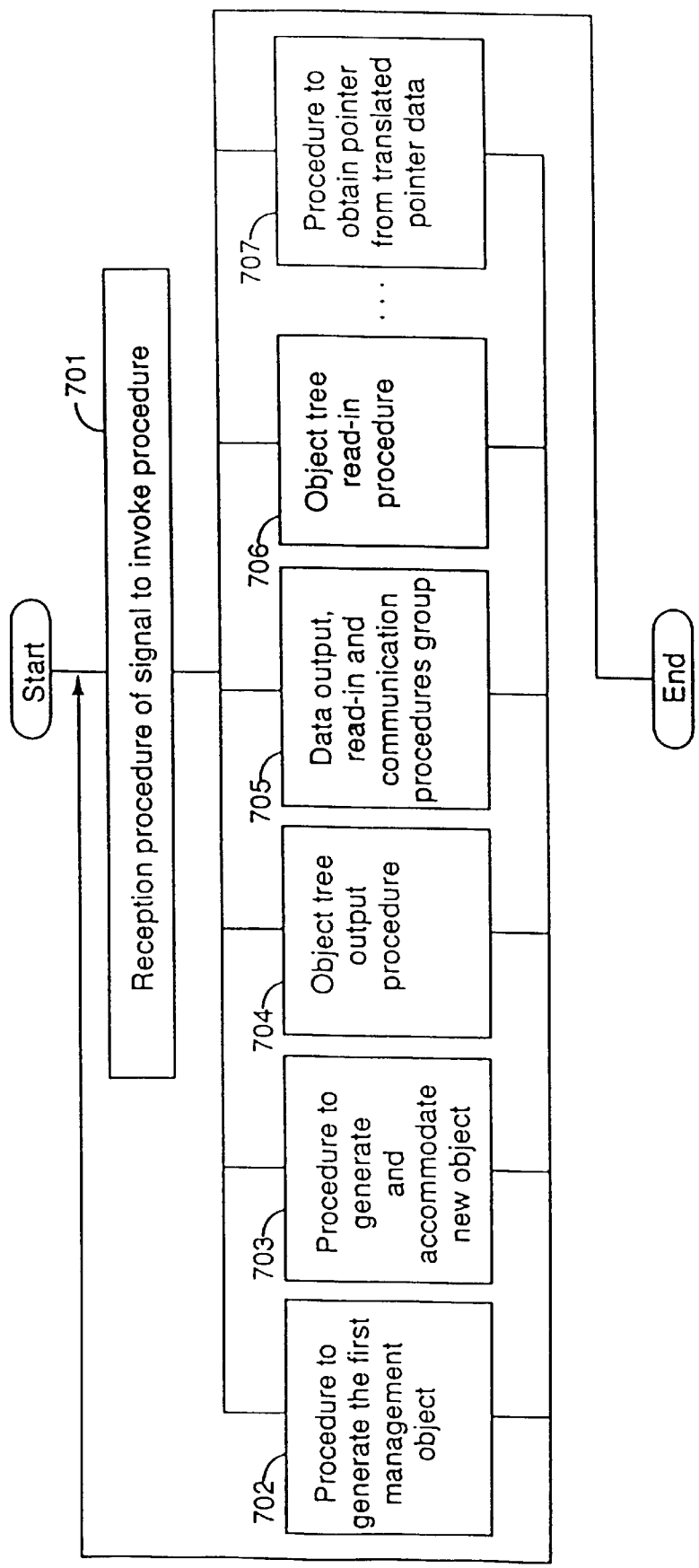
FIG. 7: Overall structure of program implementing the object management method.

FIG. 7 shows the structure of the program that executes the object management method of the present invention. This program is an event driven program, which analyzes signals (events) from the input unit 601 or the communications control unit 607 using "procedure invoke signal receiving procedure" 701, and invokes the procedure corresponding to this signal (event). In the case where other signals (events) come from these procedures, these signals are analyzed by the "procedure invoke signal receiving procedure" 701 and procedures corresponding to these signals are invoked.

Many procedures can be invoked according to the purpose or structure of the application program. However, this description explains the following procedures that are necessary to explain the present invention. "Procedure to generate the first management object" 702. "Procedure to generate and accommodate new object" 703. "Object tree output procedure" 704. "Data output, read-in and communication procedures group" 705. "Object tree read-in procedure" 706. "Procedure to obtain pointer from translated pointer data" 707.

Section 5.3 Procedure to Generate the First Management Object

Figure 8:
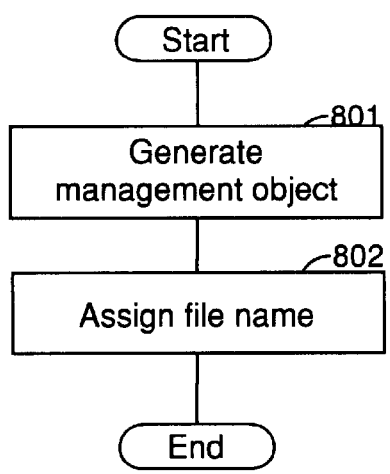
FIG. 8: Details of procedure for generating the first management object.

FIG. 8 shows details of the "procedure to generate the first management object" 702 of an object tree. First, "generate management object" 801 is carried out. A management object has "object set management data" 502. A step to "Generate management object" 801 reserves memory expressing this object. This memory address is recorded (in a variable, etc) in preparation for future access to the object tree. The object set pointer 503 is zero at this time. File assignment data 504 is not set, and "read-in settled flag" 507, "modified data flag" 508 and "object existence flag" 509 are all off.

The file name is set to file assignment data 504 of object set management data 502 of this management object, in order to reproduce an object tree following the management object by reproducing objects recorded in the file. If this file is in another computer, the assignment includes designation of the computer (e.g. http://www.atele.com/abc/F1). An "object tree read-in procedure" 706 is also invoked. At the end of this procedure, the "read-in settled flag" 507 is turned on.

The "Procedure to generate and accommodate new object" 703 is invoked, when new objects are added to this management object.

Section 5.4 Procedure to Generate and Accommodate New Object

"Procedure to generate and accommodate new object" 703 is a procedure which generates a new object and accommodates it in the object tree. Here, the first management object should already exist in the object tree. At the start of this procedure, there may be objects that are accommodated by "procedure to generate and accommodate new object" 703 or "object tree read-in procedure 704".

Figure 9:
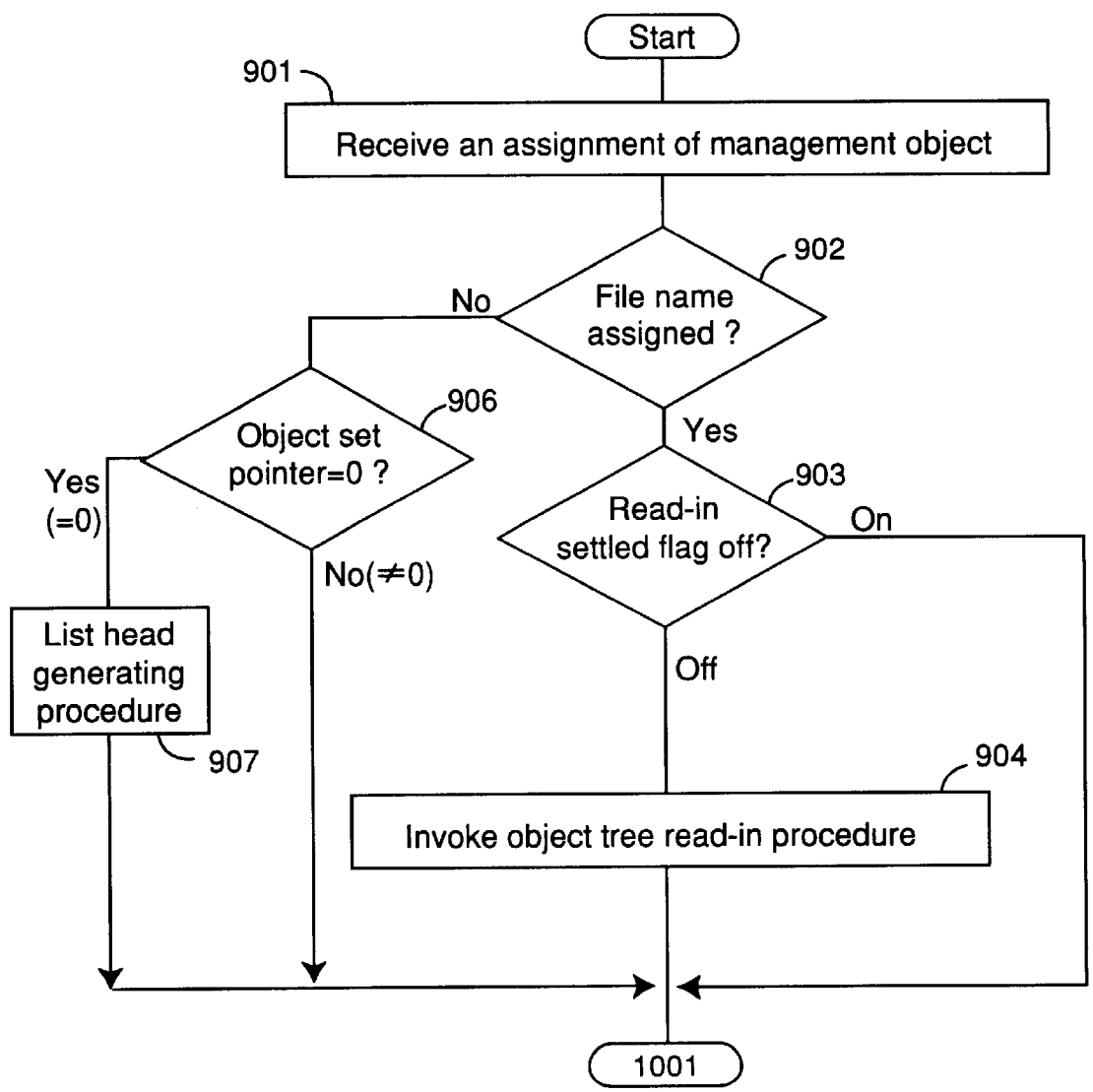
FIG. 9 and FIG. 10: Details of procedure for generating and accommodating new objects.
Figure 10:
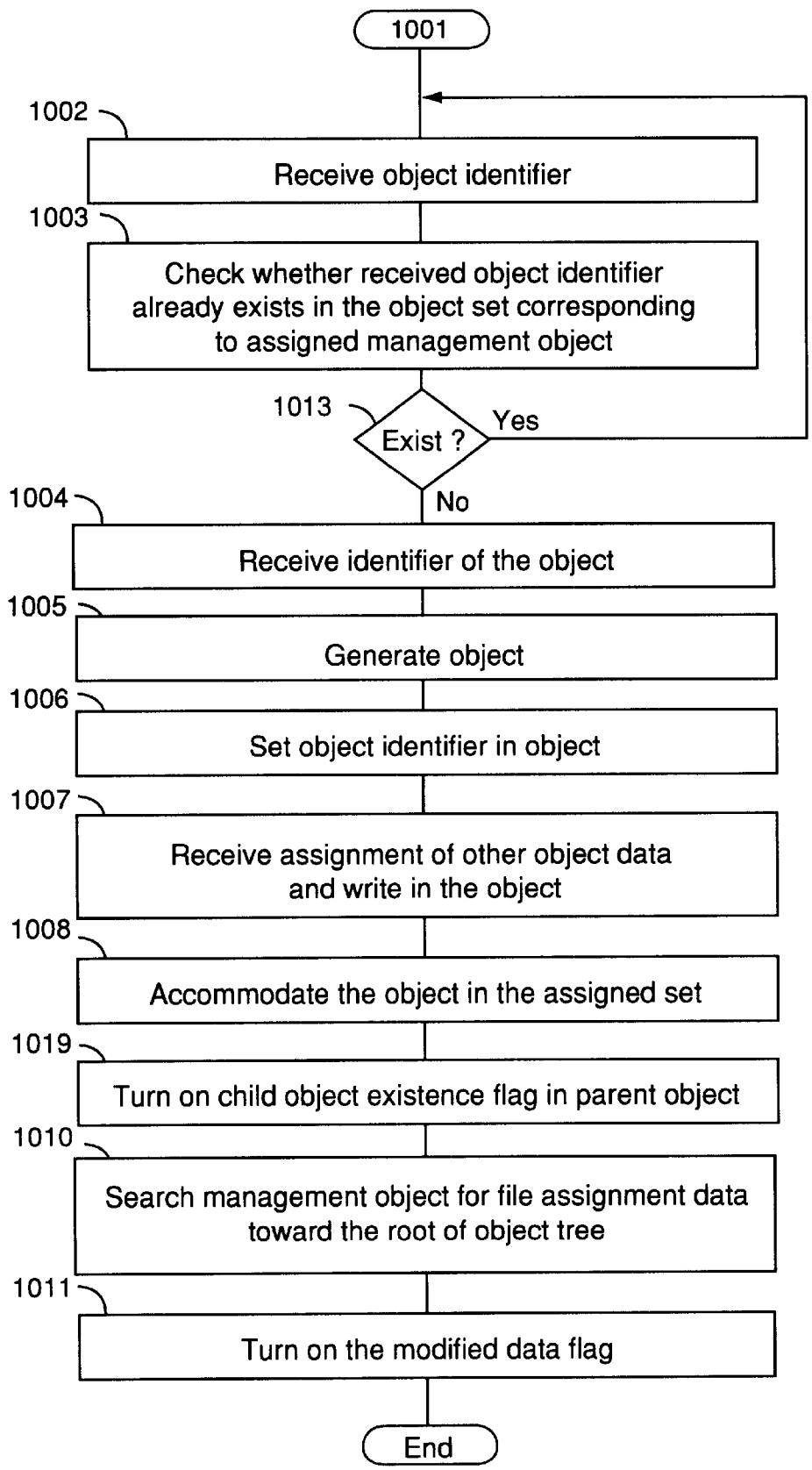

FIG. 9 and FIG. 10 show details of a "procedure to generate and accommodate new object" 703. A management object designates an object set, which accommodates a newly generated object. First, "receive assignment of management object" 901 is carried out. The following describes a procedure to add a3 object when there is no object in object set 206 corresponding to a1 object 204 in FIG. 2. Here, a1 object 204 is assigned as a management object. It is possible to do this assignment by assigning the memory address of a1 object. This assignment can also be done by translated pointer data (a0, a1) which designates a1 object. The object address can be obtained using a "Procedure to obtain pointer from translated pointer data" 707.

Suppose that "file assignment data" 504, which is in "object set management data" 502 of a1 object, has been set. If a "read-in settled flag" 507 of "object set management data" 502 is off, the procedure "invoke object tree read-in procedure 706" 904 is carried out. "Read-in flag" 507 is set on at the end of this procedure. During the above procedure, object tree data in the file are read in, if they have not been read in yet.

If the read-in settled flag 507 is on, data of the object tree has already been read in. Then, processing moves to the procedure of FIG. 10, skipping the step to "invoke object tree read-in procedure 706" 904, even if the file assignment data has been set. If file assignment data 504 is not set and the value of the "object set pointer" 503 is zero, "list head generating procedure" 907 is invoked and a1 list head 207 is generated. The address of this list head is set to the object set pointer 503.

The next step is to "receive object identifier" 1002. Then, "check whether a received object identifier already exists in the object set corresponding to assigned management object" 1003 is performed. In the above example, a1 object is assigned. It is also checked whether there is an object of the same object identifier as that of the object assigned among objects accessible from a1 list head 207. This check traces objects in order from the list head and compares each object identifier with assigned object identifiers. If the set is a hashed array, only objects of the same hashed number as that of an assigned object should be the subjects of this check. As a result, if the object identifiers are those already existing in the set, then this procedure returns to the step to "receive object identifier" 1002.

If the object identifier is new in the specified object set, the next step is to "receive class identifier of the object" 1004. The procedure to "receive class identifier of the object" 1004 can be skipped in the case where there is only one kind of object to be generated, or the assignment of an object to be generated is specified by program code.

Generally, an application program code specifies a class of objects to be generated, if these objects are generated in the middle of this application procedure. Generating an object using input from an operator, the corresponding class is generally designated in an input analysis procedure of the application program.

Figure 1:
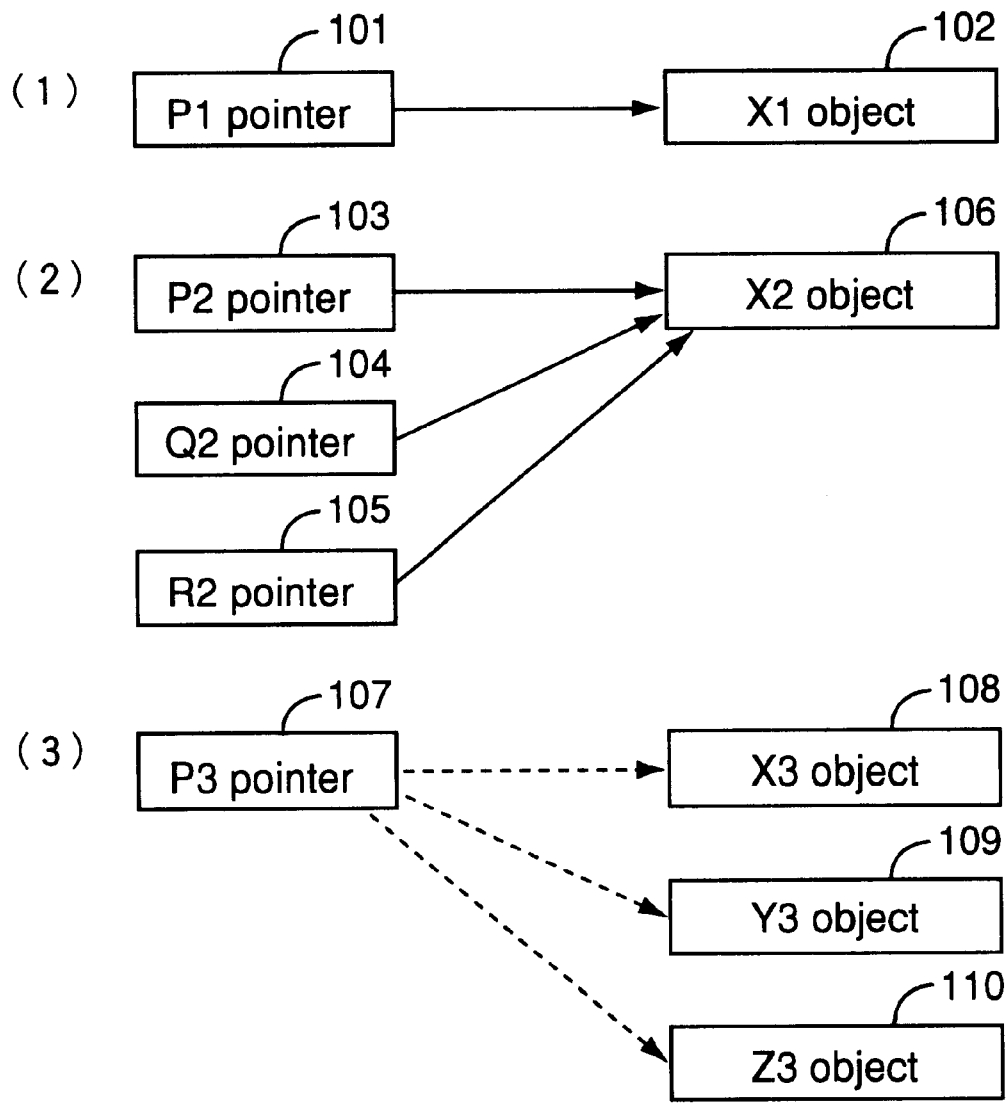
FIG. 1: Usage examples of various pointers.
Figure 2:
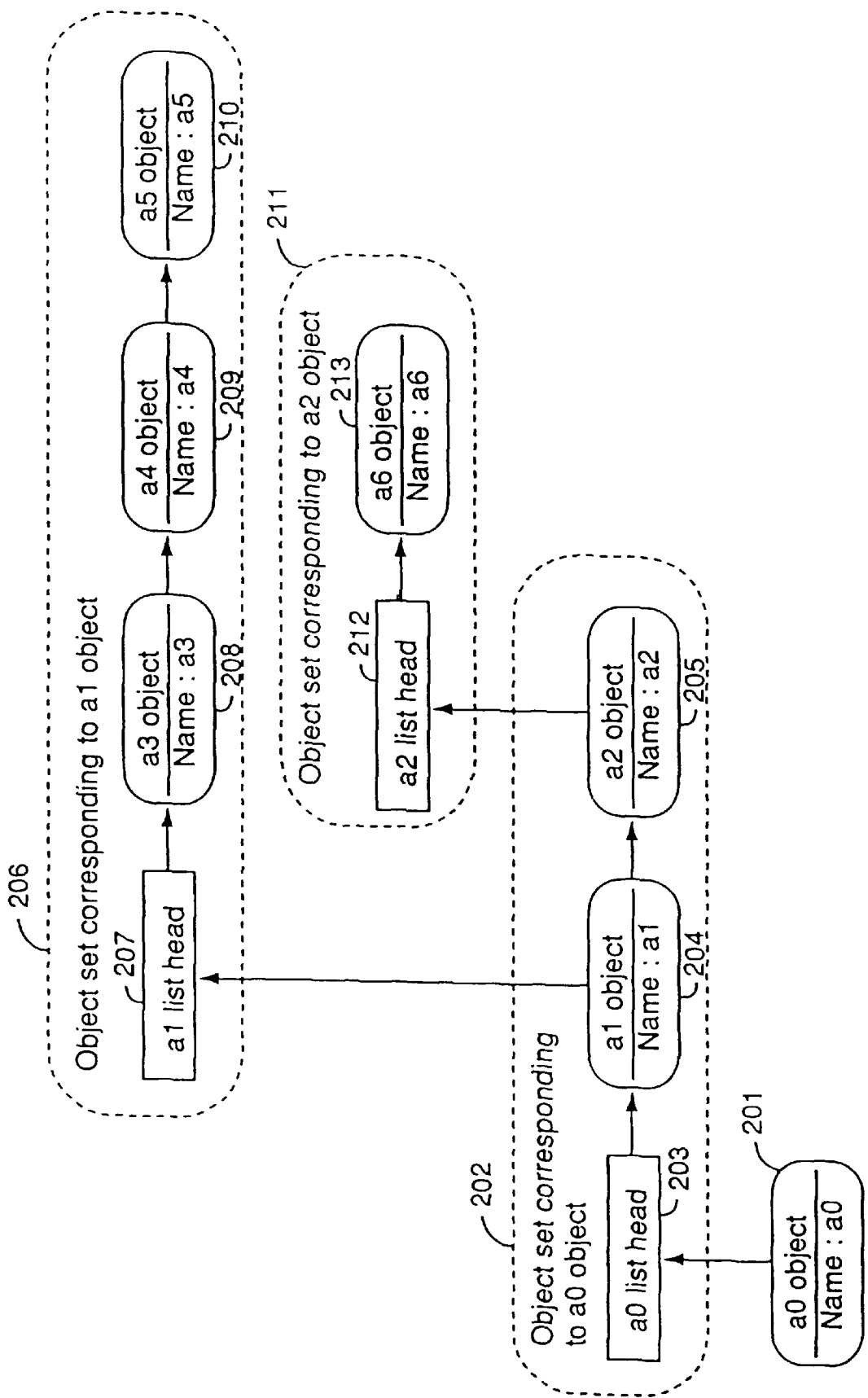
FIG. 2: First example of an object tree.
Figure 3:
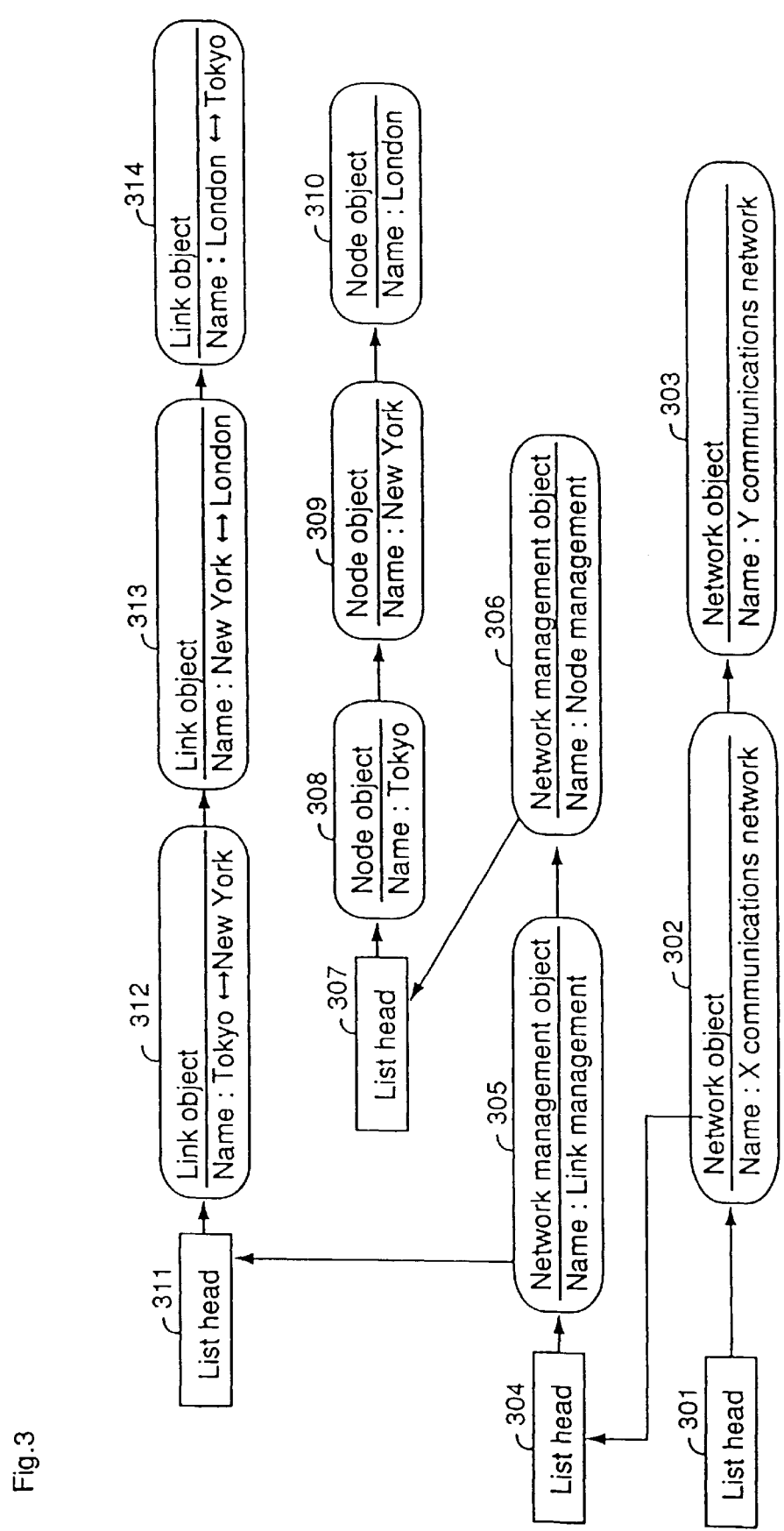
FIG. 3: Second example of an object tree, which includes components of a communications network.

Next, an object is generated utilizing the class identifier of the object (See Section 3.1). This is the step to "generate object" 1005. The step to "set object identifier to object" 1006 sets a name, which has been fetched in the step to "receive object identifier" 1002, to this newly generated object. In the example of FIG. 2, the character string "a3" is set to a3 object 208 as its name.

Object usually has variables such as integer, real number, character string and pointer in addition to the object identifier. An object sometimes contains another object inside. Among these object data, some are set at the time of object generation. This is the step to "receive assignment of other object data and write them in the object" 1007. There are cases, depending upon applications, where a part of or the entire object data are set not at the object generating time but during a procedure that follows.

The procedure "accommodate the object in the assigned set" 1008 is then performed. Thus, a3 object that is newly generated is accommodated just after a1 list head 207 in the example of FIG. 2. This is to copy address of a3 object to a1 list head 207 (pointer) as its value. The object accommodation procedure differs according to a specific accommodation procedure defined for the object set.

Also "turn on child object existence flag" 1019 is performed for the parent object. Finally, "search management object for file assignment data toward the root of object tree" 1010 is carried out. When a3 object 208 is added, it has to be investigated whether a file assignment data 504 have been set to its management object, a1 object 204. If the file assignment data 504 have been set, "turn on the modified data flag" 1011 is carried out for the object (a1 object). If file assignment data 504 is not set to a1 object 204, investigate a0 object, which is the next management object hit by search toward the root.

Section 5.5 Object Tree Output Procedure

The "Object tree output procedure" 704 comprises the "object tree output main procedure" of Section 5.5.1, "object set output procedure" of Section 5.5.2, "object data output procedure" of Section 5.5.3 and "procedure to generate translated pointer data" of Section 5.5.4. The previous procedure invokes the following procedures under normal circumstances.

To write data on another computer (computer B) other than computer A in which the application program is running, procedures of "data output, read-in and communication procedures group" are invoked at both computer A and computer B. Part of "data output, read-in and communication procedures group" will be explained in Section 5.5.1 with the "object tree output main procedure." The remainder will explained in Section 5.6.1 with the "object tree read-in main procedure."

Figure 11:
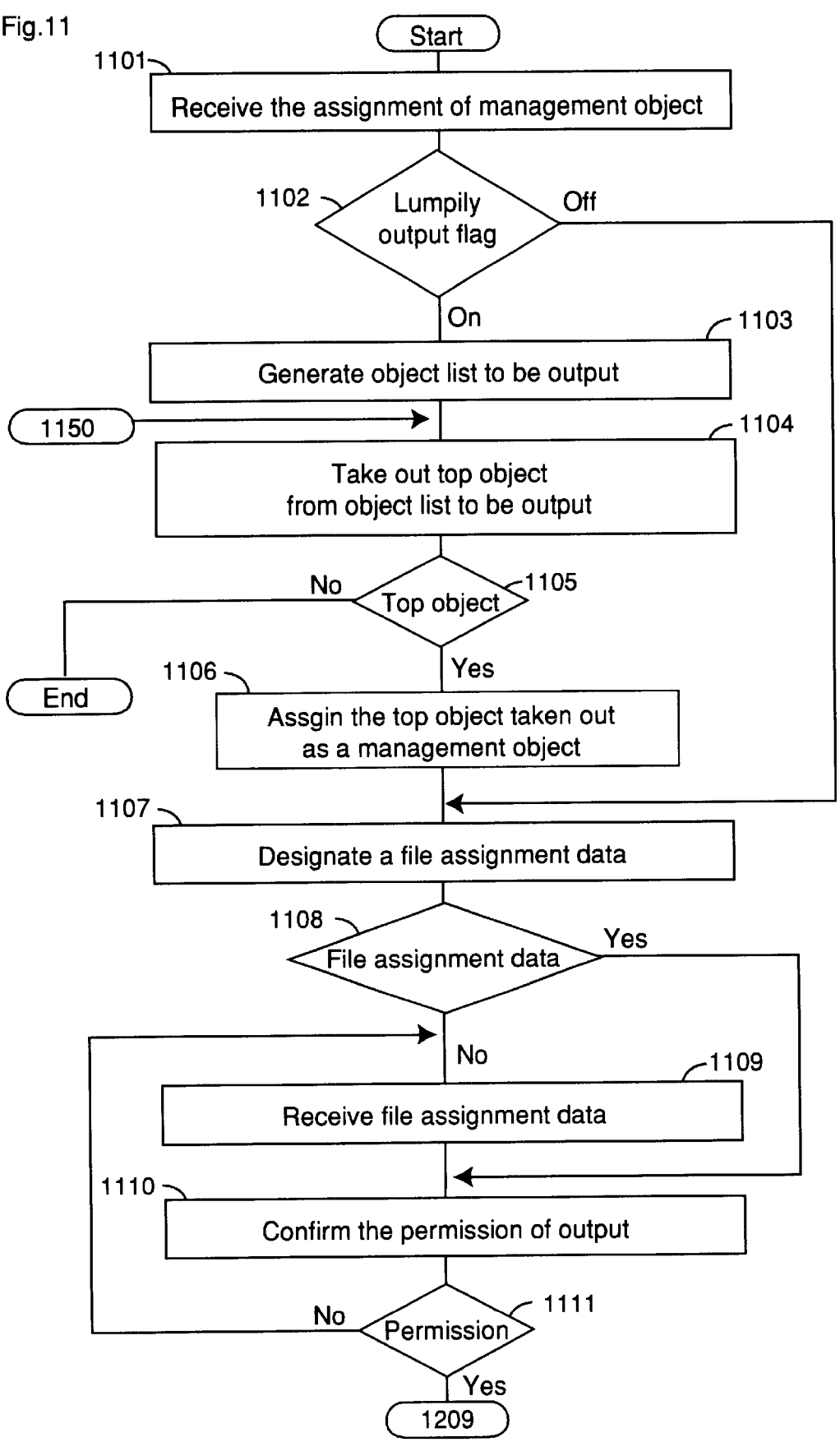
FIG. 11 and FIG. 12: Details of object tree main output procedure.
Figure 12:
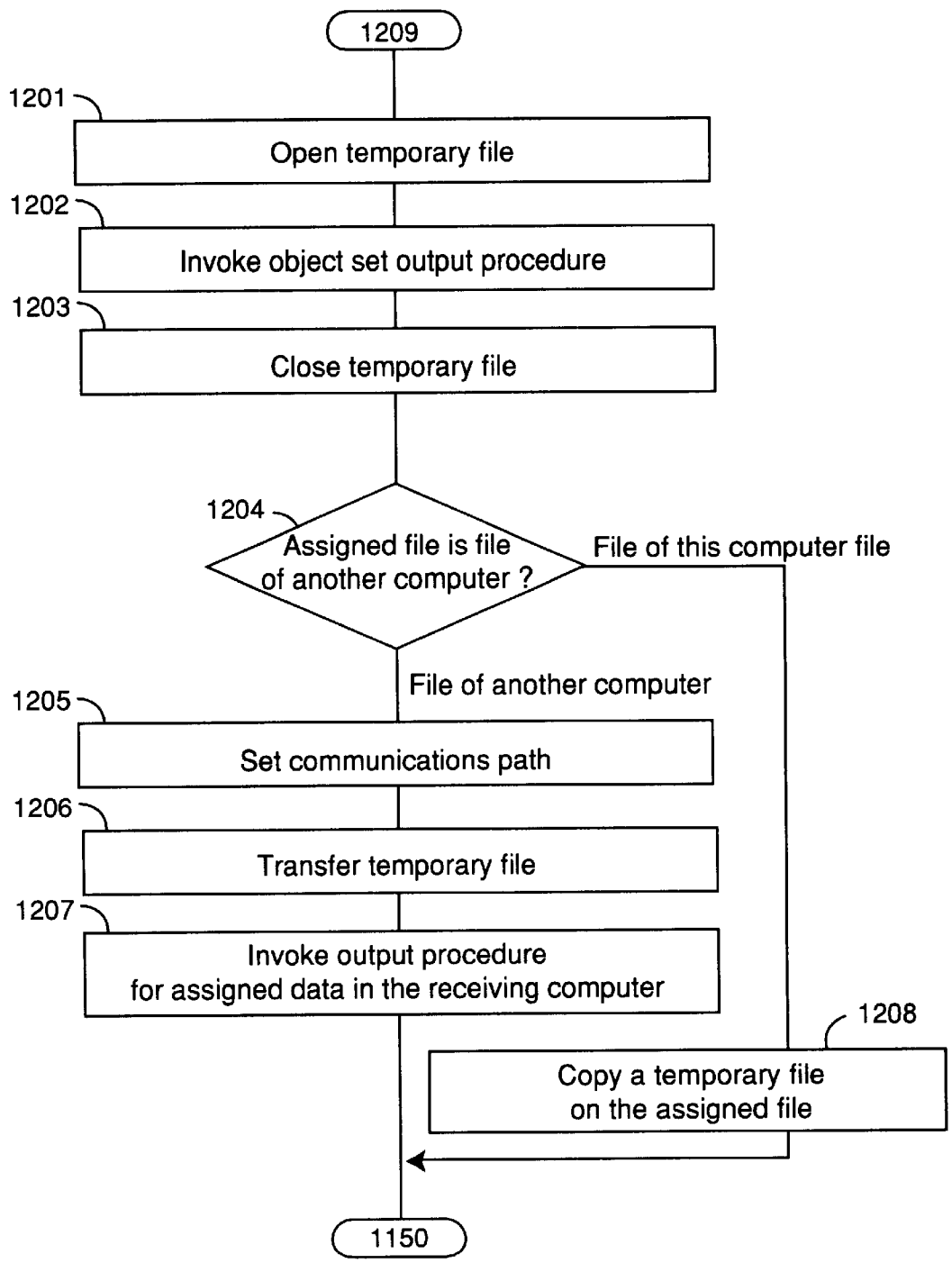

Section 5.5.1 Object Tree Main Output Procedure and Data Output, Read-in and Communication Procedures Group FIG. 11 and FIG. 12 show details of "object tree main output procedure". The first step is to "receive assignment of management object" 1101, which is the target of data output.

Details of the object tree output procedure are different in the following two cases. The first case is where only data (of the object tree) in the range of file assignment data 504, which has been recorded in assigned management object, is output data. The second case is where all data on the object tree following the assigned management object is output (to multiple files). For instance, in the case where part of the object tree has to be deleted in order to reduce the amount of main memory in use, it is necessary to delete that part after outputting all the data following the assigned management object.

The object tree main output procedure of Section 5.5.1 can handle both cases. However, the following explanation assumes the case where all data on the object tree following the assigned management object is output. In this case, "lump output flag" 1301 in FIG. 13, which is a global variable, has to be turned on, before the object tree output main procedure is invoked. This flag indicates that all data following the assigned management object should be output After the step to "receive assignment of management object" 1101 of the "object tree output main procedure" in FIG. 11, check whether the "lump output flag" is on or off. If this flag is off, move to the next step to "designate file assignment data" 1107, with the same management object assigned.

Figure 13:
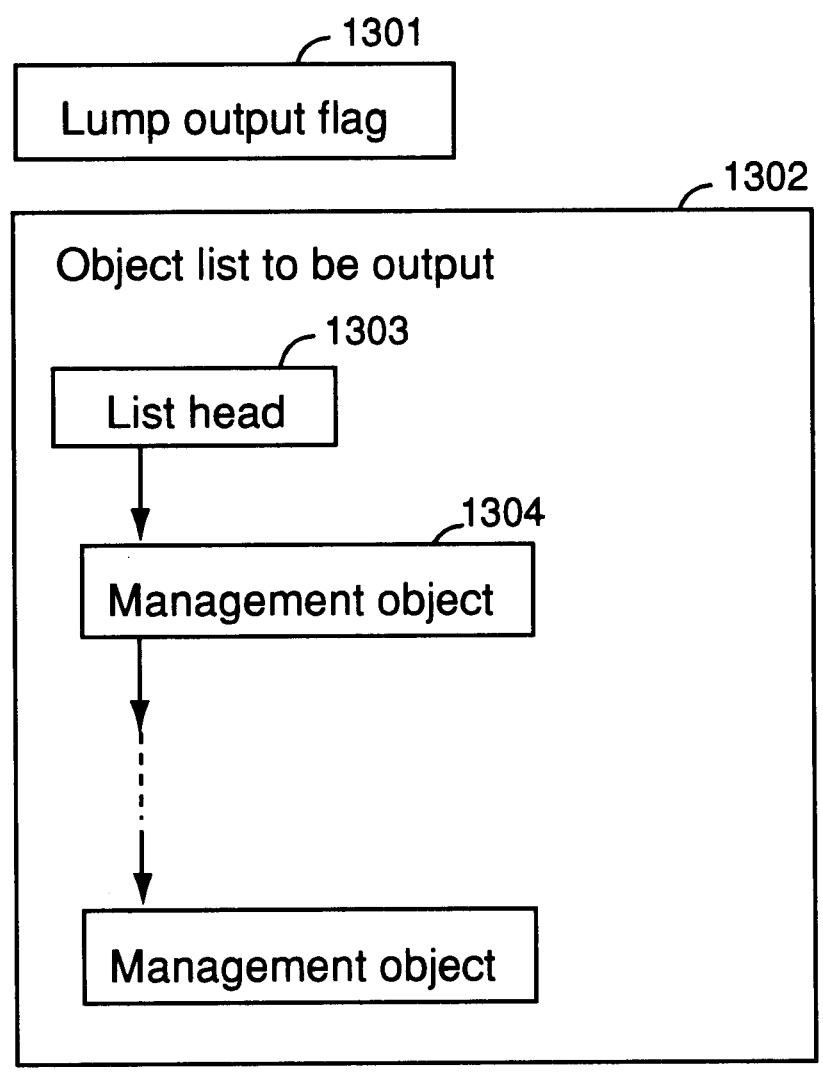
FIG. 13: Structure of object list to be output and lump output flag.
Figure 14:
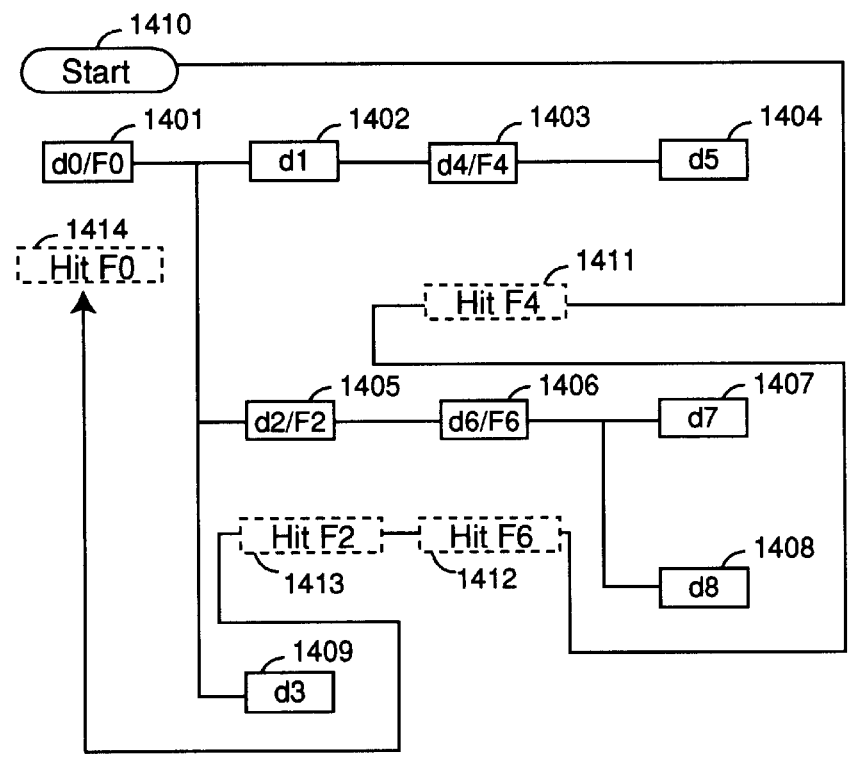
FIG. 14: Explanation of generating object list to be output.
Figure 15:
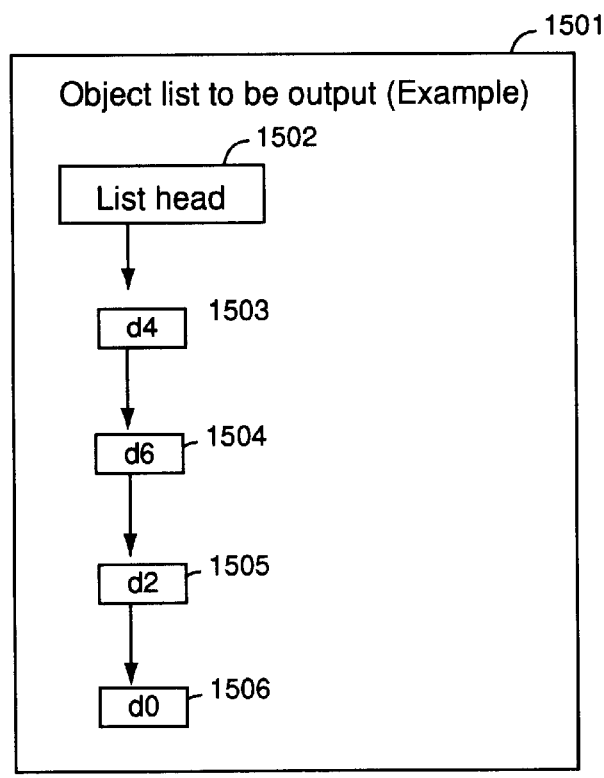
FIG. 15: Example of object list to be output.

If lump output flag is on, first "generate object list to be output" 1103. FIG. 13 shows the structure of the object list to be output. "Object list to be output" 1302 has "list head" 1303, which is a head of the list accommodating (pointers to) management objects. FIG. 14 and FIG. 15 explains the step to "generate object list to be output" 1103.

FIG. 14 shows an object tree composed of d0 object through d8 object. Here, d0 object is the root of the tree. Each object is simply shown as d0, d8 and so on. Also, d0 object 1401 is indicated as d0/F0, because file F0 is assigned to it. Notations d2/F2, d4/F4 and d6/F6 also indicate that F2, F4 and F6 are respectively assigned to objects d2, d4 and d6.

The procedure traces the object tree of FIG. 14 by Depth First Search. When tracing back the search route, it registers a management object in the object list to be output, if file assignment data of the object is set. By tracing from "Start" 1410 in FIG. 14 to "d5" 1404 and back, it finds out that file F4 is set to d4 object. This is expressed as "Hit F4" 1411. Then, d4 object is registered directly behind the list head 1502 of "object list to be output (example)" 1501. Management object (d4 object) is also a candidate for this kind of "hit". If modified data flag 508 of this object is off, there is no modification for the data recorded in file F4, and there is no need to register this object in the object list to be output in this case.

After searching "d7" 1407 and "d8" 1408 in order, back along the search route, the procedure finds out that the file F6 is set to d6 object. Then "d6" is registered after "d4" 1503 of the "object list to be output (example)" 1502. The procedure also finds out that file F2 is set to d2 object and "d2" is registered after "d6" 1504. Finally, "d0" is registered after "d2" 1505.

The step to "take out top object from object list to be output" 1104 takes out in order from the top among registered objects mentioned above.

This order has significance. The following describes the output procedure of the object tree. If this procedure becomes impossible to output to a file, this file name has to be changed. The management object, for which file assignment data is set, exists closer to the root in the object tree. Then, objects registered in the object list to be output start from an object that is closer to the tip of an object tree branch, (farther from the root). There is thus no contradiction even if the file assignment data is changed, because the output of this change is always done afterwards.

Management objects are taken out from the object list to be output in order. In "Assigning each of them as management objects" 1106, the following procedures are invoked. When all management objects are taken out from the object list to be output and processed, a series of procedures is completed.

The next step is to "designate file assignment data 504" 1107 of the assigned management object. If file assignment data 504 is not set, it is necessary to "receive file assignment data" 1109 and then "confirm the permission of output" 1110.

If the output file is in the computer on which application program is running, the output permission can be decided by investigating the accessibility of this file. If the operating system (OS) is UNIX, the permission of output can be determined by comparing permission data of the file and data of the application program user.

Suppose the application program is running on computer A. If the output file is for other computer (computer B), this program invokes the "procedure to set communications path" 1602 of FIG. 16. After "data output, read-in and communications procedures group" 705 of FIG. 7 is invoked, a signal is analyzed again in "procedure invoke signal reception procedure" 1601 of FIG. 16 and then the "procedure to set communications path" 1602 is invoked. When the procedure is finished, it returns to the "procedure invoke signal reception procedure" 701 of FIG. 7.

Figure 16:
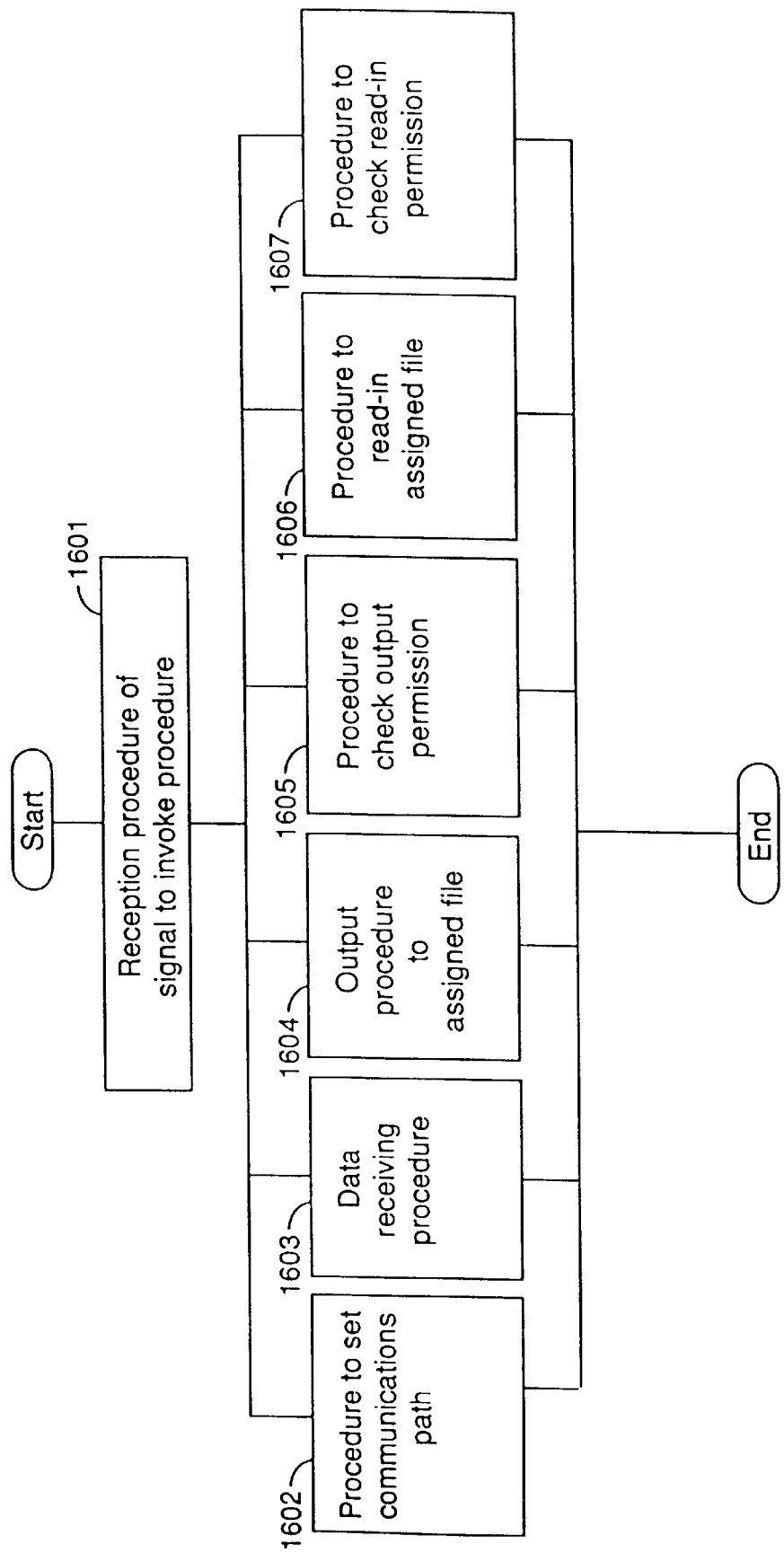
FIG. 16: Details of data output, read-in and communication procedures group.

"Procedure to set communications path" 1602, "data receiving procedure" 1603, "output procedure to assigned file" 1604, "procedure to check output permission" 1605, "procedure to read-in assigned file" 1606 and "procedure to check read-in permission" 1607 are members of the "data output, read-in and communications procedures group" 705 of FIG. 7. Actually, it is natural to line them up with procedures of FIG. 7 from the "procedure to generate first management object" 702 through "procedure to obtain pointer from translated pointer data" 707. This makes the program structure simple and clear. In this case, the "procedure invoke signal reception procedure" 1601 of FIG. 16 is unnecessary. The "procedure invoke signal reception procedure" 701 of FIG. 7 invokes procedures corresponding to signals. However, this description divides this into FIG. 7 and FIG. 16, since a single figure can not show the whole structure.

The "procedure to set communications path" 1602 of computer A invokes a "procedure to set communications path" 1602 of computer B and sets a communications path connecting both computers. Computer A request the file output permission from computer B through this communications path. Thus the "procedure to check output permission" of computer B is invoked. The result is transmitted to computer A. This is the result of "confirming the output permission " 1110. If the result is NO, it is necessary to "receive file assignment data" 1109 again to try outputting to another file. It is possible to amend this procedure to quit when it is impossible to output again.

If the permission is YES, the next step is to "open temporary file" 1201 for output. In the event that the output file is in computer A, the process running in this computer can directly output to this file. However in the following, a temporary file is used to explain both cases, including a case where the file is in another computer, computer B.

Object tree data is output to this temporary file in the step to "invoke object set output procedure" 1202. Details of the "object set output procedure" will be explained in Section 5.5.2. When this data output is finished, the next step is to "close temporary file" 1203. If the procedure finds out that the output file is a file in its own computer (computer A that the procedure is running on), it moves to the step to "copy the temporary file to the assigned file" 1208.

If the output file is a file of another computer (computer B), the next step is to "set communications path" 1205 from computer A to computer B. This means that the "procedure to set communications path" 1602 of computer A is invoked first, and then the "procedure to set communications path" 1602 of computer B is invoked, and a communications path that connects both computers is set up. Through this communications path from computer A to computer B, the procedure "transmit temporary file" 1206 is executed. In computer B, the "data receiving procedure" 1603 is invoked and the temporary file is received. In computer A, a step to "invoke output procedure for assigned data in the receiving computer" 1207 is invoked. As a result, "output procedure to assigned file" 1604 of computer B is invoked and the content of the temporary file is written into the assigned file.

When the above-mentioned procedure is finished, the procedure returns to the step to "take out top object from object list to be output." 1104. A series of procedures is finished when the procedure for all the management objects in this list is over. In the case where the lump output flag is OFF, a series of procedures is over, immediately after the step to "take out top object from object list to be output" 1104, since the step to "generate object list to be output" is skipped.

Section 5.5.2 Object set Output Procedure

Figure 17:
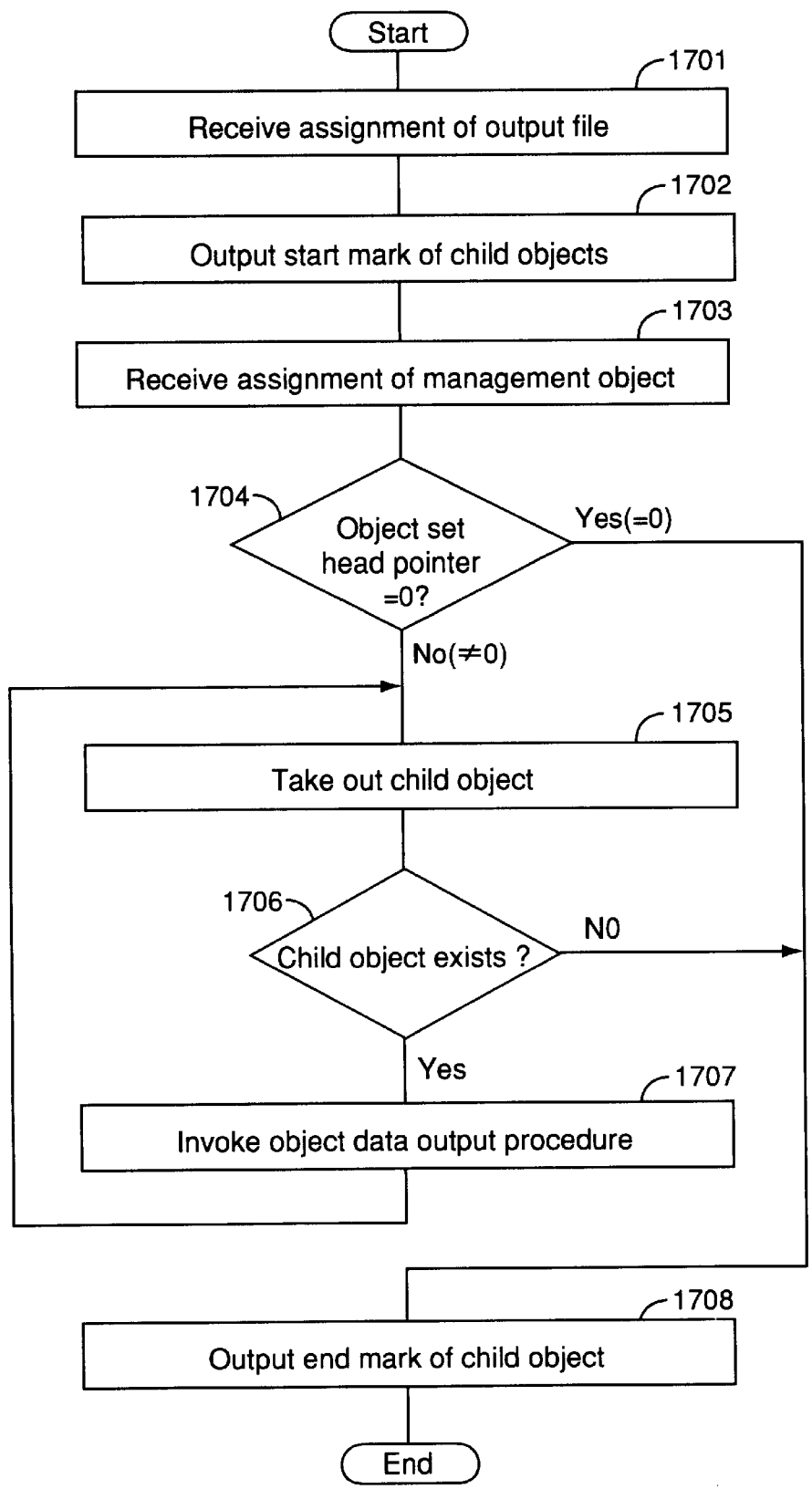
FIG. 17: Details of object set output procedure.

The "Object set output procedure" is invoked by the step to "invoke object set output procedure" 1202 of the object tree output procedure or by the step to "invoke object set output procedure" 1812 of the "object data output procedure". FIG. 17 shows details of the "object set output procedure."

First, "receive assignment of output file" 1701 is executed. The file that has been opened in the step to "open temporary file" 1201 in FIG. 12 is assigned, when the procedure is invoked by the "object tree output main procedure and data output, read-in and communication procedures group" (section 5.5.1). The file is assigned as it has been assigned by the step to "receive assignment of output file" 1801, when the procedure is invoked by "object data output procedure" of FIG. 18.

The procedure "output start mark of child objects" 1702 to an assigned file is executed. Then, it "receives assignment of management object" 1703. When the procedure is invoked in the "object tree main output procedure" (Section 5.5.1), the assigned object is the object that is assigned in the step to "receive assignment of management object" 1101 of FIG. 11 or assigned in the step to "assign the object as management object" 1106. When the procedure is invoked in the step to "invoke object set output procedure" 1812 in FIG. 18, the assigned object is the object that is subject to judgment as to whether it is a "management object?"

If the "object set pointer" 503 of the assigned management object is zero, a series of procedures is finished by the step to "output end mark of child object" 1708 and processing returns to the calling procedure.

If "object set pointer" 503 has a value, the list head assigned by this pointer is designated and "take out child object" 1705 which can be fetched through the list head is executed. If there is no child object, "output end mark of child object" 1708 is executed to finish a series of procedures and processing returns to the calling procedure. If there is a child object, it assigns the object and "invoke object data output procedure" 1707 is executed. Section 5.5.3 explains details of the "object data output procedure".

The "object data output procedure" is repeated until there is no child object. Finally, "outputs end mark of child object" 1708 is executed to finish a series of procedures and return back to the calling procedure.

Section 5.5.3 Object Data Output Procedure

Figure 18:
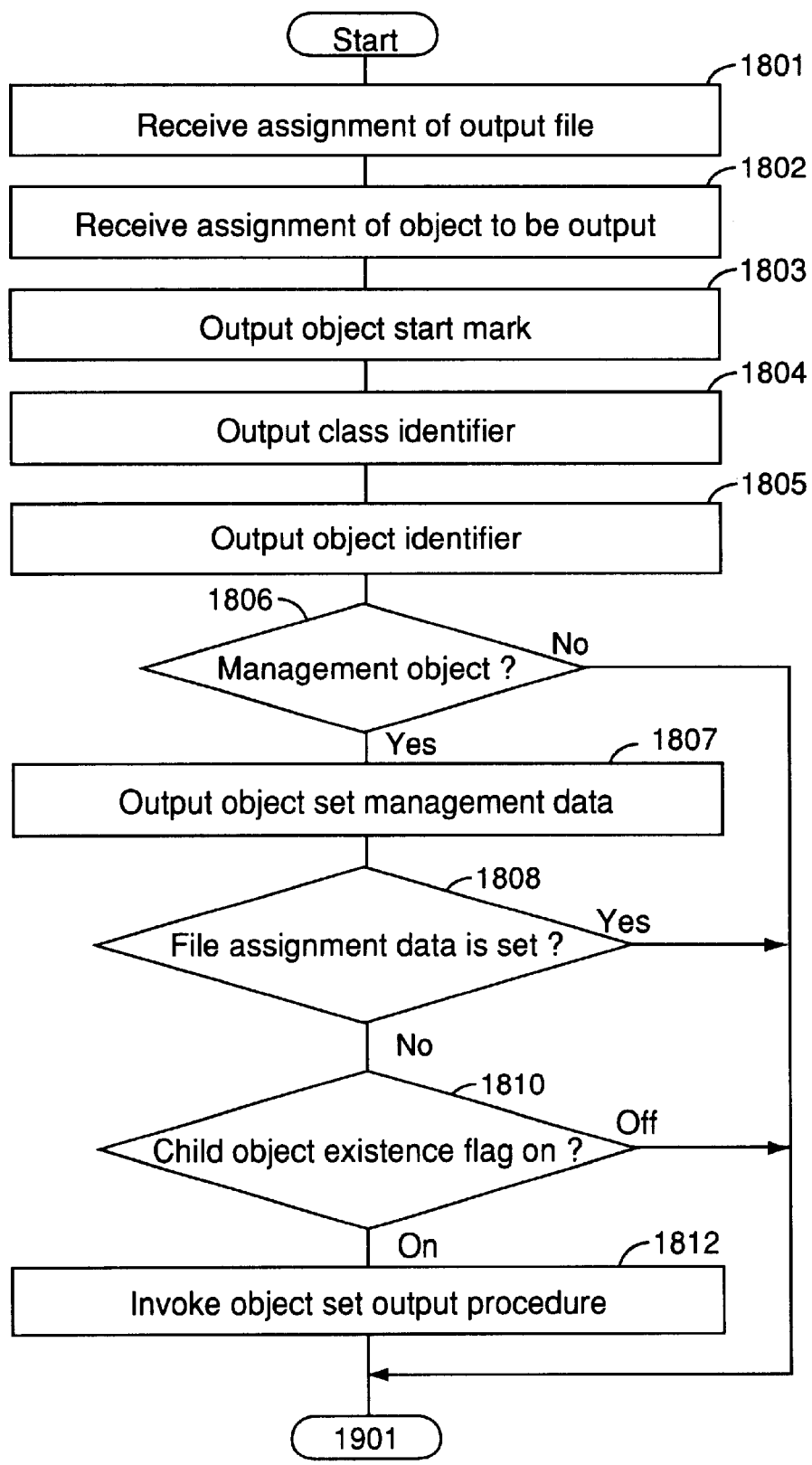
FIG. 18 and FIG. 19: Details of object data output procedure.

The "Object data output procedure" is invoked in the step to "invoke object data output procedure" 1707 of the object set output procedure. FIG. 18 shows details of the "object data output procedure". First, "receive assignment of output file" 1801 is executed. Here, the file that has been received in the step to "receive assignment to output file" 1701 in FIG. 17 is assigned as it is. In the cases of the C and C++ language, a file could be assigned by passing the file pointer after the file is opened.

The next step is to "receive assignment of object to be output" 1802. The relevant object is that which has been assigned in the step to "invoke object data output procedure" 1707. In the following, suppose that al object 204 is assigned as an example. Then, the procedure "outputs object start mark" 1803, which means the beginning of object data output.

Designating the class from the assigned object, "output class identifier" 1804 is executed. Suppose that the address of assigned al object 204 is set to pointer ptr_al and the class is class X, which was explained in Section 3.3.1. Then "ptr_al→cls_print( )" outputs the "class identifier." Moreover, it "outputs object identifier" 1805 for the assigned object. For instance, when al object is assigned, character string "al" which is the name of al object is output.

Figure 19:
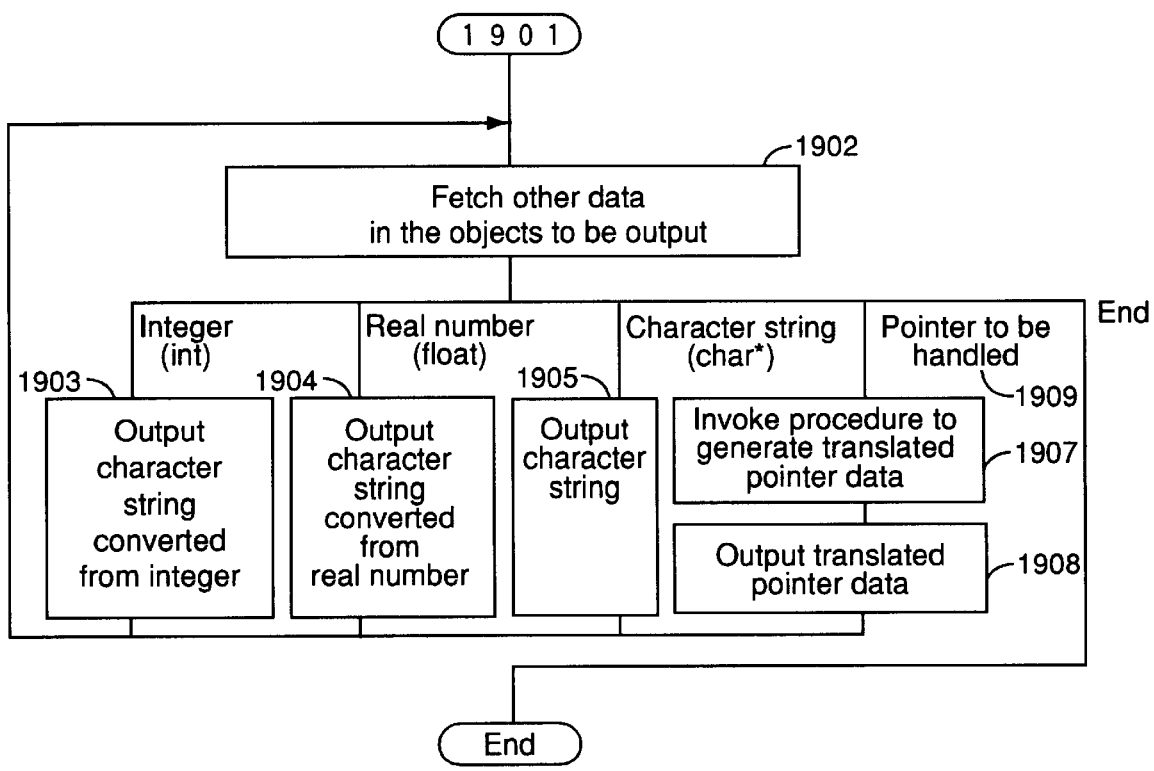

If the assigned object is not a management object, processing immediately advances to the procedure of FIG. 19. If the assigned object is a management object, "output object set management data 502" 1807 is executed, and in actual fact, file assignment data 504 and "child object existence flag" 509 are output. This file is output when it is detected that the file assignment data is not set.

When judgment as to whether "file assignment data 504 is set?" 1808 returns a "YES" decision, data output of the object managed by this management object is skipped and processing moves to the steps of FIG. 19. When judgment as to whether "file assignment data 504 is set?" 1808 returns a "NO" decision and judgment as to whether the "child object existence flag is on?" determines that this flag is "OFF" (a child object does not exist), processing immediately moves to the steps in FIG. 19.

When the judgment whether "file assignment data 504 is set?" 1808 is "NO" and the judgment of whether "child object existence flag is on?" is "ON" (exists), next step is to "invoke object set output procedure" 1812. That is, the "object set output procedure" of Section 5.5.2 is recursively invoked.

In addition to class identifier, object identifier and object set management data, the object has other data expressing the target. However, not all the data has to be retained. Data to be retained are selected according to the purpose of the application and its program structure. The selected data are taken out in the step to "fetch other data in the object to be output" 1902. If it is an integer (mnt), "output character string converted from integer" 1903 is executed. If it is a real number (float), "output character string converted from real number" 1904 is executed. If it is a character string (char*), "output character string" 1905 is executed. In addition to these, there are character (char), double length real number (double), double length integer (long mnt) and other types of data, However, explanations for these types will skipped for simplicity.

When the pointer to an object in the object tree is taken out by the step to "fetch other data in the object to be output" 1902, "invoke procedure to generate translated pointer data" 1907 is executed. The details are explained in Section 5.5.4. Step 1908 "output translated pointer data" is also executed, the data having been obtained by the procedure to generate translated pointer data.

Although not shown in FIG. 19, it is possible to retain the object using the method explained in Section 3.4, if the relationship between the pointer and the pointed object is one to one but not accommodated in the object tree. That is, data of the pointed object is output, instead of the pointer.

The step to "fetch other data in the object to be output" 1902, fetches variables (of an object) of a specific class of application in an order assigned by the program code. A data output procedure is defined as a member function of each class. Data to be output and its order are designated there. In other words, the fetching order and the procedure for executing the fetch are all coded in the program. FIG. 19 shows a simplified situation. The reading in procedure will be performed in the same order, in the step to "read in other object data" 2609 of the data read in procedure of Section 5.6.4, which reads in object data.

A "separator" is necessary between character strings to be output. Line feed mark, tab mark and Null code can be used as the separator for character strings. A separator is output after outputting a character string in the steps to "output character string converted from integer" 1903, "output character string converted from real number" 1904 and "output character string" 1905.

In addition to this, there are cases where other objects are contained in the object. This is not shown in FIG. 19. C++ and Java can define objects of other classes as variables of classes. In this case, the object is output recursively.

Section 5.5.4 Procedure to Generate Translated Pointer Data

Figure 20:
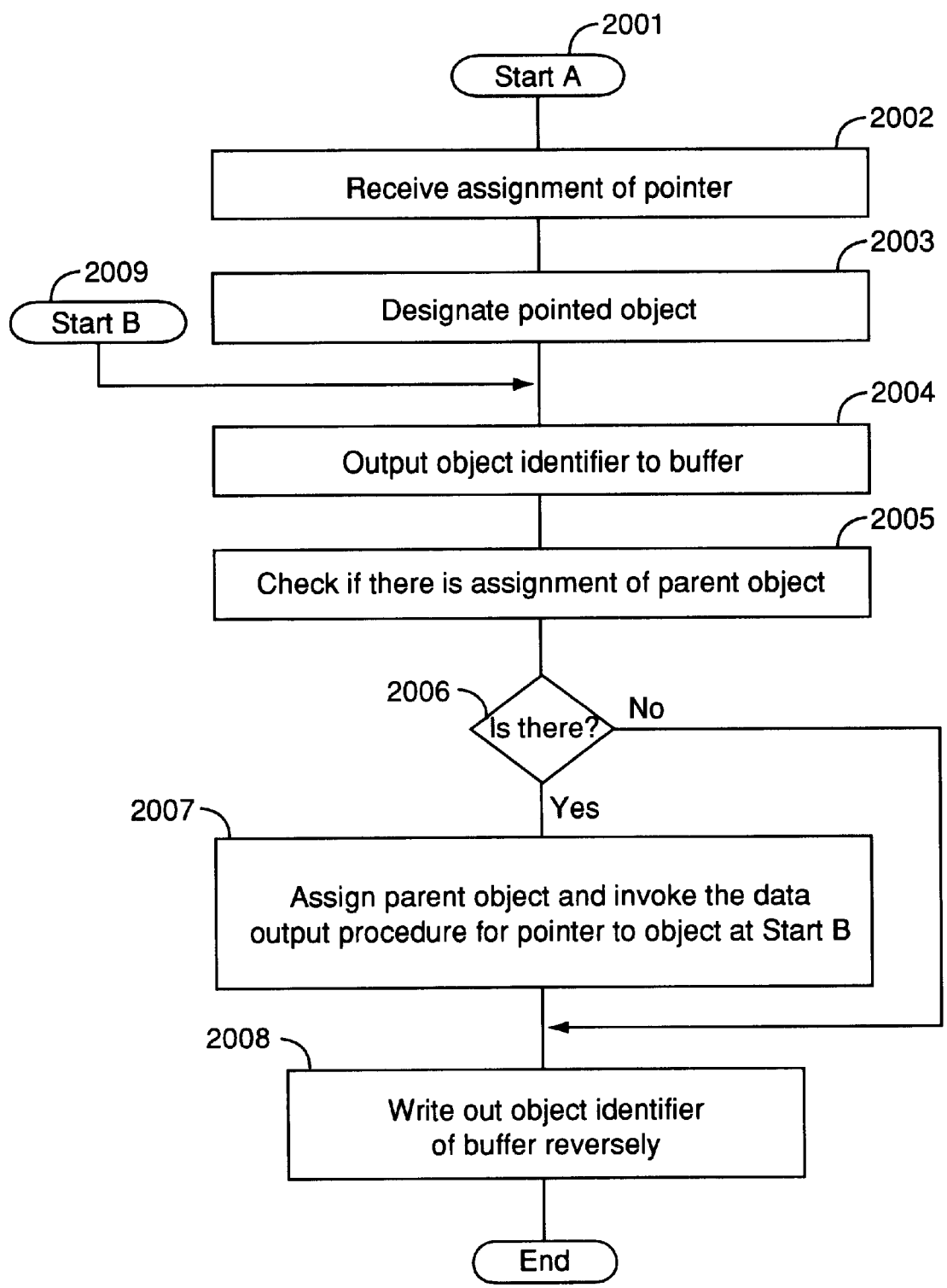
FIG. 20: Details of procedure to generate translated pointer data.
Figure 21:
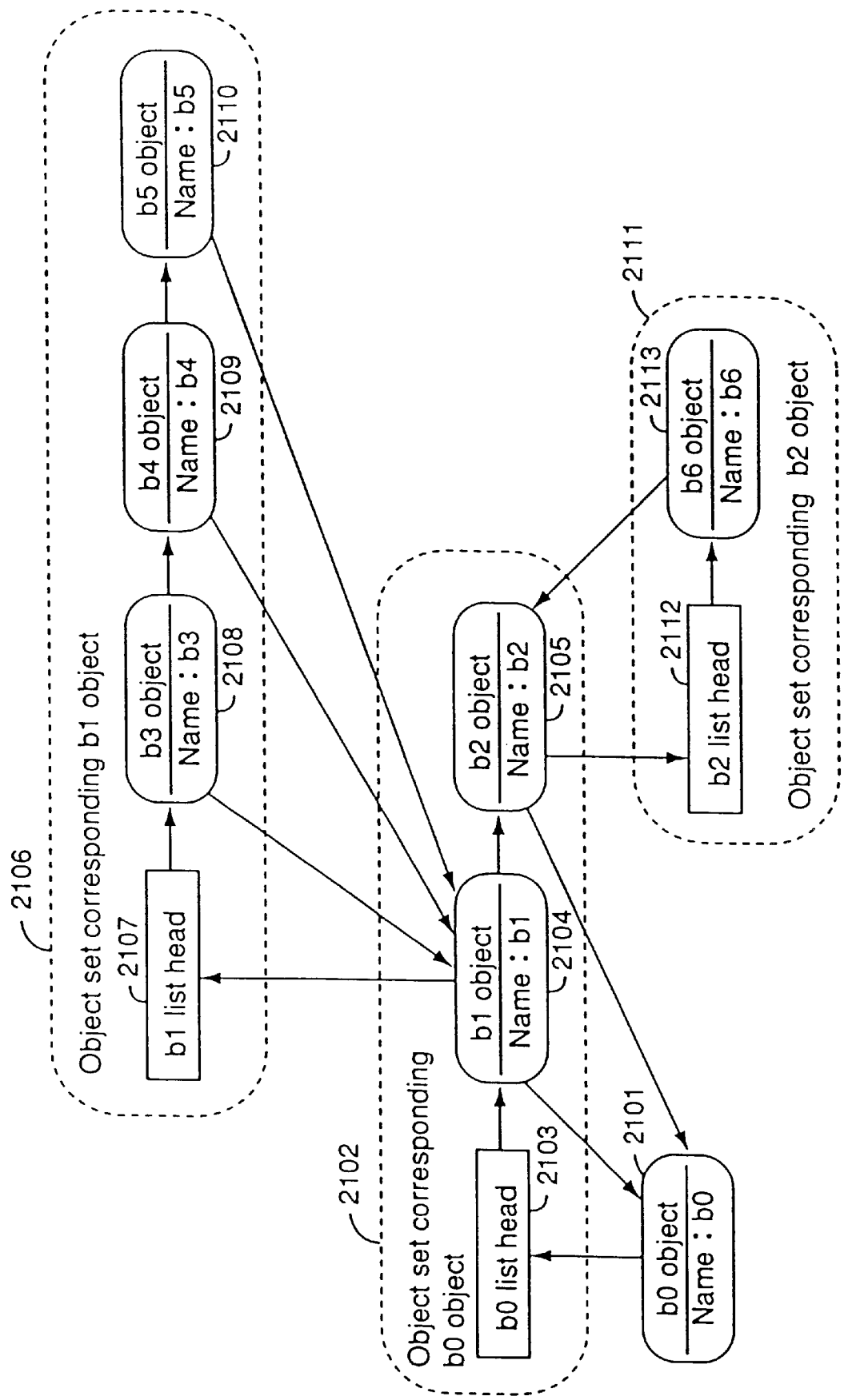
FIG. 21: Example of object tree, which is used in explanation of procedure to generate the translated pointer data.

A "procedure to generate translated pointer data" is invoked in the step to "invoke procedure to generate translated pointer data" 1907 of the "object data output procedure". There is also a case where it is invoked directly when retaining and transmitting a pointer to an object accommodated in the object tree. FIG. 20 shows details of a "translated pointer data generating procedure". The details of this procedure will be explained using FIG. 21. The object tree of FIG. 21 has the same tree structure as the object tree of FIG. 2. For each object, a management object of the set accommodating the object is called a "parent object". In FIG. 21, each object has a pointer to its parent object. This point differs from FIG. 2. All names begin with "b" in FIG. 21, in order to distinguish them from those in FIG. 2.

There is no need to have a pointer to the parent object, if there is no need to output translated pointer data of a pointer to an object in the object tree. However, it is convenient to have a pointer from the object to a management object, when obtaining a translated pointer data from the pointer to the object. In the following explanation, the existence of a pointer to a management object from an object is assumed.

A "data output procedure for a pointer to an object" is invoked from "Start A" 2001. First, "receive assignment of a pointer" 2002 is executed for a subject for which translated pointer data is requested, and then "designate pointed object" 2003 executed. As an example, suppose that b5 object 2110 in FIG. 21 is assigned. The following explains the details of a procedure for this assignment, as an example.

The next step is to "output object identifier to buffer" 2004. In the example of FIG. 21, a character string "b5", which is a name of b5 object 2110 is output. A separator (Section 5.5.3) is output after this. Line feed mark, tab mark and null code can be used as a separator of the character strings. The following example uses a line feed mark as a separator.

Next, "check if there is assignment of parent object" 2005 is executed. The parent object of b5 object is b1 object. At this time, "assign parent object and invoke the data output procedure for pointer to object at Start B" 2007 is executed. That is, b1 object is assigned and the same procedure is invoked recursively from "Start B" 2009. As a result, character string "b1" is output to the same buffer.

Furthermore (the data output procedure for pointer to object) is recursively invoked from Start B, assigning b0 object which is the parent object of b1 object. As a result, a character string b0 is output to the same buffer. This series of procedures ends, since the result of the step to "check if there is assignment of parent object" 2005 is "NO", that is b0 object has no pointer to the parent object. Alternatively, processing returns to the calling procedure if the pointer exists.

Although the combination of object identifiers pointing to b5 object 2110 is (b0, b1, b5), output data to the buffer is "b5, line feed mark, b1, line feed mark, b0 and line feed mark". By outputting this in reverse, the translated pointer data can be obtained.

By outputting the content of the buffer, as it is, not in reverse, object identifiers can be inserted at the top of a combination when reading-in these strings. That is, every time the character string is read-in from the top, the combination of object identifiers changes to (b5), (b1, b5) and (b0, b1, b5).

By recursive functions of the C language and others, it is possible to first access the parent object (b0 object) of the first root and to output (easily) object identifiers of each object when returning to the calling procedures. In this case, it is not necessary to either write temporarily into buffer or to output the content in reverse. However, this makes flow charts complicated. The procedure to generate translated pointer data is explained by using a buffer.

Section 5.5.5 Structure of Output Data

Suppose file F0 is assigned to file assignment data 504 of a1 object 201 in FIG. 2, and file F2 is assigned to a2 object 205, preparing for output. Furthermore, the "lump output flag" 1301 is set on. Under these conditions, a0 object 201 is assigned, and the "object tree main output procedure" (Section 5.5.1) is invoked.

The object list to be output is generated because the lump output flag 1301 is on, and management objects are registered in the order of a2 object and a0 object. First, data of the object set corresponding to a2 object (and the followings) are written out to file F2. An explanation for these output data is omitted.

Figure 22:
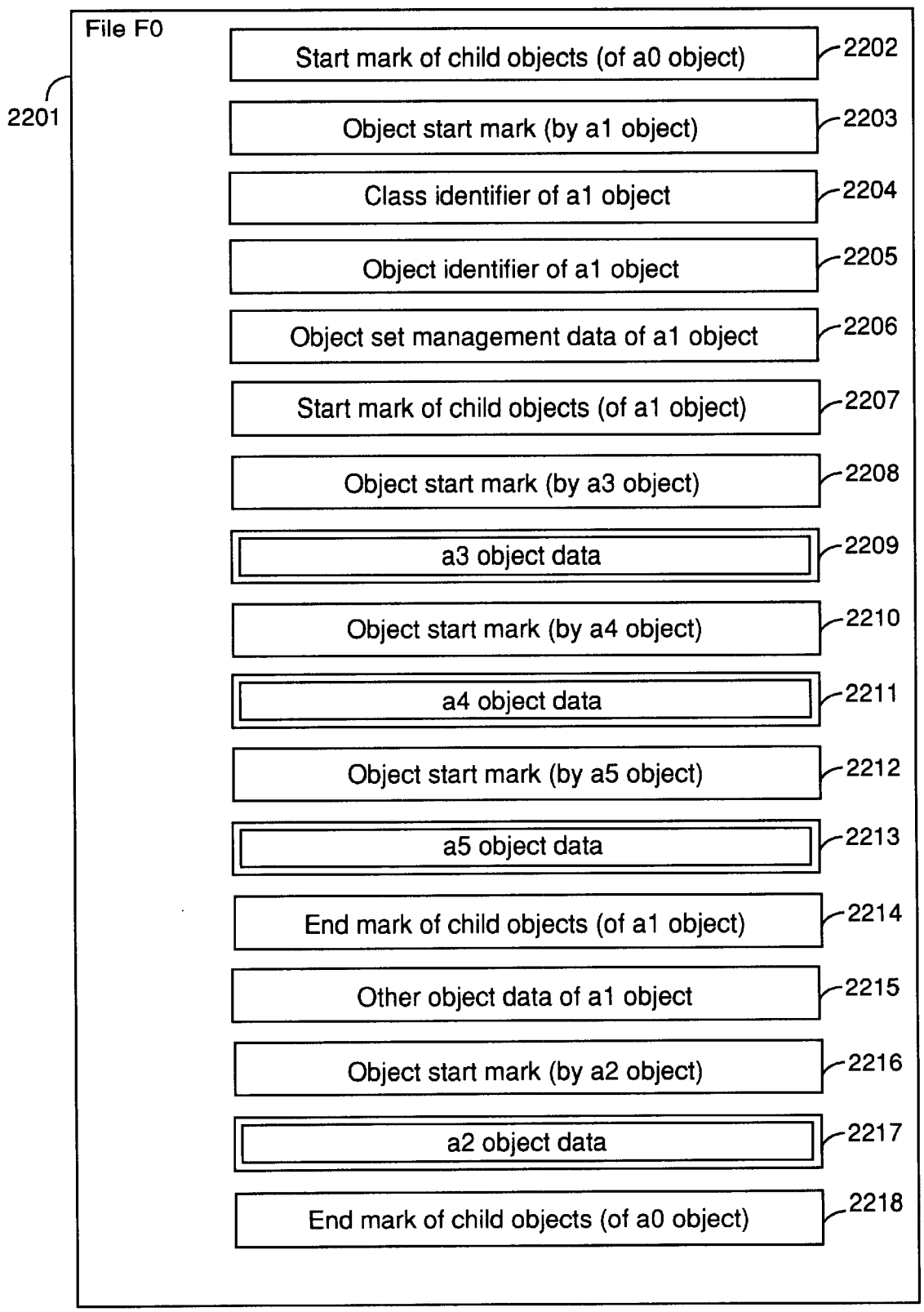
FIG. 22: Example of data structure recorded in file.

Next, data following a0 object (except the data output in file F2) is written out in file F0. FIG. 22 shows a data structure recorded in File F0. "File F0" 2201 begins at "start mark of child objects (of a0 object)" 2202 and ends at "end mark of child objects (of a0 object)" 2218. "Object start mark (by a1 object)" 2203 is recorded after "start mark of child objects (of a0 object)" 2202.

The reason why parentheses are used here as "start mark of child objects (of a0 object)" and "object start mark (by a1 object)" is to clearly indicate the corresponding objects. Start mark of child objects, end mark of child objects, object start mark and object end mark will be output many times. The corresponding objects are different even if marks are of the same kind.

Then, "class identifier of a1 object" 2204 and "object identifier of a1 object" 2205 are recorded. "Object set management data of a1 object" 2206 is output next, since a1 object is a management object.

Next, "start mark of child objects (of a1 object)" 2207 is output and various data of the child objects follows.

Data of a3 object is composed of "object start mark (by a3 object)" 2208 and "a3 object data" 2209. The "a3 object data" 2209 is composed of "class identifier of a3 object," "object identifier of a3 object" and "other object data of a3 object." The reason why "a3 object data" 2209 in FIG. 22 is surrounded by double lines is because it shows that it is a complex of data.

Also, "object start mark (by a4 object)" 2210 and "a4 object data" 2209 of a4 objects, and "object start mark (by a5 object)" 2212 and "a5 object data" 2213 of a5 objects follows. "End mark of child objects (of a1 object)" 2214 is output, because data of objects managed by a1 object ends here. Lastly, "other object data of a1 object" 2215 is output (by the procedure of FIG. 19).

Next, the procedure moves onto the data output of a2 object 205 and outputs "object start mark (by a2 object)" 2216. Afterwards, "class identifier of a2 object", "object identifier of a2 object", "object set management data of a2 object" and "other object data of a2 object" are output.

If the step to check "file assignment data is set?" of object data output procedure of section 5.5.3 detects that file F2 is set to object set management data 502 of a2 object, the output procedure of the managed objects is skipped. As a result, "other object data of a2 object" and "End mark of child objects (of a0 object)" 1918 are output and the file F0 ends.

FIG. 22 summarizes "class identifier of a2 object", "object identifier of a2 object", "object set management data of a2 object" and "other object data of a2 object" as "a2 object data" 2217 in FIG. 22.

Section 5.6 Object Tree Read-in Procedure

"Object tree read-in procedure" 706 is comprised of "object tree main read-in procedure" in Section 5.6.1, "read-in control procedure" in Section 5.6.2, "object set read-in procedure in Section 5.6.3 and "object data read-in procedure" in Section 5.6.4. Basically, the previous procedure invokes the following procedure, but a read-in control procedure and an object set read-in procedure are invoked in various ways.

When reading in data of a computer (computer B) other than the computer (computer A) on which an application program is running, each procedure (of computer A and computer B) of "data output, read-in and communications procedures group" is invoked depending upon the situation. Some procedures of "data output, read-in and communications procedures group", that were not explained in Section 5.5.1, will be explained with the "object tree main read-in procedure".

Figure 23:
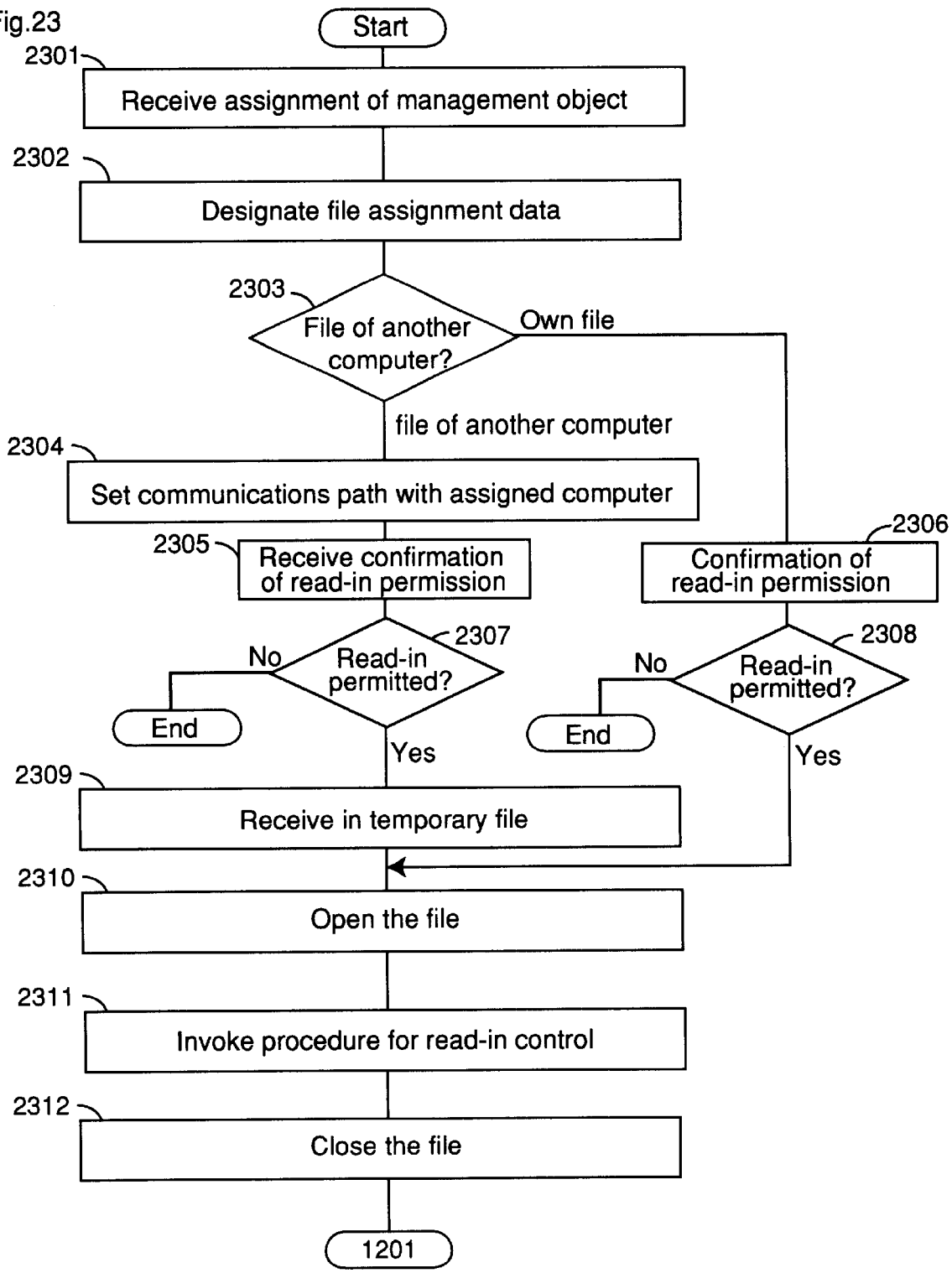
FIG. 23: Details of object tree main read-in procedure.

Section 5.6.1 Object Tree Main Read-in Procedure, and Data Output, Read-in and Communications Procedures Group FIG. 23 shows details of an "object tree main read-in procedure". First, "receive assignment of management object" 2301 is executed, in which file assignment data 504 for data read-in is set. Then, "designate file assignment data 504" 2302 is executed for the assigned management object.

If the read-in file is a file of a computer that application program is running on, "confirmation of read-in permission" 2306 is directly executed. A step to confirm file read-in permission can be carried out by checking the file accessibility. If the operating system (OS) is UNIX, the permission of output can be determined by comparing permission data of the file and data of the application program user. If read-in is not permitted, a series of procedures ends. If read-in is permitted, then "open file" is performed.

If the read-in file is a file of another computer (computer B not computer A on which the application program is running), a "procedure to set communications path" 1602 in FIG. 16 is invoked. "Procedure to set communications path" 1602 of computer A invokes "procedure to set communications path" 1602 of computer B and sets a communications path connecting the two computers. Computer A requests the file read-in permission from computer B through this communications path. Then the "procedure to check read-in permission" of computer B is invoked. The result is transmitted to computer A. This becomes the result of "receive confirmation of read-in permission" 2305. If the result is no, the series of procedures ends.

If read-in permission is confirmed, the read-in data from the computer B through the communications path is received (by computer A) and retained in a temporary file. This is the step to "receive in temporary file" 2309, and "open the file" 2310.

Next, "invoke procedure for read-in control" 2311 is executed. The details are explained in Section 5.6.2. When "procedure for read-in control" ends, control is returned (by return code), "close the file" 2312 is executed and the series of procedures is finished . At this moment, (the branches of) the object tree are reproduced from the read-in data, beyond the management object assigned in the beginning.

Section 5.6.2 Read-in Control Procedure

Figure 24:
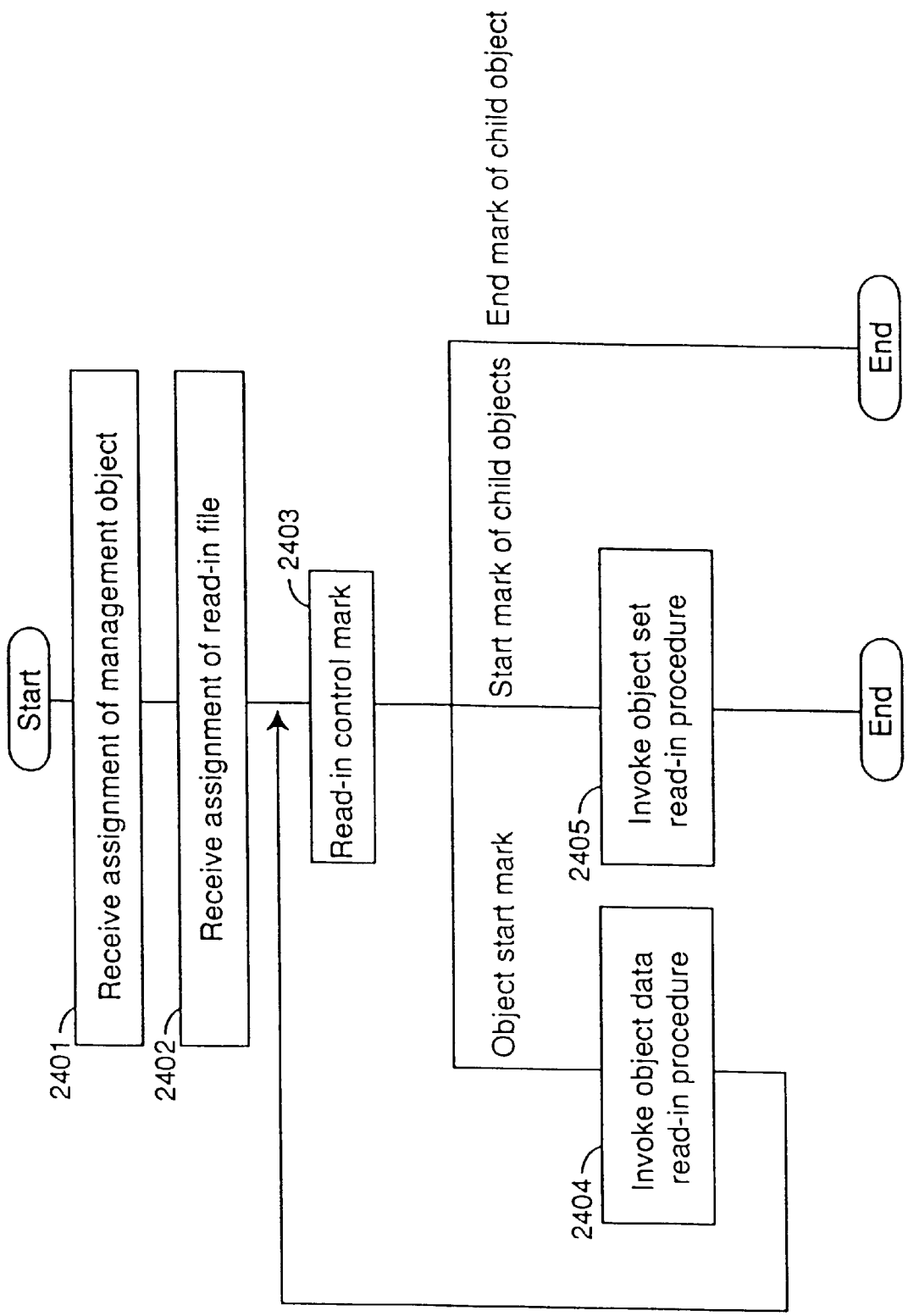
FIG. 24: Details of read-in control procedure.

FIG. 24 shows details of the "read-in control procedure". First, "receive assignment of management object" 2401 and "receive assignment of read-in file" 2402 are executed. In these steps, "management object" and "read-in file" held by the calling procedure are assigned as they are. In other words, "management object" and "read-in file" held by the "object tree main read-in procedure" and "object set read-in procedure" at the time of executing "invoke read-in control procedure", are assigned as they are. For the C and C++ language, assignment of a read-in file is simple. That is simply passing a file pointer obtained by the step to "open file" 2310. Also, the read-in control procedure invokes an object data read-in procedure" and an "object set read-in procedure." Here, "management object" and "read-in file" that the "read-in control procedure" holds are handed over as they are.

The next step is to "read in control mark" 2403. As shown in FIG. 22, control marks are "object start mark," "start mark of child objects" and "end mark of child objects".

When reading-in "object start mark," "invoke object data read-in procedure" 2404 is executed. Section 5.6.4 shows details of the object data read-in procedure.

When reading-in "start mark of child objects", "invoke object set read-in procedure" 2405 is executed. Section 5.6.3 shows details of the object set read-in procedure. When the object set read-in procedure ends and the program control returns to the read-in control procedure, then the program control is also returned to the calling procedure (that invoked the read-in control procedure).

When child objects are read-in, the program control is returned to the calling procedure (that invoked the read-in control procedure). The word "end" in the drawings for this description means to return control to the calling procedure, if there is one.

Section 5.6.3 Object Set Read-in Procedure

Figure 25:
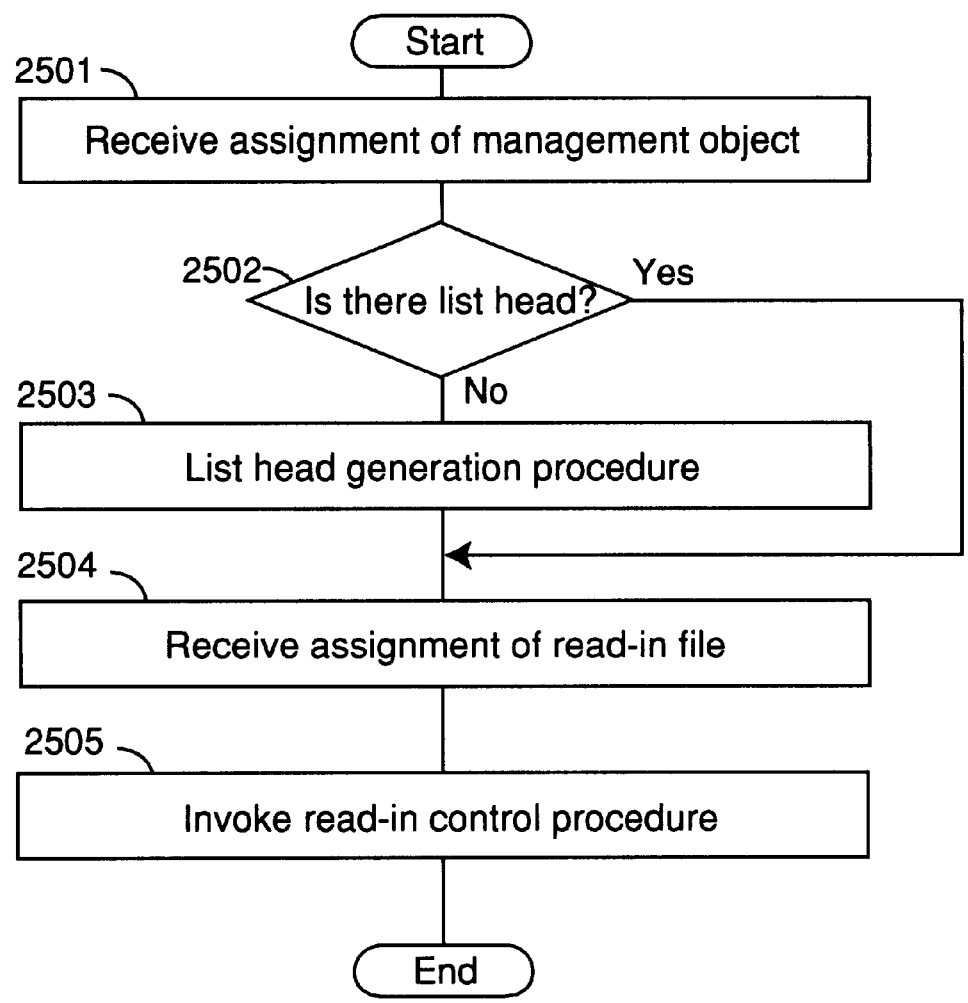
FIG. 25: Details of object set read-in procedure.

FIG. 25 shows details of the "object set read-in procedure." First, "receive assignment of management object" 2501 is executed. If there is no corresponding list head, a "list head generation procedure" 2503 is executed. Then, "receive assignment of read-in file" 2504 is executed, and finally, "invoke read-in control procedure" 2505.

Section 5.6.4 Object Data Read-in Procedure

Figure 26:
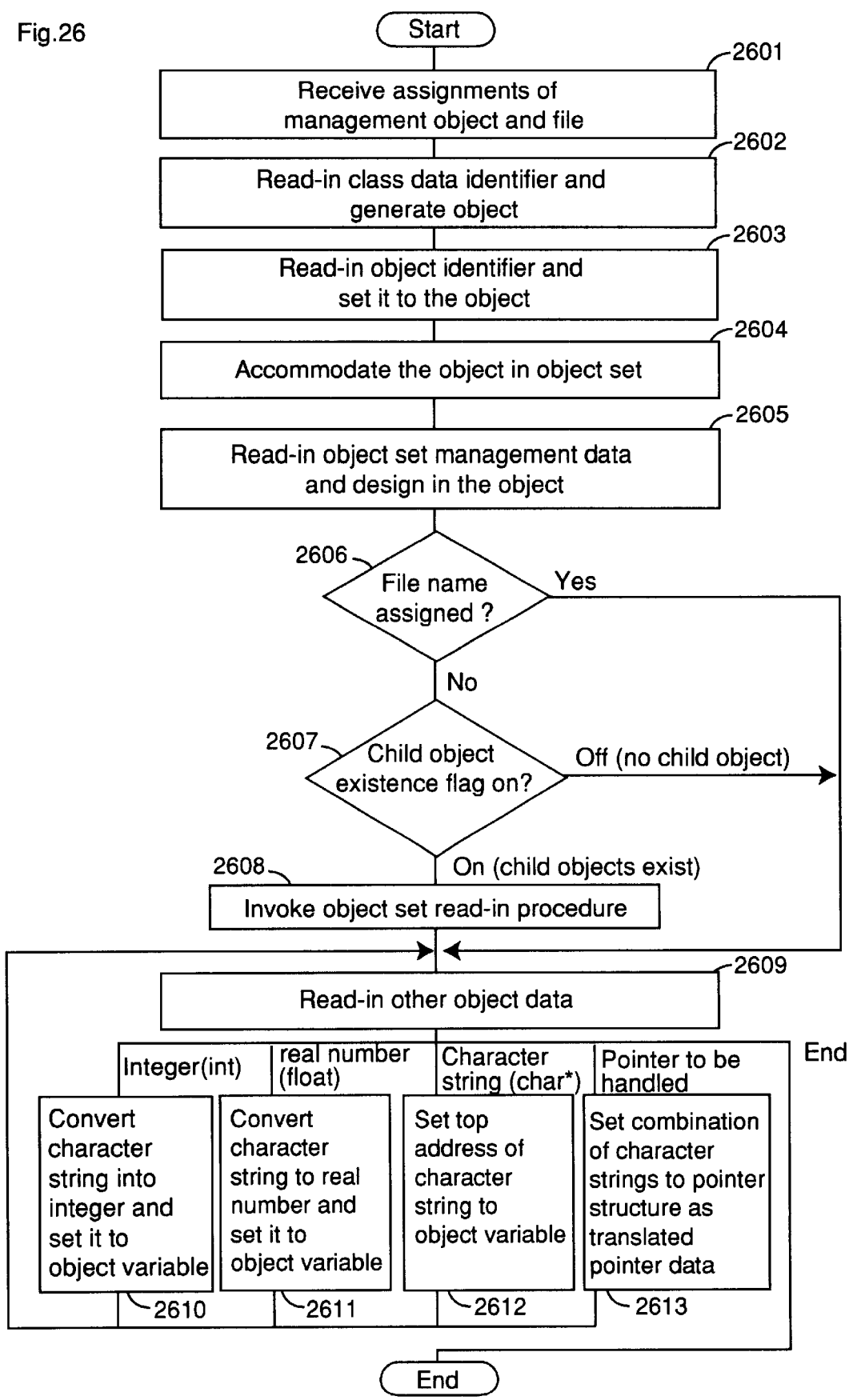
FIG. 26: Details of object data read-in procedure.

FIG. 26 shows details of the "object data read-in procedure". First, "receive assignments of management object and file" 2601 is executed.

"Read-in class identifier and generate object" 2602 and "Read-in object identifier and set it to the object" 2603 are executed, and then "accommodate the object in object set" 2604 is executed, corresponding to the assigned management object.

Next, "read-in object set management data, and set it in the object" 2605 is executed. The contents are "file assignment data" 504 and "child object existence flag" 509. The procedure advances to "reading-in other object data" 2609, when file assignment data 504 exists, or when the child object existence flag is off (no child object), even if the file assignment data 504 is not set. The procedure "invoke object set read-in procedure" 2608 is executed when file assignment data 504 is not set and the child object existence flag is on (child object exists).

The procedure to "read-in other object data" 2609 reads in variables for objects of the application in the order defined by the program code. A data read-in procedure is defined for each class by its member function. The data to be read in and the order of reading them in are designated in this function. In other words, the order for reading in and a procedure for handling them are all coded in the program. This is simplified and expressed in FIG. 26. Here, the procedure to "fetch other data in the object to be output" is coded to output data in the same order as the read-in procedure.

For integer (int), "convert character string into integer and set it to object variable" 2610 is executed. For real number (float), "convert character string into real number and set it to object variable" 2611 is executed. For character string (char*), "set top address of character string to object variable" 2612 is executed. For a pointer to be retained, reproduced and transmitted, "set combination of character strings to pointer structure as translated pointer data" 2613 is executed.

In addition to these, there are character (char), double length real number (double), double length integer (long int) and other types of data. However, explanations for these types are skipped for simplicity. Furthermore, other objects can be contained in an object, though this is not shown in FIG. 26. C++ and Java can define class with a variable of an object of another class. In this case, data of that object can be read in directly and an object can be generated.

The read-in procedure mentioned above detects separations of read-in data using the "separator" of Section 5.5.3.

Section 5.7 Procedure to Obtain Pointer from Translated Pointer Data

As explained in Section 5.6.4 of the "object data read-in procedure," pointer data is read-in as translated pointer data, which is a combination (continuation of character strings) of object identifiers to designate the pointed object in the object tree.

Figure 27:
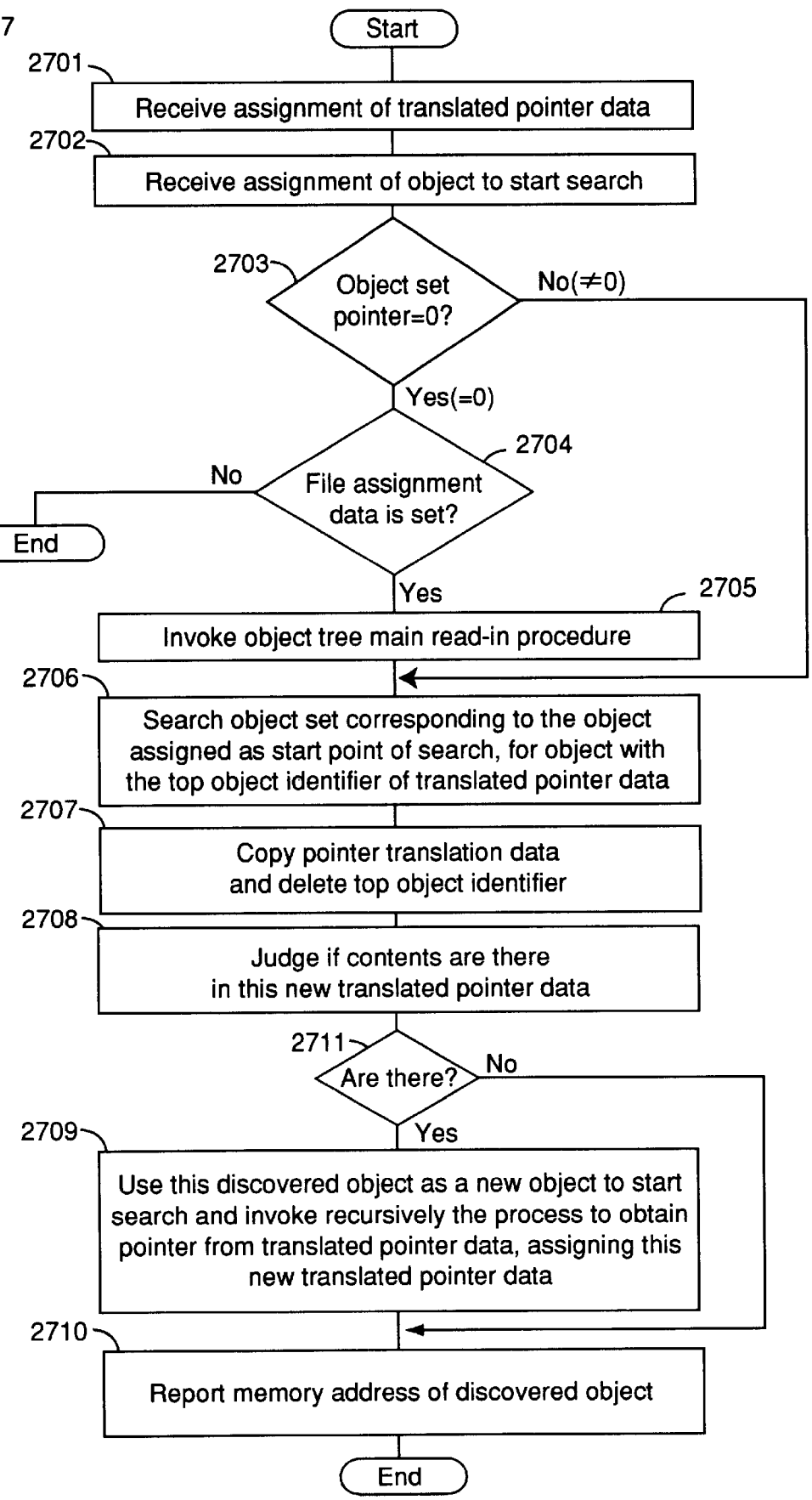
FIG. 27: Details of procedure for obtaining pointer from translated pointer data.

FIG. 27 shows the procedure for obtaining a pointer from translated pointer data. First, "receive assignment of translated pointer data" 2701 is executed. As an example, take a pointer to a5 object 210 in FIG. 2. Also, assume that (a1, a5) is assigned as the translated pointer data. The procedure of FIG. 27 deals with translated pointer data in the form that omits the root object (a0 object as in FIG. 2) of the object tree.

"Receive assignment of object to start search" 2702 is executed. A step comprising a "procedure to obtain pointer from translated pointer data" recursively invokes a "procedure to obtain pointer from translated pointer data". When this procedure is first invoked, the root object (a0 object for FIG. 2) of the object tree is assigned as the object to start search.

Object to start search is assumed to be a management object. If it is not a management object, the procedure ends. If file assignment data 504 is not set and the value of the object set pointer 503 is zero, the procedure also ends. If the value of the object set pointer 503 is zero and file assignment data 504 has been set, "invoke object tree main read-in procedure" 2705 is executed. After this procedure or when value of the object set pointer is set, "search set corresponding to the object assigned as start point of search, for object with the top object identifier of translated pointer data" 2706 is immediately executed.

Next, "copy translated pointer data and delete top object identifier" 2707 is executed. As a result, translated object data becomes (a5). Then "judge if there is content in this new translated pointer data" 2708 is executed. If there is content, then "use this discovered object as a new object to start search and recursively invoke the procedure to obtain pointer from translated pointer data assigning this new translated pointer data" 2709 is executed.

When deleting the top object identifier of the copied translated pointer data, the procedure finds that no content exists in the translated pointer data some time in the future. At that time, "report memory address of discovered object" 2710 is executed, the object having been found out in the step to "search object with head object identifier of translated pointer data, in object set corresponding to object assigned as start point of search" 2706. If this address is reported as a return value, it will be also reported as a return value to the procedure that first invoked the procedure to obtain a pointer from translated pointer data.

By recording the memory address of discovered object in the pointer 401 of pointer structure 406, a quick access is possible by using it at the next access to the object.

With the "procedure to obtain pointer from translated pointer data" explained above, object data is read-in from the file designated by file assignment data 504 of the management object, and the object tree is reproduced in the main memory, until the pointed object is reproduced on the object tree. That is, the object that is necessary for the current job is automatically reproduced.

Section 5.8 Modification, Deletion and Release of Object Tree

When an object is deleted, the "child object existence flag" 509 of the management object should be adjusted properly. If there is no child object for the management object, that is, the number of objects in an object set corresponding to the management object becomes zero, the "child object existence flag" 509 should be turned off. On the contrary, the "child object existence flag" 509 is turned on if an object is added.

When an object is deleted, modified, or added, the procedure traces objects toward the root of the object tree and detects the management object for which file assignment data is set, and the "modified data flag" 508 of this management object is turned on.

In order to reduce the usage of main memory, the following steps are to be taken to release part or all of the object tree except for the management object at the root of the object tree. First, the management object that is one object to be deleted is assigned and located in the nearest position to the root of the object tree. For example, assign a object 204 when the object set 206 to be released corresponds to a1 object in FIG. 2. When releasing the whole object tree in FIG. 2 (except a0 object 201), assign a0 object 201. File assignment data 504 is needed for this assigned management object, so it has to be set beforehand. For example, assign file F0 to a0 object 201, and file F1 to a1 object 204. Also, "lump output flag" 1301 has to be set to on.

When a0 object is assigned and the object tree main output procedure is invoked under this condition, data of the object set corresponding to a1 object is recorded in file F1 and other data (except a0 object) are recorded in file F0. If "modified data flag" 508 of a0 object is off, output to a file F0 will not be performed since there are no data modifications. Similarly, if "modified data flag" 508 of a1 object is off, output to file F1 will not be performed since there are no data modifications.

If data is output like this, even if an object tree other than a0 object is released (deleted), it can be reproduced whenever necessary. Before releasing the object tree, pointers to these objects are converted to the translated pointer data. These data are recorded and the value of the pointer 401 in the pointer structure is set to zero. Then, the object tree can be reproduced during the procedure to obtain a pointer from the translated pointer data. When an object set is released, a list head 506 at the top of the set will also be released. Then, the value of object set pointer 503 of the management object is set to zero.

Data of an object set corresponding to a1 object is recorded in file F1 when a1 object is assigned and the object tree main output procedure is invoked. After that, the object set corresponding to a1 object is released (deleted) from the object tree.

Section 6 Object Management Apparatus

A computer loaded with a program that has accomplished the object management method works as an object management apparatus.

Figure 28:
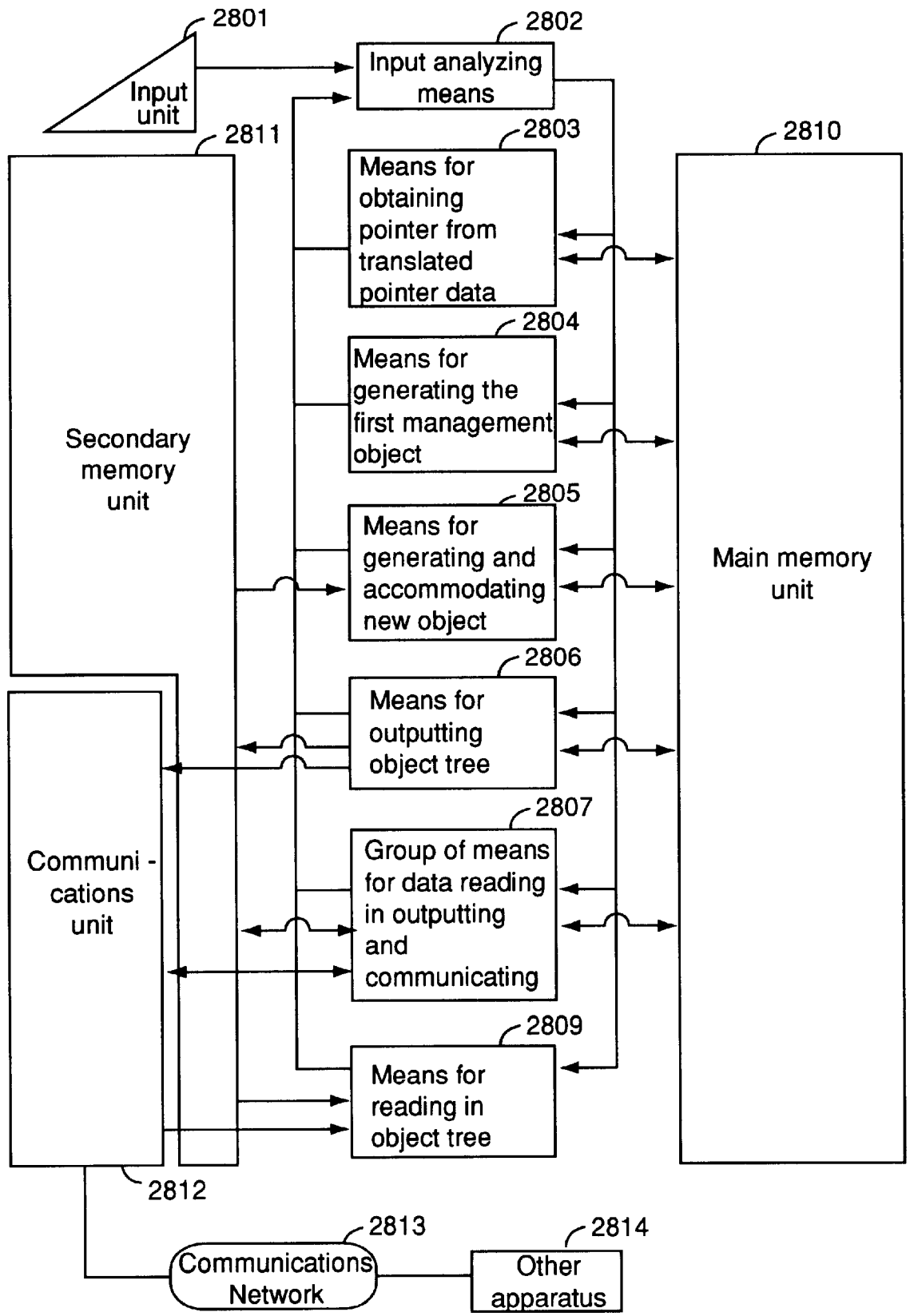
FIG. 28: Structure of object management apparatus.

Object management apparatus can be accomplished by combining multiple microprocessors or by combining hardware circuits such as ICs etc. In the following, FIG. 28 shows an example of accomplishing each procedure in FIG. 7 (Section 5.2) using processors or logic circuits.

Input from an input unit" 2801 is analyzed by "input analyzing means" 2802 and signals are sent to corresponding means. FIG. 28 shows means for receiving these signals, as follows. "Means for generating the first management object" 2804, "means for generating and accommodating new object" 2805, "means for outputting object tree" 2806, "group of means for data reading in, outputting and communicating" 2807, "means for reading in object tree" 2809, and "means for obtaining pointer from translated pointer data" 2803. A processor loaded with a program implementing each of the procedures in FIG. 7 (Section 5.2) can be a means mentioned above. Further, logic circuits can be assembled to implement any such means. It is possible to add other means, according to the purpose of the application.

If a signal is input to "means for generating the first management object" 2804, then an object is generated from the data held by the signal and the data in the "main memory unit" 2810, and is recorded in the "main memory unit" 2810. When a signal is input to "means for generating and accommodating new object" 2805, an object is generated from the data held by the signal and the data in the "main memory unit" 2810, and is accommodated in the object tree in the "main memory unit" 2810.

Data for an object tree beyond a (management) object assigned by a signal to the "Means for outputting object tree" 2806 is fetched from the "main memory unit" 2810, and this data is recorded in the "secondary memory unit" 2811 or transmitted to "other apparatus" 2814 beyond the "communications network" 2813 through the "communications unit" 2812.

In the "means for reading-in an object tree" 2809, a file is designated by a (management) object that is assigned by the signal to this means. Data is read-in from this file in the "secondary memory unit" 2811, or read-in from a file in "other apparatus" 2814 beyond the "communications network" 2813 through the "communications unit" 2812. An object tree is then reproduced ahead of the assigned (management) object.

The "Group of means for data reading-in, output and communicating" 2807 provide back-up means to be invoked by signals (through "input analyzing means" 2802) from the "means for outputting object tree" 2806 and "means for reading in object tree" 2809.

"Means for obtaining pointer from translated pointer data" 2803 is means for converting the assigned translated pointer data to a pointer, and invoking "means for reading-in object tree" 2809 using the signals (through the "input analyzing means" 2802) if necessary.

Section 7 Applications
Section 7.1 Handling of Logical Model

Various logical relations and information can be expressed by objects and by specifying mutual relationships among these objects. These are called logical models in this description.

An engineering drawing of a communications network that expresses the relationship between communications node and links being planned, or a drawing that represents a real life communications network are logical models. Travel plans that combine locations, activities at locations such as sight seeing, and transportation means between locations are logical models. The structure of fictional or real three-dimensional space can be expressed as a logical model. A combination of objects, which perform simple individual procedures in order to accomplish a complex procedure, is also a logical model.

The present invention is useful to handle these logical models. The present invention is applicable to a case where all the data of logical models exists in a single computer or to a case where multiple computers, which are connected by a communications network such as the Internet, work together to handle data of logical models. Handling of a logical model will be explained using a complex example where data are dispersed on and held in a communications network.

Figure 29:
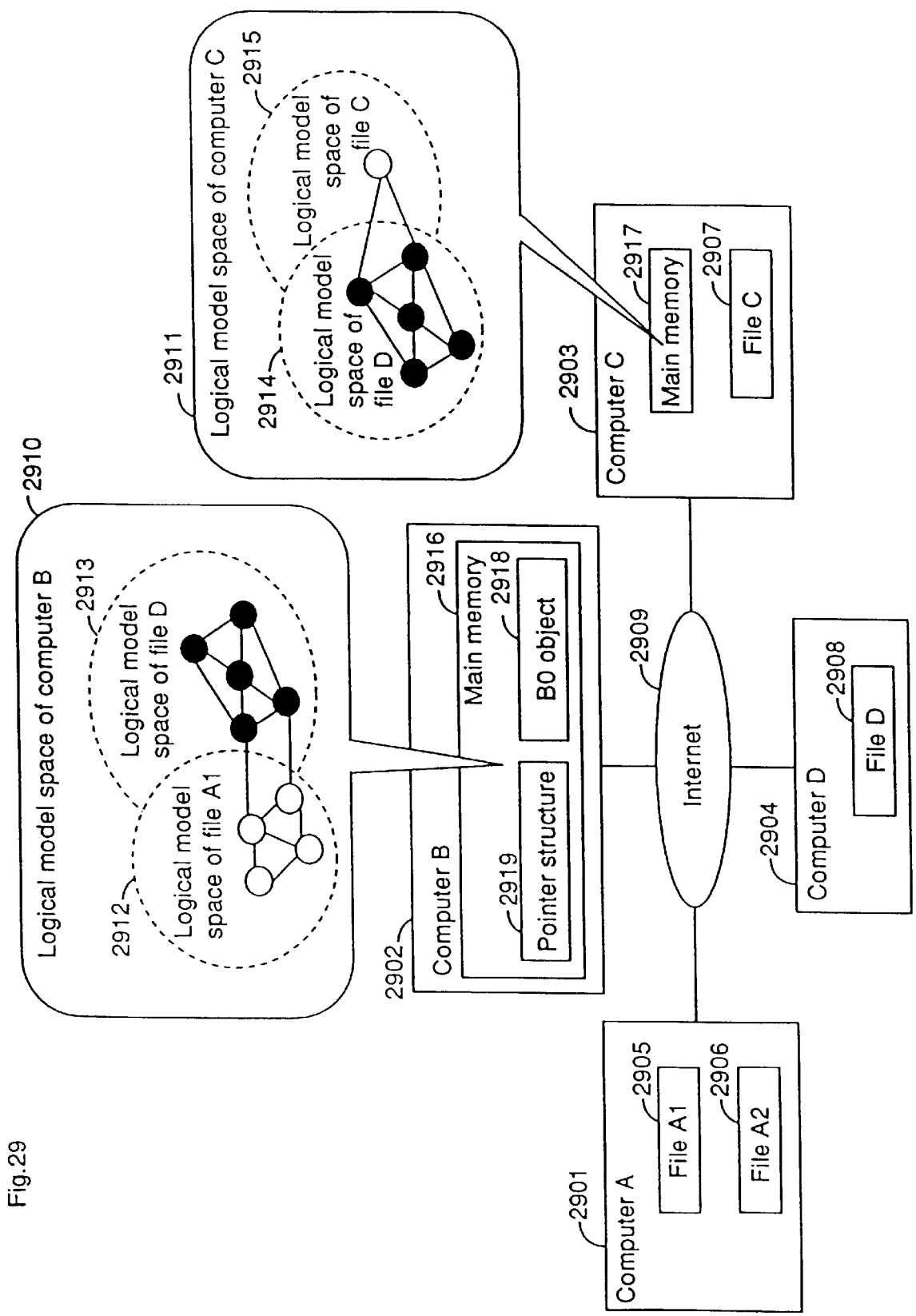
FIG. 29: Explanation of reproduction of logic models on the Internet.

FIG. 29 explains reproduction of logical models on the Internet. There are four computers connected to the Internet. "Computer A" 2901 holds "file A1" 2905 and "file A2" 2906, ° Computer C" 2903 holds "file C", and "Computer D" holds "file D" 2904.

Here the first management object "B0 object" 2918 is generated in the main memory of "computer B" 2902 (Section 5.3). ° File A1" 2905 of "computer A" 2901 is set in file assignment data 504 of object set management data 502 of B0 object 2918. The translated pointer data of a "pointer structure" 2919, that (is planned to) point to an object recorded in file A1, is set, and then the procedure to obtain a pointer from translated pointer data (Section 5.7) is invoked. At this time, objects recorded in "file A1" 2905 are reproduced in the "main memory" 2916 of "computer B" 2902. This is "logical model space of file A1" 2912 in "logical model space of computer B" 2910.

Reproduced objects are accommodated in the object tree and mutual relationships among objects are expressed by pointer structures held by objects. FIG. 29 shows logical models expressed by these pointer structures. However, the structure of the object tree is not shown. Therefore, in logical model spaces in FIG. 29, network type structures that show the structure of logical models are shown, instead of tree structures.

Suppose an object in the "logical model space of file A1" 2912 has a pointer structure pointing to an object recorded in "file D" 2908. "Logical model space of file D" 2913 will be reproduced in "logical model space of computer B" by the procedure to obtain a pointer from translated pointer data (Section 5.5.4.) of the pointer structure. "Logical model space of file A1" 2912 and "logical model space of file D" 2913 are linked by relationships expressed by pointer structures.

From data recorded in the same file, a logical model can be generated (simultaneously) in another computer. One of the merits of the present invention is that it can reproduce the necessary part of a logical model for each computer.

Suppose that the "logical model space of file D" 2914 is reproduced first in "logical model space of computer C 2903" 2911. Suppose a pointer structure that points to an object recorded in "file C" 2907 is held in a certain object in the "logical model space of file D" 2914. "Logical model space of file C" 2915 is reproduced in "logical model space of computer C" 2911 by the procedure (Section 5.5.4) to obtain a pointer from translated pointer data of the pointer structure. "Logical model space of file D" 2914 and "logical model space of file C" 2915 are linked by relationships that are expressed by pointer structures.

With the present invention, multiple computers connected by a communications network can utilize the same logical models in cooperation with each other, these models expressing objects relating to the real world objects and their mutual relationships. For computers which are not connected to a communications network, it is possible to exchange data by medium such as FD (a floppy disk), CD ?ROM and others.

Section 7.2 Display Program of Three-dimensional Space

The structure of three-dimensional space, real or fictional, can also be expressed as a logical model. Fictional space that is offered by a homepage vwww.com is an example of three-dimensional space expression. FIG. 30 explains this. Here, it is possible to experience as if actual movement is made inside three-dimensional imaginary space using a web browser. To reduce data volume, things in the far distance are not expressed in detail. If objects are approached closer, details will be displayed in the screen. However, when moving from one space (al space 3001) to another (b1 space 3002) (e.g. when a door is clicked), all the data of b2 space 3002 is read-in to the computer first. As a result, b1 space, which is independent three-dimensional space, will completely take over. It is like warping from the original a1 space 3001 to a different b1 space 3002. It is impossible to see directly the situation of how both spaces are connected even looking back. It is also impossible to go back, if the data to return from b1 space 3002 to a1 space 3001 is not set.

Figure 31:
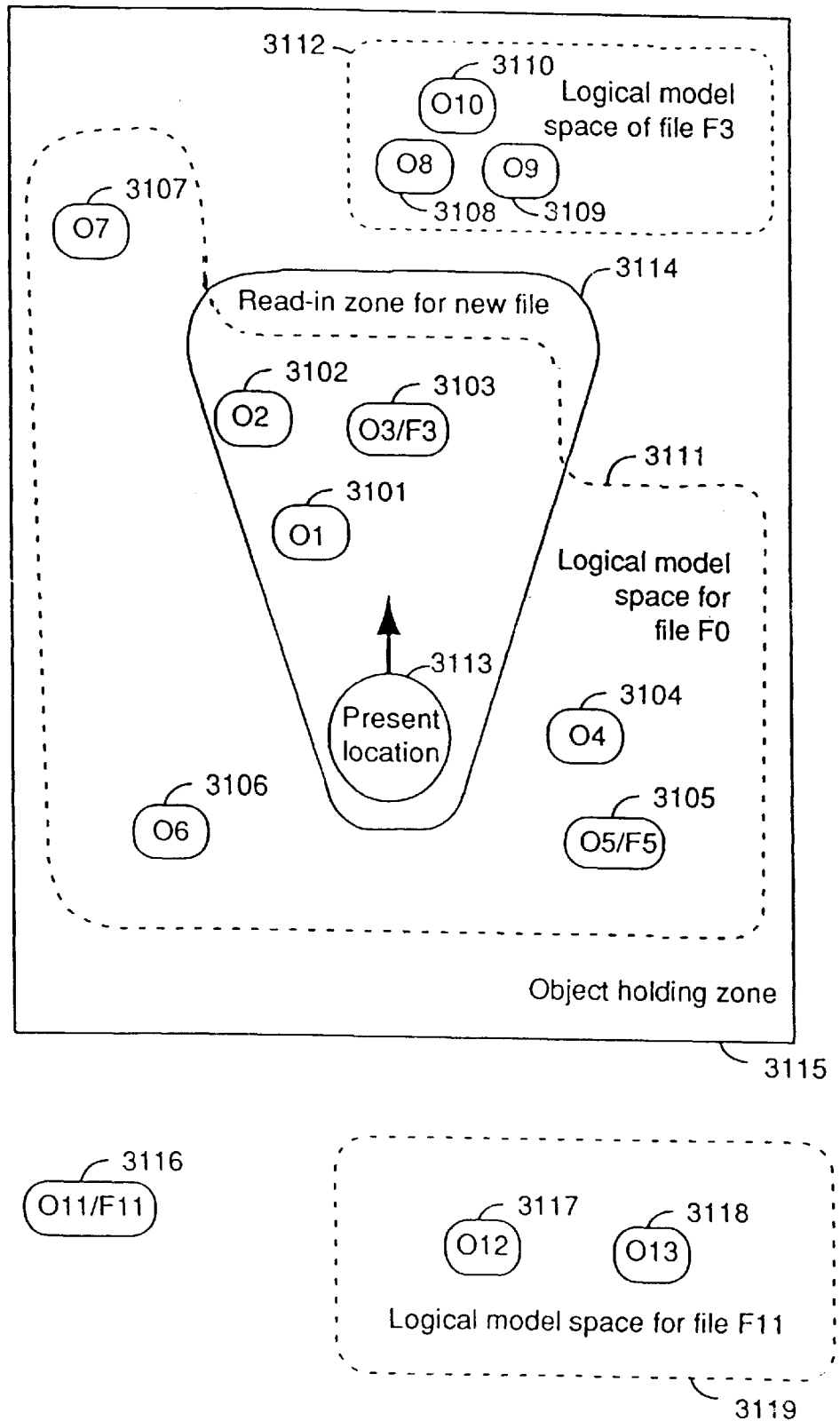
FIG. 31: Explanation of control of read-in and deletion of three-dimensional space data.

On the contrary, with the present invention, a vast expanse like in the real world can be given to the three-dimensional space reproduced on a computer. Even if a data file expressing space is subdivided, dispersed and accommodated in a number of computers connected by the Internet, data is read-in one after another and displayed on screen by approaching closer to an object. FIG. 31 shows this mechanism.

Suppose file F0 is read-in and "logical model space of file F0" 3111 is reproduced as the first data of imaginary three-dimensional space. Objects from "01, 3101 through "07" 3107 are reproduced in this logical model space. File F3 is set in object 03 as the file assignment data 504 in object set management data 502. This is expressed as "03/F3" 3103. Similarly, the file F5 is recorded in object 05 and expressed as "05/F5" 3105. FIG. 31 omits pointers, which specify mutual relationship among objects, and coordinates expressing locations.

A "Read-in zone for new file" 3114 is set based on "present location" 3113 in the space. The "Read-in zone for new file" 3114 swells upwards in the drawing, because it extends upward in the drawing from the present location. File F5 will not be read in, since object "05/F5" 3105 is out of this "read-in zone for new file".

Contrary to this, object "03/F3" 3103 is in the "read-in zone for new file" 3114 and data of file F3 are read-in. As a result, object "08" 3108, "09" 3109 and "010" 3110 are reproduced in the "logical model space of file F3" 3112.

FIG. 30(2) shows an example to which this mechanism is applied.

When moving inside "a2 space" 3003, "b2 space" 3004 is read-in, because the object for which file assignment data 504 is set in the file recording the data of "b2 space" 3004 enters into the "read-in zone for new file" 3114. As a result, "a2 space" 3003 and "b2 space" are connected. Therefore, it is possible to enter into "b2 space" 3004 naturally. When looking back in "b2 space" 3004, it is possible to see the connecting part with "a2 space". It is also possible to go back to "a2 space" 3003. Moreover, by connecting "c space" 3005, it is possible to enter it.

A vast expanse can be expressed by connecting data of files "set in file assignment data 504 of management objects. However, it is only possible to reproduce data of closer parts to the present location. It is convenient to reproduce only a necessary part, because of the limit of computer main memory. Necessary spaces can be reproduced one after another by moving around inside the imaginary three-dimensional space.

Moreover, unlimited consumption of memory can be prevented no matter how big the movement may be, by releasing data in main memory containing the data of farther places from the present location. A "object holding zone" 3115, which is outside of "read-in zone for new file" 3114, will now be introduced. If an object moves out of this zone, then file assignment data 504 of this object is set, the corresponding data is output (if modified data flag 508 is on) and the corresponding objects are released. For instance, in the example in FIG. 31, logical model space 3119 of file F11 is released, because the object "011/F11" 3116 is not included in "object holding zone" 3115. As a result, object "012" 3117 and object "013" 3118 are released from the main memory. Strictly speaking, it is necessary to release them after confirming that all objects following the object "011/F11" 3116 in the object tree are out of the "object holding zone" 3115. Otherwise, it is impossible to release the object tree beyond "011/F11" 3116.

Section 7.3 Three-dimensional Shopping Mall

As an applied example of a three-dimensional space display program, a three-dimensional shopping mall on the Internet is shown in the following.

With the conventional technique, the data file of the street (shopping mall) has to include an outside view data of shops as three-dimensional data. A three-dimensional data file exclusive to the store will be used when a door to the store is clicked. Even if the exclusive data of the store is changed, the data that is seen from the street does not change. It is impossible to show a poster from the inside of the store. It is also impossible to display articles on sale at the front of store. The inside of the store cannot be seen until a door to the store is clicked when wanting to enter into a different space.

With the present invention, three-dimensional space data can be divided into files of street data, window data, entrance data, interior shelf data and so on. When contents of shop data (data of a window, entrance, interior shelf etc.) are changed, the changes can be seen from the people walking on the street, though there are no changes in the street data. By approaching closer to the store, the inside of the store can be seen. Suppose a data file of the street is managed by the computer of the shopping mall manager. Even if this data has no change, the street is rapidly changed by rewriting content of each data file managed by each store.

Figure 32:
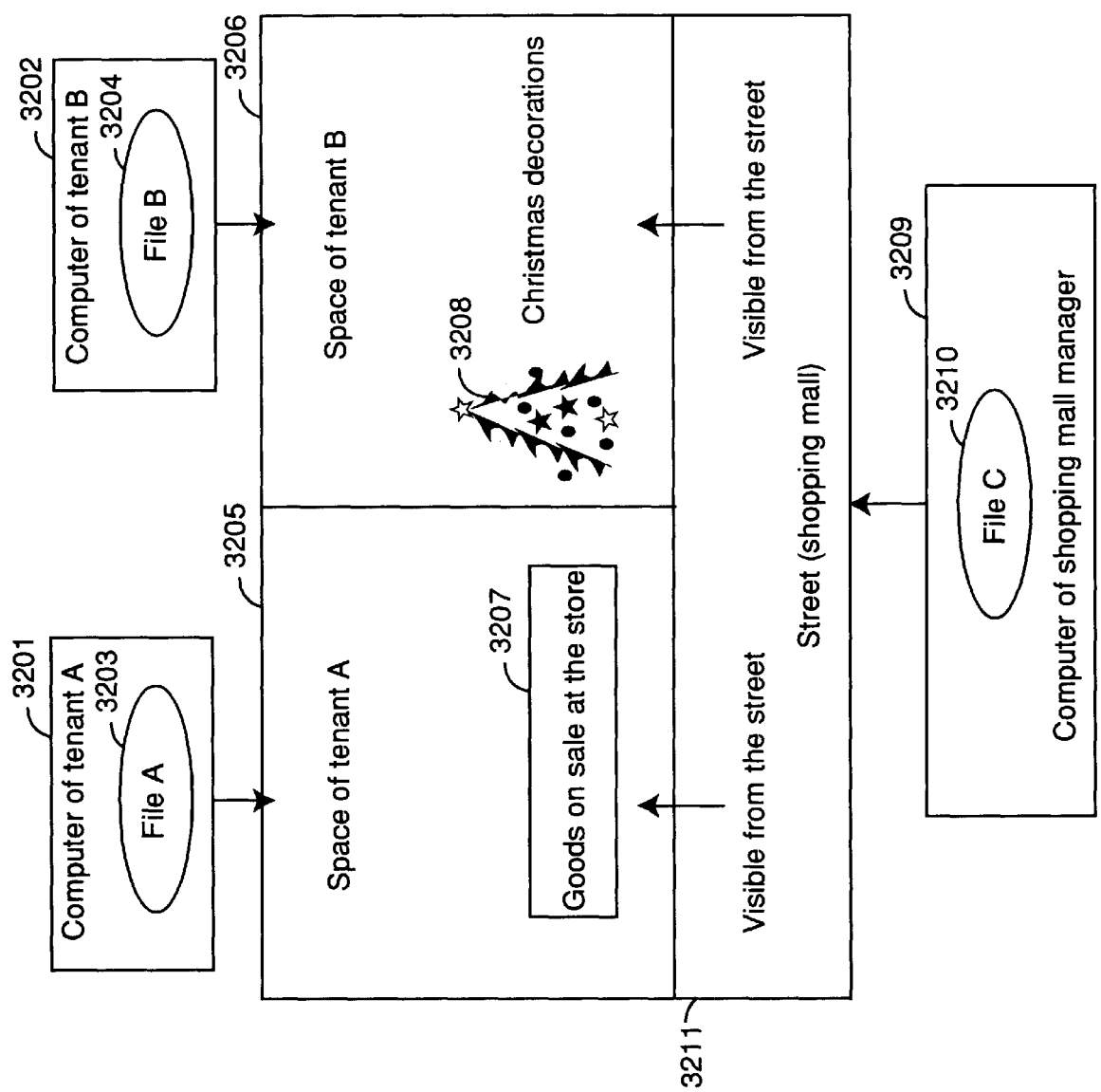
FIG. 32: Example of shopping mall implemented under the present invention.

In the example in FIG. 32, data of the "street (shopping mall)" 3211 exists in "file C" 3210 held by the "computer of the shopping mall manager" 3209. The "street (shopping mall)" 3211 is reproduced by reading in file C.

Suppose tenant A is approached from the street, and an object, to which file A is assigned, enters into the "read-in zone for new file" 3114. Then "file A" 3203 of tenant A" s computer 3201 is read-in and "space of tenant A" 3205 is reproduced and connected to the street 3211. Looking into the "space of tenant A" 3205 from the street 3211 at this moment, it is possible to look at "articles on sale in the front of the store" 3207.

Suppose that tenant B is approached from the street, and an object, to which file B is assigned, enters into the "read-in zone for new file" 3114. Then "file B" 3204 of tenant B" s computer 3202 is read in and "space of tenant B" 3206 is reproduced and connected to the street 3211. Looking into the "space of tenant B" 3206 from the street 3211 at this moment, it is possible to look at "Christmas decorations 3208".

Section 7.4 Program for Handling Design Drawings of Communications Networks

When utilizing design drawings of communications networks, necessary data differ largely according to the purposes. For example, assume a case of designing a communications network that connects Tokyo, New York and London as the communications network of an enterprise. Connection between Tokyo and New York is displayed with Tokyo node, New York node and the circuit linking them. These are enough for normal cases.

However, when we actually connect circuits data is required about wiring inside a building in Tokyo and about communications equipment set up in the building in Tokyo. Also, in order to precisely sum up grades of service the following data is required. Data of communications equipment set up in the buildings in Tokyo, wiring inside of the buildings in Tokyo, circuits in Japan, international circuits, circuits in USA, wiring inside of buildings in New York, and communications equipment set up in the buildings in New York.

With the present invention, a logical model can be generated, taking detailed data of communications network into a computer if necessary. It is possible to display detailed data on the screen of a computer and to invoke a program to sum up grades of service by using logical models. It is possible to use these logical models to simulate situations when problems arise with communications equipment and circuits.

Section 7.5 Travel Plan Handling Program

When utilizing travel plans, necessary data differ largely according to the purposes. For instance, a rough schedule of a whole trip and information about sight seeing spots are all needed in an initial travel plan. However, detailed information such as a meeting place in Narita Airport or access to Narita Airport become necessary when actually making the trip.

With the present invention, it is possible to reproduce object space just necessary to the current procedure. For instance, only "Narita" is displayed for the initial travel plan. By clicking on it, the object that holds information about Narita Airport is reproduced. From this object, information such as a map of Narita Airport or information about stores can be taken out. The information that is held in an object can be an address of the home page on the Internet. Accessing this address, it is possible to obtain information about Narita Airport.

When movement between places is clicked on, an object that holds information about the movement is reproduced. For example, the seat arrangement of an airplane or explanations about meal is obtained from the information.

With the present invention that expands logical models as required, requested information can be taken out easily sequentially. The technique for travel plans can also be applied to logistic plans.

Section 7.6 Programming for Object-based Procedure

Section 7.6.1 Mechanism Loading only the Function to be Used

Programming for an object-based procedure combines objects taking charge of simple procedures and accomplishes a complex procedure. However, there is no need to reproduce all objects in the first place. Only objects taking charge of frequently used functions are reproduced at first, and objects taking charge of less used functions should be reproduced only when necessary. With the present invention, all that is required in the first place is to prepare the pointer structures to objects of these functions. Converting the translated pointer data to pointers, the procedure reproduces the objects.

The amount of main memory used is small, even if the program supplies various kinds of functions. This is because only the objects that are frequently used are reproduced in the main memory. Many functions are supplied in the software of a word processor, but the fact is, not all of them are actually used. If there is a pointer structure, necessary functions can be loaded only when needed.

By modifying an objective file that supplies function additionally, functions of an application can be changed.

Section 7.6.2 Cooperation with CORBA

CORBA implements invocation of procedures and transmission of the results among objects in multiple computers.

However, if there is room in the main memory of the computer, the procedure will be made faster by reproducing all related objects on the same computer. This can be accomplished by a "mechanism loading only the function to be used" explained in Section 7.6.1. Now, a method for asking objects of other computers to do some functions, assuming there is not enough main memory left in the computer, will be described in the following.

Figure 4:
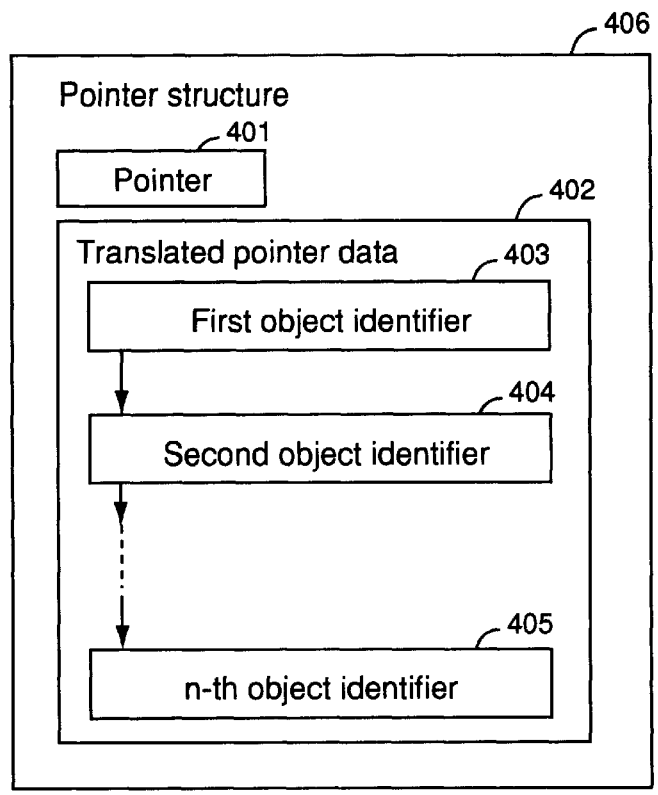
FIG. 4: Pointer structure.
Figure 5:
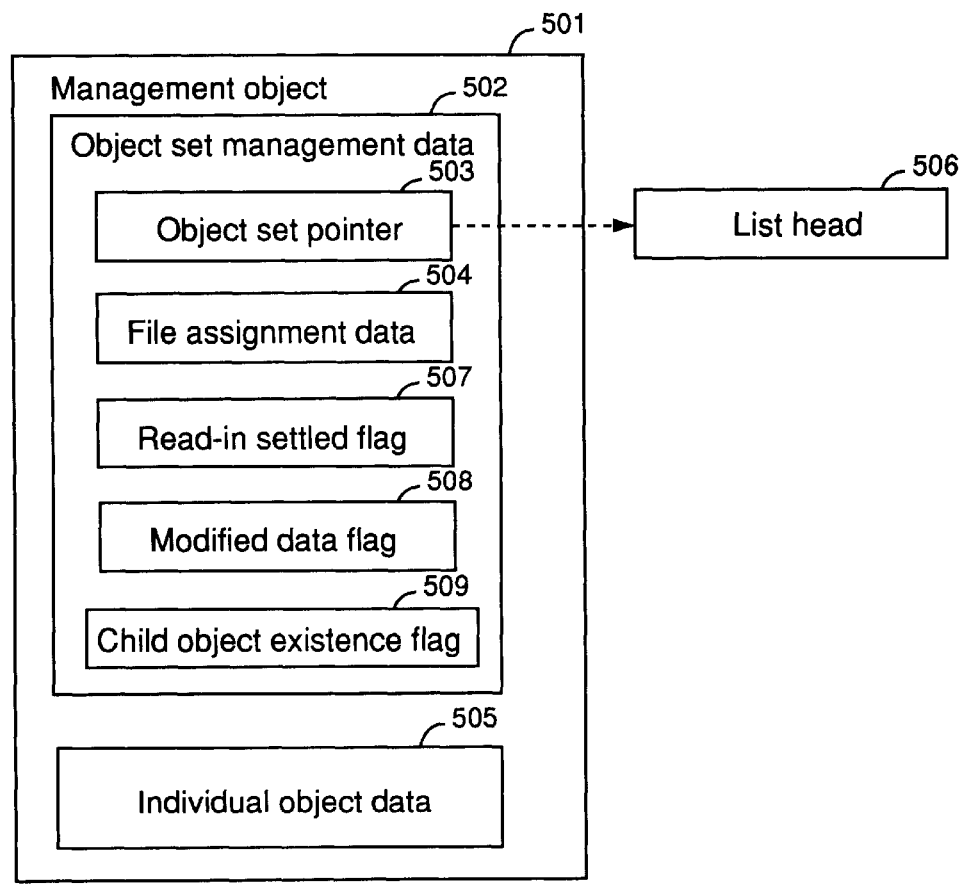
FIG. 5: Structure of management object.
Figure 33:
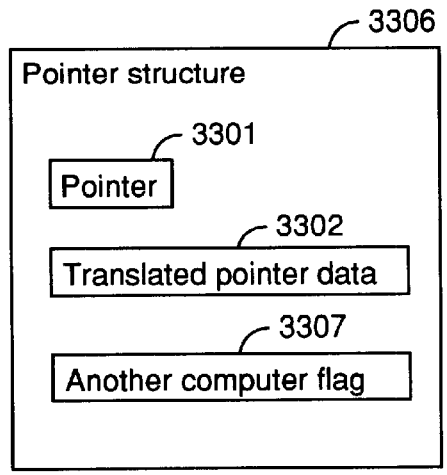
FIG. 33: Improved pointer structure.
Figure 34:
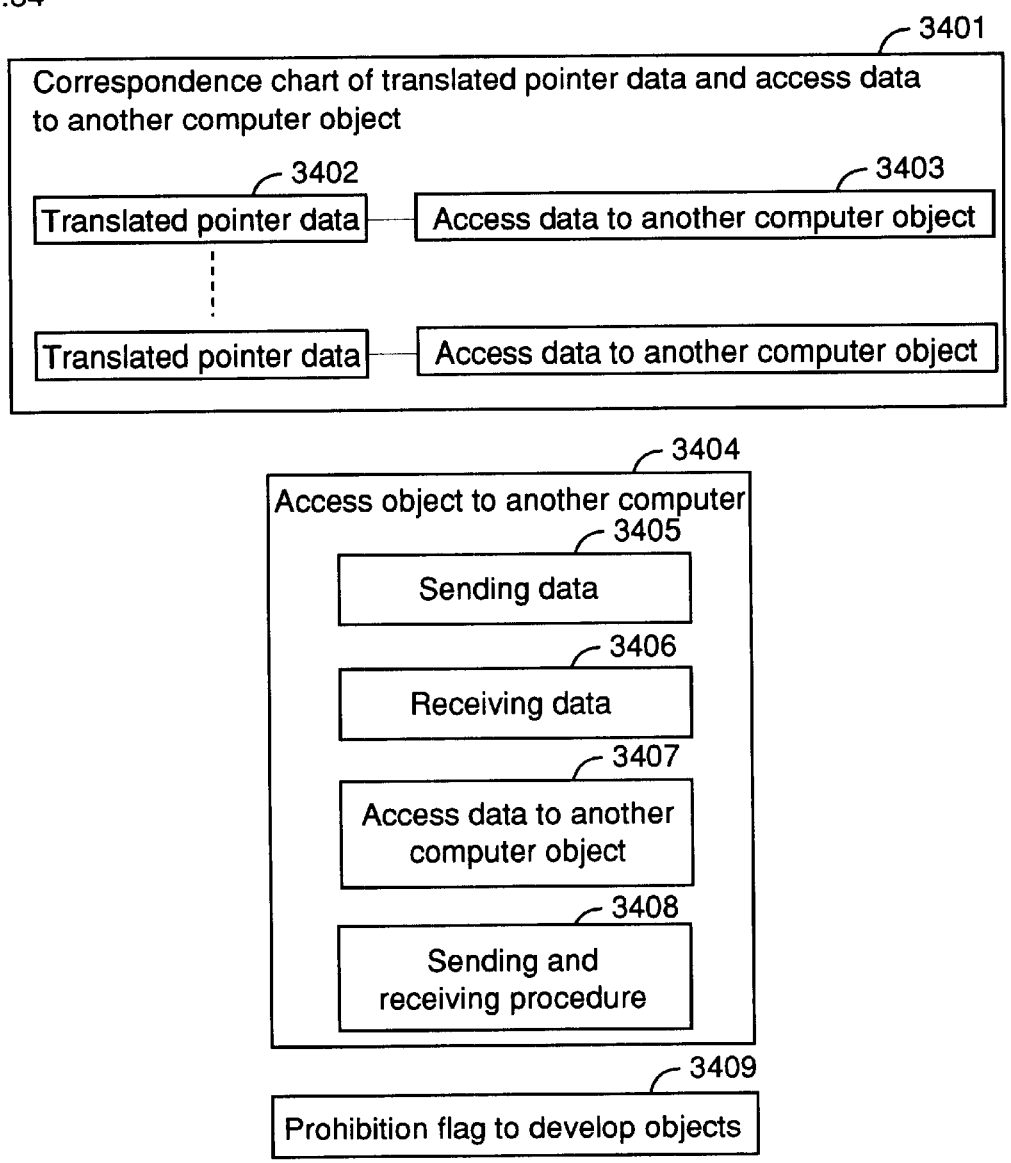
FIG. 34: Data group for accessing another computer object.

First, add "another computer flag" 3307 to the pointer structure as shown in FIG. 33. "Pointer" 3301 and "translated pointer data" 3302 are the same as in FIG. 4. FIG. 34 shows data to access objects of other computers. First, a "correspondence chart of translated pointer data and access data to another computer object" 3401 is defined. Correspondences of "translated pointer data" 3402 and "access data to another computer object" 3403 are recorded in this chart.

Figure 35:
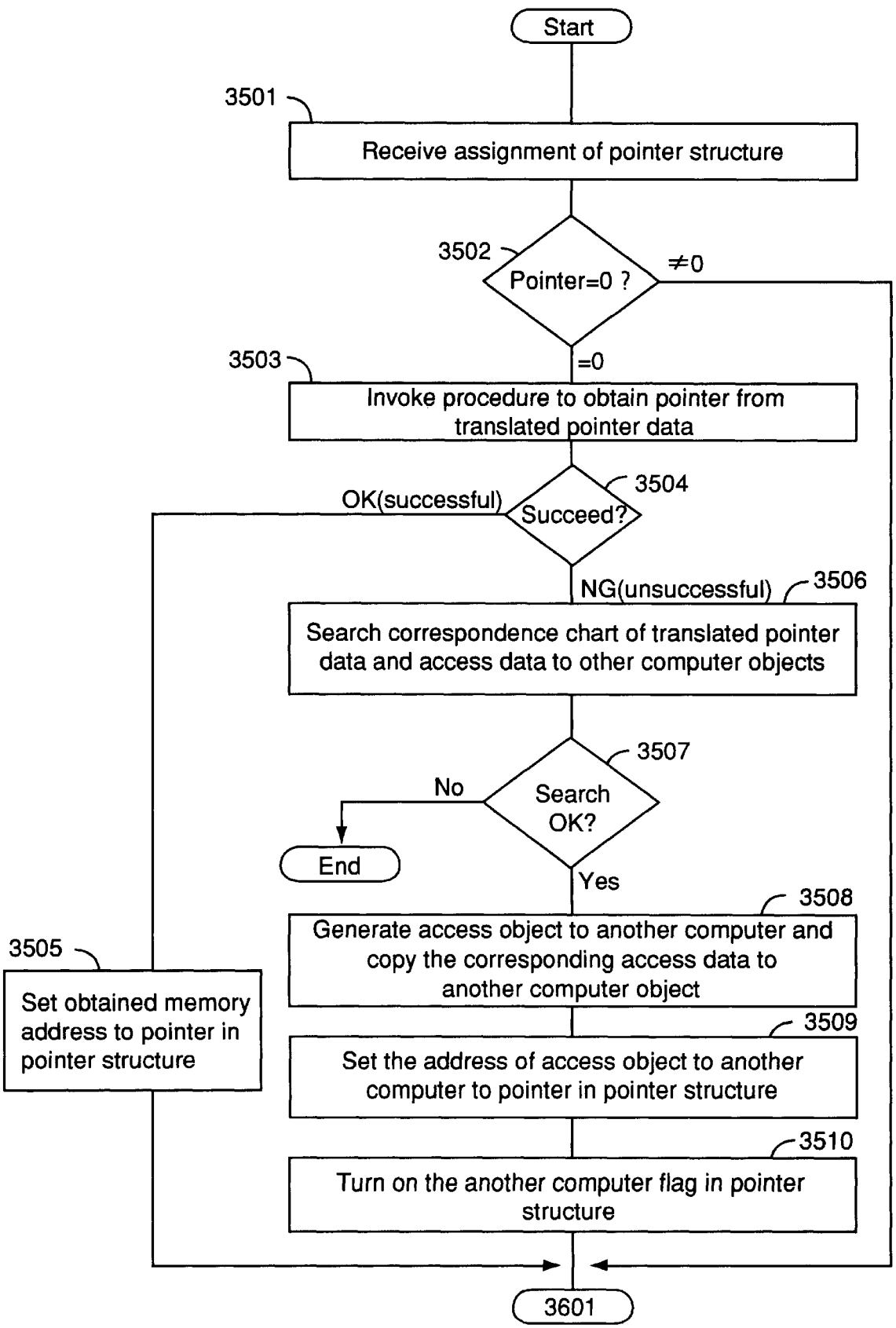
FIG. 35: Details of object access procedure that uses improved pointer structure and group of access data to another computer object.

Also, "access object to another computer" 3404 is introduced. This has "sending data" 3405 and "receiving data" 3406. They will be member variables when C, C++, or Java used. Further more, there is "access data to another computer object" 3407. This is either a copy of "access data to another computer object" 3403 of the "correspondence chart of translated pointer data and access data to another computer object" 3401, or a pointer to "access data to another computer object" 3403. Also, there is a "transmission and receiving procedure" 3408, and this is a member function of "access object to another computer" 3404. "Prohibition flag to develop objects" 3409 is introduced as a global variable. FIG. 35 explains the usage of the above-mentioned data.

FIG. 35 shows a procedure to access to the object by using the pointer structure of FIG. 33 and data in FIG. 34. First, "receive assignment of pointer structure 3306" 3501 is executed. When the value of "pointer" 3301 is zero, "invoke procedure to obtain pointer from translated pointer data" 3503 is executed.

Details of this step are shown in FIG. 27. A step to "check on prohibition flag to develop objects" will be inserted just after the judgment that "file assignment data is set?" 2704 if the result is "Yes (exists)". If it is off, "invoke object tree main read-in procedure" 2705 is executed, but if it is on, the procedure has to be terminated.

Therefore, if "prohibition flag to develop objects" 3409 is on, the result of the step to "invoke procedure to obtain pointer from translated pointer data" 3503 will become "N.G. (unsuccessful)". If it is "OK (successful)", the next step is to "set obtained memory address to pointer in pointer structure" 3505. However, if it is "NG (unsuccessful)," then the next step is to "search correspondence chart of translated pointer data and access data to another computer object 3401" 3506. If there is no translated pointer data equivalent to the assigned pointer structure in this chart, the procedure is aborted. If there is, then "generate access object to another computer 3404 and copy the corresponding access data to another computer object 3403" 3508 is executed. This data is "access data to another computer object" 3407 inside the "access object for another computer" 3404.

Next, "set the address of access object for another computer 3404 to pointer 3301 in pointer structure 3306" 3509 is executed, followed by "turn on the other computer flag in pointer structure 3306" 3510, and then processing advances. If the value of "pointer" 3301 of the "pointer structure" 3306 is zero, the procedure is common to the cases including the case when the step to "invoke procedure to obtain pointer from translated pointer data" 3503 succeeds.

If "another computer flag" 3307 of the "pointer structure" 3306 is off, "access to object indicated by pointer 3301" 3603 is executed, and then "get the result" 3604 is executed to finish the procedure.

If "another computer flag" 3307 of "pointer structure" 3306 is on, then "designate the access object to another computer by pointer 3301 of pointer structure 3306" 3605 is executed. "set sending data 3405" 3606 of "access object to another computer" 3404 is executed, and "invoke sending and receiving procedure 3408" 3607 is carried out. The "Sending and receiving procedure" 3408 utilizes "access data to another computer object" 3407 of "access object to another computer" 3404 and sends signals indicated by "sending data 3405" to the object of another computer.

The result data from the object of another computer is set to "receiving data" 3406 of "access object to another computer" 3404, and so the result data is taken out in the step to "take out receiving data 3406" 3608 to terminate the series of procedures.

Section 7.6.3 Difference from Conventional Object-oriented Programming

In conventional object-oriented programming, objects in each computer are generated directly by the logic of a program invoked. However, in the present invention, objects in each computer are generated from a file. There has been no such approach in the past.

With the present invention, the data of objects created in a computer are recorded in a file. By reading this file, another computer can reproduce objects. With this method, a complex program to create objects set can be executed by selected computers. The (member) function that is distributed with objects can be limited to simple functions. Thus loads and memory usage of computer executing functions are reduced. Data transmission time is also reduced. Because there is no need to distribute the special function to create objects, it is possible to prevent leakage of technical information.

When the set of objects, which are initially created, becomes huge, the data file should be divided. Thus, only the necessary objects can be reproduced while reproducing objects and executing functions.

Section 7.7 Extending the Java functionality

The Java language is receiving attention because of the convenience in distributing programs through the Internet. However, a pointer cannot be used when writing Java programs. This is to prevent illegal accesses by a Java program downloaded from the Internet. However, if a pointer is not allowed the expressive ability of program is restricted.

The present invention defines the standard pointer structure 406 or the improved pointer structure 3306. In the case of Java, they are defined as classes and used as an "imitation pointer". The following shows details.

(1) Suppose all objects to be accommodated in an object tree are derived from "class BaseObj{}".

(2) Define "class PtrConvertd{ };" as a class (structure) expressing translated pointer data 402 that is continuation of object identifiers.

(3) Define "class Prt{ public: BaseObj bp; PtrConverted pc; };" as "imitation pointer".

Here, variable bp of class BaseObj substitutes for pointer 401 in the pointer structure 406, since a pointer cannot be used in Java. The object of the "imitation pointer" is generated by code "Prt prt1;" and pointer identifiers will be set to "prt1.pc". The object (which is accommodated in an object tree) designated by the procedure (Section 5.7) that converts translated pointer data into a pointer is set to "bp". That is, assuming the designated object is "xxxObj", set as "bp=xxxObj;". The target object can be accessed by "ptr1.bp". If the procedure (Section 5.7) that converts translated pointer data to a pointer or the procedure (Section 7.6.2) that accesses objects in FIG. 35 is implemented as a member function of class Prt (including setting of value to Prt::bp), handling of these procedures will be simple. Each procedure explained in Section 5 and Section 7.6.2 can be implemented by Java, or can be implemented by C or C++ and called from Java code.

As mentioned above, the "imitation pointer" can be used without losing the safety of Java. Also, this "imitation pointer" can be retained, reproduced and transmitted.

Section 8

Generally, the object management method is implemented by a computer program. Programs are recorded in and delivered by computer-readable mediums such as FD (a floppy disk), CD (compact disc), magneto-optical disk, hard disk, and others. There are cases where programs are distributed through a communications network, and in many cases they are recorded in secondary storage mediums such as hard disks to complete installation. Sometimes a program is installed in the secondary storage mediums such as hard disks of computers and sold as a computer with software included.

There are cases where a program taken in from the communications network is directly reproduced in main memory and executed. A program written in Java language is treated just like this. It can be said that this is the same as the program installed in a hard disk the fact that main memory is also Computer-Readable Media is considered.

INDUSTRIAL APPLICABILITY

As mentioned above, the present invention can be widely applied to retain, reproduce and transmit objects and pointers in object-based technology. The technique of this invention is simple in comparison with the technique of an object-oriented database. What was impossible to accomplish with the conventional object-oriented database has been made possible. That is to "connect data that is dispersed and accommodated in multiple computers and to generate or reproduce objects that are mutually related."

One of the merits of the present invention is to "reproduce in main memory only objects necessary to be accessed." When many objects are mutually related, it is sometimes impossible to reproduce all of them in main memory. Also, there are problems that it takes time to read-in, that it consumes too much memory and so on. These problems can be solved by the present invention.

The present invention is suitable for handling of logical models with objects and mutual relationships among objects. Blueprints and drawings of communications networks, travel plans, logistic plans and expression of three-dimensional space can be given as examples of logical models. The present invention can connect these data of logical models and reproduce only the logical models of necessary parts, even if data are dispersed and held in computers connected by communications network such as the Internet. Thus, three-dimensional spaces can be connected naturally. Looking into the inside of each tenant from the street of a shopping mall becomes possible.

Programming for object-based procedures combines objects taking charge of simple procedures and accomplishes a complex procedure. With the present invention, it becomes possible to reproduce only objects that are necessary for the procedure. If there is room in main memory, all objects can be reproduced. If there is no room in main memory, it can be switched to request processing of an object of another computer.

Although a pointer cannot be used in Java, an "imitation pointer" can be implemented by the present invention and used like a pointer of the C language. This "imitation pointer" will not disturb the safety of Java. Also, this "imitation pointer" can be retained, reproduced and transmitted.

What is claimed is:

1. A method to set a pointer toward an object in a memory of a computer, comprising;

Step A: a step to take out a first object identifier from a given translated pointer that is a series of object identifiers, and Step B1: a step to find an object with said object identifier among a given object set, and Step C: a step to take out a next object identifier from said translated pointer, and Step D: a step to invoke E if there is no next object identifier at C, or to invoke F if there is said next object identifier at C, Step E: a step to report a memory address of said object found at B1 as a value of said pointer to be determined by this method, Step F: a step to find an object set corresponding to said object found at B1, and Step G: a step to assign said object set found at F as a given object set to B1, and to assign said object identifier taken out at C as an object identifier to B1, and to invoke B1.

2. A method to set a pointer toward an object in a memory of a computer, comprising;

Step A: a step to take out a first object identifier from a given translated pointer that is a series of object identifiers, and Step B1: a step to find an object with said object identifier among a given object set, and Step B2-2: a step to invoke C, if there is said object at B1, or to invoke B3-2 if there is no said object at B1, Step B3-2: a step to read a class identifier and to generate an object of a class indicated by said class identifier, and Step B4-2: a step to read an object identifier and to set it to said object generated at B3-2, and Step B5-2: a step to accommodate said object generated at B3-2 to said object set of B1, and Step C: a step to take out a next object identifier from said translated pointer, and Step D: a step to invoke E if there is no next object identifier at C, or to invoke F if there is said next object identifier at C, Step E: a step to report a memory address of said object found at B1 as a value of said pointer to be determined by this method, Step F: a step to find an object set corresponding to said object found at B1, and Step G: a step to assign said object set found at F as a given object set to B1, and to assign said object identifier taken out at C as an object identifier to B1, and to invoke B1.

3. A method to set a pointer toward an object in a memory of a computer, comprising;

Step A: a step to take out a first object identifier from a given translated pointer that is a series of object identifiers, and Step B1: a step to find an object with said object identifier among a given object set, and Step B2-1: a step to invoke C if there is said object at B1, or to invoke B3-1 if there is no said object at B1, Step B3-1: a step to generate an object, and Step B4-1: a step to set an object identifier to said object generated at B3-1, and Step B5-1: a step to accommodate said object generated at B3-1 to said object set of B1, and Step C: a step to take out a next object identifier from said translated pointer, and Step D: a step to invoke E if there is no next object identifier at C, or to invoke F if there is said next object identifier at C, Step E: a step to report a memory address of said object found at B1 as a value of said pointer to be determined by this method, Step F: a step to find an object set corresponding to said object found at B1, and Step G: a step to assign said object set found at F as a given object set to B1, and to assign said object identifier taken out at C as an object identifier to B1, and to invoke B1.

4. A computer readable medium recording a program implementing a method to set a pointer toward an object in a memory of a computer, comprising;

Step A: a step to take out a first object identifier from a given translated pointer that is a series of object identifiers, and Step B1: a step to find an object with said object identifier among a given object set, and Step C: a step to take out a next object identifier from said translated pointer and Step D: a step to invoke E if there is no next object identifier at C, or to invoke F if there is said next object identifier at C, Step E: a step to report a memory address of said object found at B1 as a value of said pointer to be determined by this method, Step F: a step to find an object set corresponding to said object found at B1", and Step G: a step to assign said object set found at F as a given object set to B1, and to assign said object identifier taken out at C as an object identifier to B1, and to invoke B1.

5. A computer readable medium recording a program implementing a method to set a pointer toward an object in a memory of a computer, comprising;

Step A: a step to take out a first object identifier from a given translated pointer that is a series of object identifiers, and Step B1": a step to find an object with said object identifier among a given object set, and Step B2-1: a step to invoke C if there is said object at B1, or to invoke B3-1 if there is no said object at B1, Step B3-1: a step to generate an object, and Step B4-1: a step to set an object identifier to said object generated at B3-1, and Step B5-1: a step to accommodate said object generated at B3-1 to said object set of B1, and Step C: a step to take out a next object identifier from said translated pointer, and Step D: a step to invoke E if there is no next object identifier at C, or to invoke F if there is said next object identifier at C, Step E: a step to report a memory address of said object found at B1 as a value of said pointer to be determined by this method, Step F: a step to find an object set corresponding to said object found at B1, and Step G: a step to assign said object set found at F as a given object set to B1, and to assign said object identifier taken out at C as an object identifier to B1, and to invoke B1.

6. A computer readable medium recording a program implementing a method to set a pointer toward an object in a memory of a computer, comprising;

Step A: a step to take out a first object identifier from a given translated pointer that is a series of object identifiers, and Step B1: a step to find an object with said object identifier among a given object set, and Step C: a step to take out a next object identifier from said translated pointer, and Step B2-2: a step to invoke C, if there is said object at B1, or to invoke B3-2 if there is no said object at B1, Step B3-2: a step to read a class identifier and to generate an object of a class indicated by said class identifier, and Step B4-2: a step to read an object identifier and to set it to said object generated at B3-2, and Step B5-2: a step to accommodate said object generated at B3-2 to said object set of B1, and Step C: a step to take out a next object identifier from said translated pointer, and Step D: a step to invoke E if there is no next object identifier at C, or to invoke F if there is said next object identifier at C, Step E: a step to report a memory address of said object found at B1 as a value of said pointer to be determined by this method, Step F: a step to find an object set corresponding to said object found at B1, and Step G: a step to assign said object set found at F as a given object set to B1, and to assign said object identifier taken out at C as an object identifier to B1, and to invoke B1.

* * * * *